US010253258B2

United States Patent
Taniguchi et al.

(10) Patent No.: US 10,253,258 B2
(45) Date of Patent: *Apr. 9, 2019

(54) NEMATIC LIQUID CRYSTAL COMPOSITION

(71) Applicant: DIC CORPORATION, Tokyo (JP)

(72) Inventors: Shirou Taniguchi, Kita-adachi-gun (JP); Joji Kawamura, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/328,120

(22) PCT Filed: Jul. 28, 2015

(86) PCT No.: PCT/JP2015/071324
§ 371 (c)(1),
(2) Date: Jan. 23, 2017

(87) PCT Pub. No.: WO2016/017615
PCT Pub. Date: Feb. 4, 2016

(65) Prior Publication Data
US 2017/0218269 A1 Aug. 3, 2017

(30) Foreign Application Priority Data

Jul. 31, 2014 (JP) .................................. 2014-156267

(51) Int. Cl.
*G02F 1/1333* (2006.01)
*C09K 19/12* (2006.01)
(Continued)

(52) U.S. Cl.
CPC .............. *C09K 19/12* (2013.01); *C09K 19/10* (2013.01); *C09K 19/20* (2013.01); *C09K 19/3066* (2013.01); *C09K 19/322* (2013.01); *C09K 19/42* (2013.01); *G02F 1/1362* (2013.01); *C09K 2019/0466* (2013.01); *C09K 2019/122* (2013.01); *C09K 2019/123* (2013.01); *C09K 2019/124* (2013.01); *C09K 2019/301* (2013.01);
(Continued)

(58) Field of Classification Search
CPC ........ C09K 19/12; C09K 19/20; C09K 19/42; C09K 19/10; C09K 19/322; C09K 19/3066; C09K 2019/122; C09K 2019/123; C09K 2019/124; C09K 2019/0466; C09K 2019/3004; C09K 2019/301; C09K 2019/3016; C09K 2019/3025; C09K 2019/3078; C09K 2019/3422; G02F 1/1333; G02F 1/1362
USPC .................................................... 252/299.62
See application file for complete search history.

(56) References Cited

U.S. PATENT DOCUMENTS

| 4,818,431 A | 4/1989 | Eidenschink et al. |
| 5,032,313 A | 7/1991 | Goto et al. |

(Continued)

FOREIGN PATENT DOCUMENTS

| CN | 1184462 A | 6/1998 |
| CN | 102186821 A | 9/2011 |

(Continued)

OTHER PUBLICATIONS

International Search Report dated Oct. 20, 2015, issued in counterpart International Application No. PCT/JP2015/071324 (2 pages).

(Continued)

*Primary Examiner* — Geraldina Visconti
(74) *Attorney, Agent, or Firm* — Westerman, Hattori, Daniels & Adrian, LLP

(57) ABSTRACT

The present invention provides a liquid crystal composition including at least one compound represented by General Formula (1), at least one compound represented by General Formula (2), and at least one compound represented by General Formula (LC1).

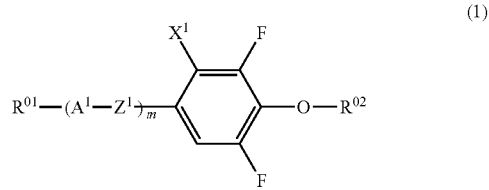

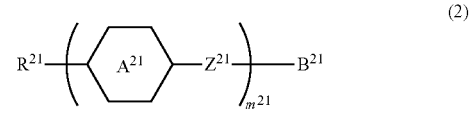

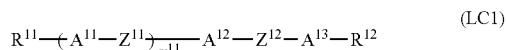

The liquid crystal composition of the present invention has high refractive index anisotropy (Δn) and sufficiently low viscosity (η), achieves a wide nematic phase temperature range by suppressing a decrease in nematic phase-isotropic liquid phase transition temperature ($T_{ni}$), and exhibits high compatibility. By using the liquid crystal composition of the present invention in a liquid crystal display element, a liquid crystal display element having a high response speed and high practical reliability can be obtained.

15 Claims, No Drawings

(51) Int. Cl.
*C09K 19/20* (2006.01)
*C09K 19/42* (2006.01)
*C09K 19/10* (2006.01)
*C09K 19/32* (2006.01)
*G02F 1/1362* (2006.01)
*C09K 19/30* (2006.01)
*C09K 19/04* (2006.01)
*C09K 19/34* (2006.01)

(52) U.S. Cl.
CPC ........... *C09K 2019/3004* (2013.01); *C09K 2019/3016* (2013.01); *C09K 2019/3025* (2013.01); *C09K 2019/3078* (2013.01); *C09K 2019/3422* (2013.01)

(56) References Cited

U.S. PATENT DOCUMENTS

| | | | |
|---|---|---|---|
| 5,324,449 | A | 6/1994 | Kurmeier et al. |
| 5,399,292 | A | 3/1995 | Buchecker et al. |
| 5,487,845 | A | 1/1996 | Reiffenrath et al. |
| 5,730,904 | A | 3/1998 | Bartmann et al. |
| 5,733,477 | A | 3/1998 | Kondo et al. |
| 5,800,734 | A | 9/1998 | Buchecker et al. |
| 5,858,270 | A | 1/1999 | Matsui et al. |
| 5,976,407 | A | 11/1999 | Tarumi et al. |
| 6,051,288 | A | 4/2000 | Kondo et al. |
| 6,200,654 | B1 | 3/2001 | Poetsch et al. |
| 6,207,076 | B1 | 3/2001 | Koga et al. |
| 6,210,603 | B1 | 4/2001 | Kondo et al. |
| 6,254,941 | B1 | 7/2001 | Kondou et al. |
| 6,468,607 | B1 | 10/2002 | Takehara et al. |
| 6,579,577 | B2 | 6/2003 | Kondo et al. |
| 7,001,646 | B2 | 2/2006 | Heckmeier et al. |
| 7,175,891 | B2 | 2/2007 | Heckmeier et al. |
| 7,198,827 | B1 | 4/2007 | Takeuchi et al. |
| 7,250,198 | B2 | 7/2007 | Heckmeier et al. |
| 7,361,388 | B2 | 4/2008 | Kirsch et al. |
| 7,604,851 | B2 | 10/2009 | Heckmeier et al. |
| 7,674,507 | B2 | 3/2010 | Lietzau et al. |
| 7,704,566 | B2 | 4/2010 | Heckmeier et al. |
| 7,767,277 | B2 | 8/2010 | Lietzau et al. |
| 8,168,083 | B2 | 5/2012 | Goebel et al. |
| 8,916,718 | B2 | 12/2014 | Tojo et al. |
| 9,039,929 | B2 | 5/2015 | Kaneoya et al. |
| 9,079,836 | B2 | 7/2015 | Tojo et al. |
| 9,181,484 | B2 | 11/2015 | Tojo et al. |
| 9,315,727 | B2 | 4/2016 | Tojo et al. |
| 9,321,961 | B2 | 4/2016 | Kaneoya et al. |
| 9,573,923 | B2 | 2/2017 | Tojo et al. |
| 9,587,175 | B2 | 3/2017 | Kaneoya et al. |
| 9,637,466 | B2 | 5/2017 | Tojo et al. |
| 2002/0166994 | A1 | 11/2002 | Kondo et al. |
| 2003/0197153 | A1 | 10/2003 | Heckmeier et al. |
| 2003/0228426 | A1 | 12/2003 | Heckmeier et al. |
| 2003/0236304 | A1 | 12/2003 | Jolidon et al. |
| 2005/0012073 | A1 | 1/2005 | Goulding et al. |
| 2005/0017216 | A1 | 1/2005 | Poetsch et al. |
| 2005/0092966 | A1 | 5/2005 | Heckmeier et al. |
| 2005/0161637 | A1 | 7/2005 | Shinano et al. |
| 2006/0061699 | A1 | 3/2006 | Kirsch et al. |
| 2006/0263542 | A1 | 11/2006 | Kirsch et al. |
| 2006/0286308 | A1 | 12/2006 | Kirsch et al. |
| 2007/0001149 | A1 | 1/2007 | Manabe et al. |
| 2007/0051919 | A1 | 3/2007 | Kondou et al. |
| 2007/0134444 | A1 | 6/2007 | Harding et al. |
| 2007/0205396 | A1 | 9/2007 | Czanta et al. |
| 2008/0132716 | A1 | 6/2008 | Lietzau et al. |
| 2008/0199635 | A1 | 8/2008 | Hirschmann et al. |
| 2009/0065739 | A1 | 3/2009 | Haseba et al. |
| 2009/0103011 | A1 | 4/2009 | Bernatz et al. |
| 2009/0230355 | A1 | 9/2009 | Czanta et al. |
| 2009/0302273 | A1 | 12/2009 | Tanaka |
| 2010/0127211 | A1 | 5/2010 | Tanaka |
| 2010/0294991 | A1 | 11/2010 | Saito et al. |
| 2010/0308267 | A1 | 12/2010 | Wittek et al. |
| 2010/0328600 | A1 | 12/2010 | Shimada et al. |
| 2011/0001090 | A1 | 1/2011 | Wittek et al. |
| 2011/0024682 | A1 | 2/2011 | Czanta et al. |
| 2011/0037024 | A1 | 2/2011 | Kobayashi |
| 2011/0037912 | A1 | 2/2011 | Saito et al. |
| 2011/0193022 | A1 | 8/2011 | Tanaka et al. |
| 2011/0233466 | A1 | 9/2011 | Jansen et al. |
| 2011/0253934 | A1 | 10/2011 | Lietzau et al. |
| 2011/0291048 | A1 | 12/2011 | Hamano et al. |
| 2011/0315924 | A1 | 12/2011 | Kojima et al. |
| 2011/0315925 | A1 | 12/2011 | Hiraoka et al. |
| 2013/0300996 | A1 | 11/2013 | Takeuchi et al. |
| 2013/0306908 | A1 | 11/2013 | Jansen et al. |
| 2014/0034876 | A1 | 2/2014 | Gotoh et al. |
| 2014/0084210 | A1 | 3/2014 | Yanai et al. |
| 2014/0225036 | A1 | 8/2014 | Kaneoya et al. |
| 2014/0275577 | A1 | 9/2014 | Tojo et al. |
| 2015/0087847 | A1 | 3/2015 | Tojo et al. |
| 2015/0124205 | A1 | 5/2015 | Kaneoya et al. |
| 2015/0159086 | A1 | 6/2015 | Kaneoya et al. |
| 2015/0184076 | A1 | 7/2015 | Kaneoya et al. |
| 2015/0203757 | A1 | 7/2015 | Kaneoya et al. |
| 2015/0218451 | A1 | 8/2015 | Kaneoya et al. |
| 2015/0284634 | A1 | 10/2015 | Kaneoya et al. |
| 2015/0322343 | A1 | 11/2015 | Kaneoya et al. |
| 2016/0186059 | A1 | 6/2016 | Kaneoya et al. |
| 2017/0198219 | A1* | 7/2017 | Taniguchi .......... C09K 19/3402 |

FOREIGN PATENT DOCUMENTS

| | | |
|---|---|---|
| CN | 102643653 A | 8/2012 |
| DE | 41 32 006 A1 | 4/1993 |
| DE | 4416256 A1 | 11/1994 |
| DE | 10 2009 009 631 A1 | 9/2009 |
| DE | 102010015824 A1 | 3/2011 |
| DE | 112013004132 B4 | 11/2016 |
| EP | 0 156 554 A2 | 10/1985 |
| EP | 0 882 696 A1 | 12/1998 |
| JP | H02-501311 A | 5/1990 |
| JP | H02-233626 A | 9/1990 |
| JP | 2-289529 A | 11/1990 |
| JP | H04-501575 A | 3/1992 |
| JP | H06-504032 A | 5/1994 |
| JP | 6-239776 A | 8/1994 |
| JP | H8-283183 A | 10/1996 |
| JP | 9-157202 A | 6/1997 |
| JP | 10-67988 A | 3/1998 |
| JP | H10-101599 A | 4/1998 |
| JP | H10130187 A | 5/1998 |
| JP | 10-204016 A | 8/1998 |
| JP | 11-29771 A | 2/1999 |
| JP | 2000-169413 A | 6/2000 |
| JP | 2000-355560 A | 12/2000 |
| JP | 2001-011458 A | 1/2001 |
| JP | 2001-019649 A | 1/2001 |
| JP | 2001-026560 A | 1/2001 |
| JP | 3122199 B2 | 1/2001 |
| JP | 2003-176251 A | 6/2003 |
| JP | 2003-183656 A | 7/2003 |
| JP | 2003-261873 A | 9/2003 |
| JP | 2003-286217 A | 10/2003 |
| JP | 2003-533557 A | 11/2003 |
| JP | 2004-529214 A | 9/2004 |
| JP | 2004-352721 A | 12/2004 |
| JP | 2004-355560 A | 12/2004 |
| JP | 2005-154724 A | 6/2005 |
| JP | 2005-517079 A | 6/2005 |
| JP | 2005-220355 A | 8/2005 |
| JP | 2005-232214 A | 9/2005 |
| JP | 2005-232215 A | 9/2005 |
| JP | 2005-232455 A | 9/2005 |
| JP | 2005-529176 A | 9/2005 |
| JP | 2005250223 A | 9/2005 |
| JP | 2006-515283 A | 5/2006 |
| JP | 2006-257274 A | 9/2006 |
| JP | 2006-328400 A | 12/2006 |
| JP | 2007-501301 A | 1/2007 |
| JP | 2007-23071 A | 2/2007 |

(56) References Cited

FOREIGN PATENT DOCUMENTS

| | | | |
|---|---|---|---|
| JP | 2007-503405 A | 2/2007 |
| JP | 2007-503485 A | 2/2007 |
| JP | 2007-503487 A | 2/2007 |
| JP | 2007-51291 A | 3/2007 |
| JP | 2007-070295 A | 3/2007 |
| JP | 2007-177241 A | 7/2007 |
| JP | 2007-526931 A | 9/2007 |
| JP | 2007-277127 A | 10/2007 |
| JP | 2008-69153 A | 3/2008 |
| JP | 2008-189927 A | 8/2008 |
| JP | 2008-222588 A | 9/2008 |
| JP | 2008-545669 A | 12/2008 |
| JP | 2009-067780 A | 4/2009 |
| JP | 2009-84560 A | 4/2009 |
| JP | 2009-179813 A | 8/2009 |
| JP | 2009-185285 A | 8/2009 |
| JP | 2009-215556 A | 9/2009 |
| JP | 2009-292730 A | 12/2009 |
| JP | 2010-500980 A | 1/2010 |
| JP | 2010-275390 A | 12/2010 |
| JP | 2011-037998 A | 2/2011 |
| JP | 2011-516628 A | 5/2011 |
| JP | 2011-136998 A | 7/2011 |
| JP | 2011-148761 A | 8/2011 |
| JP | 2011-168530 A | 9/2011 |
| JP | 2011-195587 A | 10/2011 |
| JP | 2012-117062 A | 6/2012 |
| JP | 5263461 B2 | 5/2013 |
| JP | 2013-170246 A | 9/2013 |
| JP | 5382268 B1 | 1/2014 |
| JP | 2014-40413 A | 3/2014 |
| JP | 5435318 B1 | 3/2014 |
| JP | 2014-62212 A | 4/2014 |
| JP | 2014-105178 A | 6/2014 |
| KR | 20060119879 A | 11/2006 |
| WO | 96/11897 A1 | 4/1996 |
| WO | 96/32365 A1 | 10/1996 |
| WO | 97/37960 A1 | 10/1997 |
| WO | 98/23564 A1 | 6/1998 |
| WO | 2004/058676 A1 | 7/2004 |
| WO | 2005/019377 A1 | 3/2005 |
| WO | 2008/105286 A1 | 9/2008 |
| WO | 2009/034867 A1 | 3/2009 |
| WO | 2009/125668 A1 | 10/2009 |
| WO | 2009/150963 A1 | 12/2009 |
| WO | 2010/047260 A1 | 4/2010 |
| WO | 2012/043387 A1 | 4/2012 |
| WO | 2012/100809 A1 | 8/2012 |
| WO | 2012/161178 A1 | 11/2012 |
| WO | 2013/018796 A1 | 2/2013 |
| WO | 2013/099754 A1 | 7/2013 |
| WO | 2013/141116 A1 | 9/2013 |
| WO | 2013/172162 A1 | 11/2013 |
| WO | 14/030481 A1 | 2/2014 |
| WO | 2015/029876 A1 | 3/2015 |

OTHER PUBLICATIONS

International Search Report dated Sep. 29, 2015, issued in counterpart International Application No. PCT/JP2015/071323 (3 pages).
Decision to Grant a Patent dated Feb. 26, 2016, issued in counterpart Japanese Patent Application No. 2015-560121, w/English translation.
Non Final Office Action dated Oct. 19, 2017, issued in U.S. Appl. No. 15/320,974.
Non Final Office Action dated Jun. 19, 2017, issued in US. Appl. No. 15/320,974.
International Search Report dated Nov. 18, 2014, issued in counterpart Application No. PCT/JP2014/071903.
Non Final Office Action dated Feb. 9, 2018, issued in U.S. Appl. No. 14/912,262.
International Search Report dated Oct. 7, 2014, issued in counterpart Application No. PCT/JP2014/068784.
Non Final Office Action dated Aug. 12, 2016, issued in U.S. Appl. No. 14/904,226.
Notice of Allowance dated Jan. 17, 2017, issued in U.S. Appl. No. 14/904,226.
International Search Report dated Oct. 7, 2014, issued in counterpart Application No. PCT/JP2014/072633.
Non Final Office Action dated Jul. 6, 2016, issued in U.S. Appl. No. 14/907,034.
Notice of Allowance dated Oct. 12, 2016, issued in U.S. Appl. No. 14/907,034.
Kuchar, Miroslav, et al., "Use of QSAR in Design of Antiinflammatory Fluorinated Arylalkanoic Acids", Collection of Czechoslovak Chemical Communications, 1990, vol. 55, No. 1, pp. 296-306.
Resistry(stn) [Online], Oct. 3, 2011 (Oct. 3, 2011), (retrieval date: Mar. 11, 2013 (Mar. 11, 2013)) CAS resistration No. 1334226-61-7.

\* cited by examiner

NEMATIC LIQUID CRYSTAL COMPOSITION

TECHNICAL FIELD

The present invention relates to a nematic liquid crystal composition that is useful as an electro-optical liquid crystal display material arid exhibits a positive value of dielectric anisotropy ($\Delta\varepsilon$).

BACKGROUND ART

A liquid crystal display element is used for various measuring equipment, panels for an automobile, word processors, electronic notebooks, printers, computers, televisions, timepieces, advertisement display boards, and the like, as well as timepieces and electronic calculators. As a liquid crystal display mode, representative examples thereof include a Twisted Nematic (TN) mode, a Super Twisted Nematic (STN) mode, and a VA mode that is characterized in a vertical alignment or an In-Plane Switching (IPS) mode/Fringe Field Switching (FFS) mode that is characterized in a horizontal alignment, which uses a Thin Film Transistor (TFT). A liquid crystal composition used for this liquid crystal display element is required to be stable against external factors such as moisture, air, heat, and light; exhibit a liquid crystal phase in a wide temperature range as much as possible, which is around room temperature; and have low viscosity and low driving voltage. Furthermore, the liquid crystal composition is composed of several or tens of types of compounds, in order to obtain an optimal dielectric anisotropy ($\Delta\varepsilon$) and/or an optimal value of refractive index anisotropy ($\Delta n$) or the like when applied to respective display elements.

In a vertical alignment mode display, a liquid crystal composition having negative $\Delta\varepsilon$ is used, and in a horizontal alignment mode display such as a TN mode, a STN mode or an IPS mode, a liquid crystal composition having positive $\Delta\varepsilon$ is used. In recent years, a driving mode has been reported, in which a liquid crystal composition having positive $\Delta\varepsilon$ is vertically aligned in the absence of applied voltage, and a horizontal electric field is applied similarly to an IPS mode/FFS mode. Since it is estimated that the liquid crystal display element using this driving mode will further grow later on as a small and medium-sized display such as a smart phone, necessity of the liquid crystal composition having positive $\Delta\varepsilon$ is further increased.

Meanwhile, in all of the driving modes, in the case where the liquid crystal display element is applied to a television, or the like, a high response speed is important and accordingly, in the liquid crystal composition for a display element, a response speed is required to be improved and a liquid crystal composition having a higher $\Delta n$ and a lower viscosity, as compared with the current composition, is demanded. Also, from the viewpoint of adjusting $\Delta n \times d$, which is a product of $\Delta n$ and a cell gap (d), to a predetermined value, it is necessary to adjust $\Delta n$ of the liquid crystal composition within an appropriate range depending on a cell gap. However, in a display such as a FFS mode, a liquid crystal composition having further higher $\Delta n$ is required because of a reduction in the gap, and therefore, a high response speed is further demanded. Moreover, in particular, a wide operation temperature range is demanded for the use of a mobile phone. That is, the liquid crystal composition is required to exhibit a high refractive index anisotropy ($\Delta n$) and a high temperature for transition from a nematic phase to an isotropic liquid phase ($T_{ni}$) while having a relatively low viscosity.

In the related art, as a constituent component of the liquid crystal composition, for example, compounds represented by General Formulas (A) to (C) are used in combination to achieve an increase of $\Delta n$ (PTL 1 and PTL 2).

[Chem. 1]

(A)

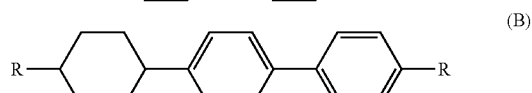

(B)

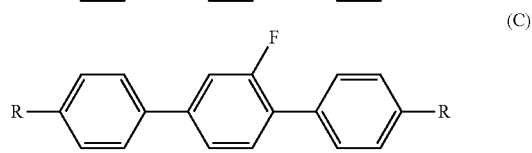

(C)

R represents an alkyl group or an alkenyl group.

However, the compound of General Formula (A) has a low $T_{ni}$, which is lower and higher of 0° C., the compound of General Formula (B) has a relatively high $T_{ni}$, which is lower and higher of 160° C., but insufficient compatibility, and the compound of General Formula (C) has high $\Delta n$, which is before and after 0.24, but deteriorated compatibility, and has a $T_{ni}$ of around 120° C. As a component configuring the liquid crystal composition having a wide nematic temperature range, the physical property values are not sufficient.

CITATION LIST

Patent Literature
[PTL 1] JP-T-2007-526931
[PTL 2] JP-A-2003-261873

SUMMARY OF INVENTION

Technical Problem

An object of the present invention is to provide a liquid crystal composition which has high refractive index anisotropy ($\Delta n$) and sufficiently low viscosity ($\eta$), achieves a wide nematic phase temperature range by suppressing a decrease in temperature for transition from a nematic phase to an isotropic liquid phase ($T_{ni}$), exhibits high compatibility, and has a high response speed and excellent reliability when the liquid crystal composition of the present invention is used in a liquid crystal display element.

Solution to Problem

The present inventors have reviewed a variety of fluorobenzene derivatives and found out that the problem can be solved by using specific compounds in combination, thereby completing the present invention.

The present invention provides a liquid crystal composition including at least one compound represented by General Formula (1), at least one compound represented by General Formula (2), and at least one compound represented by General Formula (LC1), and further provides a liquid crystal display element using the liquid crystal composition.

[Chem. 2]

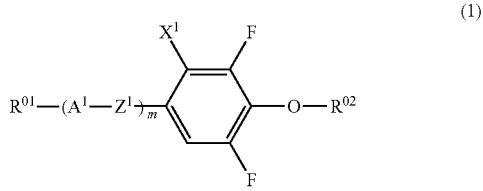

(1)

In the formula, $R^{01}$ represents an alkyl group having 1 to 15 carbon atoms or an alkenyl group having 2 to 15 carbon atoms, and one —$CH_2$— or two or more —$CH_2$— in these groups may be substituted with —O—, —S—, —COO—, —OCO—, or —CO— as long as an oxygen atom is not directly adjacent to another oxygen atom, and at least one hydrogen atom present in these groups may be substituted with a fluorine atom;

$R^{02}$ represents an alkenyl group having 2 to 15 carbon atoms, one —$CH_2$— or two or more —$CH_2$— present in the alkenyl group may be substituted with —O—, —S—, —COO—, —OCO—, or —CO— as long as an oxygen atom is not directly adjacent to another oxygen atom, and at least one hydrogen atom present in the alkenyl group may be substituted with a fluorine atom;

$A^1$ is a group selected from the group consisting of (a) 1,4-cyclohexylene group in which one —$CH_2$— or two or more —$CH_2$— non-adjacent to each other present in this group may be substituted with —O— or —S—, (b) 1,4-phenylene group in which one —CH= or two or more —CH= non-adjacent to each other present in this group may be substituted with —N= and at least one hydrogen atom present in this group may be substituted with a fluorine atom, and (c) naphthalene-2,6-diyl group in which one —CH= or two or more —CH= non-adjacent to each other present in this group may be substituted with —N= and at least one hydrogen atom present in this group may be substituted with a fluorine atom;

$Z^1$ represents —$CH_2O$—, —$OCH_2$—, —$CF_2O$—, —$OCF_2$—, —COO—, —OCO—, —$CH_2CH_2$—, —$CF_2CF_2$—, —CH=CH—, —CF=CF—, —C≡C—, or a single bond;

$X^1$ represents a hydrogen atom, a fluorine atom, or a chlorine atom; and m represents 1 to 4, in the case where m is 2 to 4 and plural $A^1$'s are present, the plural $A^1$'s may be the same as or different from each other, and in the case where m is 2 to 4 and plural $Z^1$'s are present, the plural $Z^1$'s may be the same as or different from each other.

[Chem. 3]

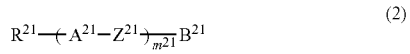

(2)

In the formula, $R^{21}$ represents an alkyl group having 1 to 15 carbon atoms or an alkenyl group having 2 to 15 carbon atoms, and one —$CH_2$— or two or more —$CH_2$— non-adjacent to each other present in these groups may be substituted with —O—, —S—, —COO—, —OCO—, or —CO—, and at least one hydrogen atom present in these groups may be substituted with a fluorine atom;

$A^{21}$ is a group selected from the group consisting of (a) 1,4-cyclohexylene group in which one —$CH_2$— or two or more —$CH_2$— non-adjacent to each other present in this group may be substituted with —O— or —S—, (b) 1,4-phenylene group in which one —CH= or two or more —CH= non-adjacent to each other present in this group may be substituted with —N= and at least one hydrogen atom present in this group may be substituted with a fluorine atom, and (c) naphthalene-2,6-diyl group in which one —CH= or two or more —CH= non-adjacent to each other present in this group may be substituted with —N= and at least one hydrogen atom present in this group may be substituted with a fluorine atom; and $B^{21}$ is a compound represented by either of the following structures.

[Chem. 4]

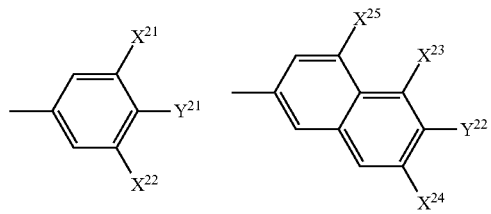

In the structures, $X^{21}$, $X^{22}$, $X^{23}$, $X^{24}$, and $X^{25}$ each independently represents a hydrogen atom, a fluorine atom, or a chlorine atom and $Y^{21}$ and $Y^{22}$ each independently represents a halogen atom, a cyano group, a halogenated alkyl group having 1 to 5 carbon atoms, or a halogenated alkoxy group having 1 to 5 carbon atoms;

$Z^{21}$ represents —$CH_2O$—, —$OCH_2$—, —$CF_2O$—, —$OCF_2$—, —OCO—, —OCO—, —$CH_2CH_2$—, —$CF_2CF_2$—, —CH=CH—, —CF=CF—, —C≡C—, or a single bond; and $m^{21}$ represents 1, 2, or 3, in the case where $m^{21}$ is 2 or 3 and plural $A^{21}$'s are present, the plural $A^{21}$'s may be the same as or different from each other, and in the case where $m^{21}$ is 2 or 3 and plural $Z^{21}$'s are present, the plural $Z^{21}$'s may be the same as or different from each other.

[Chem. 5]

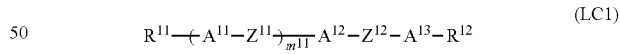

(LC1)

In the formula, $R^{11}$ and $R^{12}$ each independently represents an alkyl group having 1 to 15 carbon atoms, and one —$CH_2$— or two or more —$CH_2$— in the alkyl group may be substituted with —O—, —CH=CH—, —CO—, —OCO—, —COO—, —C≡C—, —$CF_2O$—, or —$OCF_2$— as long as an oxygen atom is not directly adjacent to another oxygen atom, and one or more hydrogen atoms in the alkyl group may be substituted with a halogen atom;

$A^{11}$ to $A^{13}$ each independently is a group selected from the group consisting of (a) 1,4-cyclohexylene group in which one —$CH_2$— or two or more —$CH_2$— non-adjacent to each other present in this group may be substituted with —O— or —S—, (b) 1,4-phenylene group in which one —CH= or two or more —CH= non-adjacent to each other present in this group may be substituted with —N= and at least one hydrogen atom present in this group may be substituted with a fluorine atom, and (c) naphthalene-2,6-diyl group in which one —CH= or two or more —CH= non-adjacent to each other present in this group may be substituted with —N= and at least one hydrogen atom present in this group may be substituted with a fluorine atom;

$Z^{11}$ and $Z^{12}$ each independently represents a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—; and $m^{11}$ represents 0, 1, or 2, in the case where $m^{11}$ is 2 and plural $A^{11}$'s are present, the plural $A^{11}$'s may be the same as or different from each other, and in the case where $m^{11}$ is 2 and plural $Z^{11}$'s are present, the plural $Z^{11}$'s may be the same as or different from each other, with the proviso that the compound represented by General Formula (1) is excluded.

Advantageous Effects of Invention

The liquid crystal composition of the present invention has high refractive index anisotropy (Δn), low viscosity (η), low rotational viscosity (γ$_1$), and excellent crystallinity, and exhibits a stable liquid crystal phase in a wide temperature range. In addition, since the liquid crystal composition of the present invention is chemically stable with respect to heat, light, and water, and has satisfactory solubility, the phase at low temperature is satisfactorily stable. By using the liquid crystal composition of the present invention in a liquid crystal display element, it is possible to obtain a liquid crystal display element having a high response speed and high practical reliability.

DESCRIPTION OF EMBODIMENTS

The liquid crystal composition of the present invention includes at least one compound represented by General Formula (1), at least one compound represented by General Formula (2), and at least one compound represented by General Formula (LC1).

General Formula (1):

[Chem. 6]

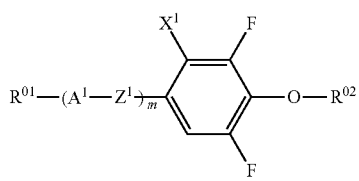

(1)

In order to decrease the viscosity, $R^{01}$ is preferably an alkyl group having 1 to 8 carbon atoms or an alkenyl group having 2 to 8 carbon atoms, and particularly preferably an alkyl group having 1 to 5 carbon atoms or an alkenyl group having 2 to 5 carbon atoms. Also, $R^{01}$ is preferably linear. In the case where $R^1$ is an alkenyl group, $R^1$ is preferably selected from the group represented by any one of Formula (R1) to Formula (R5). (A black point in each formula represents a point linking to a ring.) In the case where $A^1$ which is linked to $R^1$ is a trans-1,4-cyclohexylene group, $R^{01}$ preferably represents an alkenyl group of the trans-1,4-cyclohexylene group, and further preferably represents Formula (R1), Formula (R2), or Formula (R4).

[Chem. 7]

 (R1)

 (R2)

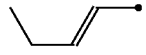 (R3)

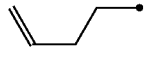 (R4)

 (R5)

In order to decrease the viscosity, $R^{02}$ is preferably an alkenyl group having 2 to 8 carbon atoms, more preferably an alkenyl group having 2 to 6 carbon atoms, preferably an alkenyl group having 2 to 5 carbon atoms, and it is preferred that the group represented by —O—$R^{02}$ is selected from the groups represented by Formula (R6).

[Chem. 8]

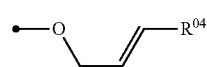 (R6)

In the formula, $R^{04}$ represents a hydrogen atom or an alkyl group having 1 to 3 carbon atoms, one —CH$_2$— or two or more —CH$_2$— non-adjacent to each other present in these groups may be substituted with —O—, —COO—, —OCO—, or —CO—, at least one hydrogen atom present in these groups may be substituted with a fluorine atom, and a black point in each formula represents a point linking to a ring.

The following groups where $R^{04}$ is a hydrogen atom or a methyl group are more preferable.

[Chem. 9]

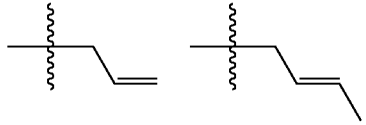

In order to decrease the viscosity, $A^1$ each is independently preferably represents a trans-1,4-cyclohexylene group, an unsubstituted naphthalene-2,6-diyl group, or an unsubstituted 1,4-phenylene group, and more preferably a trans-1,4-cyclohexylene group. In order to improve the miscibility with other liquid crystal components, the following groups:

[Chem. 10]

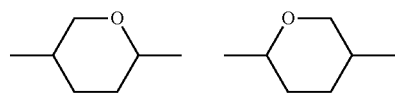

-continued

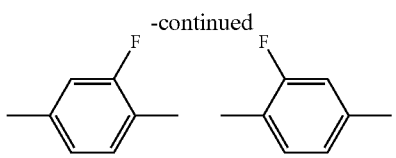

are preferable as $A^1$.

In addition, in order to increase the Δn, $A^1$ each is independently preferably a 1,4-phenylene group or a naphthalene-2,6-diyl group. In all of the ring structures in the compound, it is preferred that the abundance ratio of the 1,4-phenylene group and naphthalene-2,6-diyl group is relatively high, and it is more preferred that the abundance ratio of the 1,4-phenylene group is relatively high. In the case of putting importance on Δn, the abundance ratio of the 1,4-phenylene group and naphthalene-2,6-diyl group is preferably increased to fall within the preferable range, but is adjusted depending on a balance of viscosity and miscibility with other liquid crystal components. Specifically, in the case where m represents 1, $A^1$ is preferably a trans-1,4-cyclohexylene group, a 1,4-phenylene group, or a naphthalene-2,6-diyl group, and in order to further increase the ratio, $A^1$ preferably represents a 1,4-phenylene group or a naphthalene-2,6-diyl group, and more preferably represents a 1,4-phenylene group. In the case where m represents 2, at least one of $A^1$'s is preferably a 1,4-phenylene group or a naphthalene-2,6-diyl group, and in order to further increase the ratio, $A^1$ each is independently preferably a 1,4-phenylene group or a naphthalene-2,6-diyl group, and more preferably a 1,4-phenylene group. In the case where m represents 3 or 4, at least one of $A^1$'s is preferably a 1,4-phenylene group or a naphthalene-2,6-diyl group, and in order to further increase the ratio, at least two of $A^1$'s are preferably a 1,4-phenylene group or a naphthalene-2,6-diyl group and more preferably a 1,4-phenylene group.

In order to decrease the viscosity, $Z^1$ is preferably —CH₂O—, —OCH₂—, —CF₂O—, —OCF₂—, —CF=CF—, —C≡C—, or a single bond, more preferably —CF₂O—, —OCF₂—, —CH₂CH₂—, or a single bond, and particularly preferably a single bond, and in order to increase the $T_{→i}$, $Z^1$ is preferably —C≡C— or a single bond.

In the case of putting importance on viscosity, $X^1$ is preferably a hydrogen atom, and in the case of putting importance on miscibility with other liquid crystal components, $X^1$ is preferably a fluorine atom.

In the case of putting importance on viscosity, m is preferably 1 or 2, and in the case of putting importance on the Tni, m is preferably 3 or 4. In order to increase the miscibility with the liquid crystal composition, m is preferably 2 or 3.

As a compound having high Δn and an excellent balance of viscosity and miscibility with other liquid crystal components, the compound represented by General Formula (1) is preferably a compound represented by General Formula (1-1).

[Chem. 11]

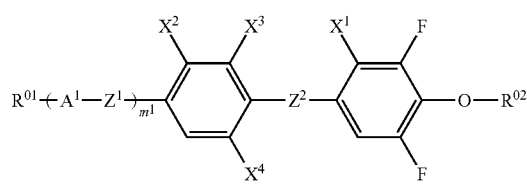

(1-1)

In the formula, $R^{01}$, $R^{02}$, $A^1$, $Z^1$, and $X^1$ have the same meaning as $R^{01}$, $R^{02}$, $A^1$, $Z^1$, and $X^1$ in General Formula (1), respectively;

$Z^2$ represents —CH₂O—, —OCH₂—, —CF₂O—, —OCF₂—, —COO—, —OCO—, —CH₂CH₂—, —CF₂CF₂—, —CH=CH—, —CF=CF—, —C≡C—, or a single bond;

$X^2$, $X^3$, and $X^4$ each independently represents a hydrogen atom, a fluorine atom, or a chlorine atom; and $m^1$ represents 0, 1, 2, or 3, in the case where $m^1$ is 2 or 3 and plural $A^1$'s are present, the plural $A^1$'s may be the same as or different from each other, and in the case where $m^1$ is 2 or 3 and plural $Z^1$'s are present, the plural $Z^1$'s may be the same as or different from each other.

Furthermore, the compound represented by General Formula (1-1) is preferably a compound represented by General Formula (1-1A).

[Chem. 12]

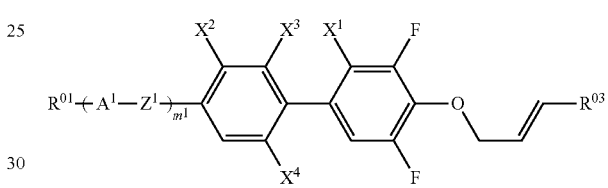

(1-1A)

In the formula, $R^{01}$, $A^1$, $Z^1$, $X^1$, $X^2$, $X^3$, $X^4$, and $m^1$ have the same meaning as $R^1$, $A^1$, $Z^1$, $X^1$, $X^2$, $X^3$, $X^4$, and $m^1$ in General Formula (1-1), respectively; and $R^{03}$ represents a hydrogen atom or an alkyl group having 1 to 3 carbon atoms, one —CH₂— or two or more —CH₂— in the alkyl group may be substituted with —O—, —S—, —COO—, —OCO—, or —CO— as long as an oxygen atom is not directly adjacent to another oxygen atom, and at least one hydrogen atom present in the alkyl group may be substituted with a fluorine atom.

$R^{03}$ more preferably represents a hydrogen atom or a methyl group.

Furthermore, the compounds represented by General Formula (1) or General Formula (1-1) are preferably a compound satisfying at least one of the following matters.

Compound in which m is 2 and plural $Z^1$'s are single bonds

Compound in which $m^{01}$ is 1 and $Z^1$ is a single bond

Compound in which $Z^1$ is a single bond

Compound in which $Z^2$ is a single bond

Compound in which $A^1$ is a 1,4-phenylene group

The liquid crystal compound represented by General Formula (1) is preferably compounds represented by the following General Formula (1-1-1) to General Formula (1-1-49), which are the compound represented by General Formula (1-1) (in the formulas, $R^{01}$, $R^{02}$, and $X^1$ have the same meaning as $R^{01}$, $R^{02}$, and $X^1$ in General Formula (1), respectively). The liquid crystal composition of the present invention preferably contains one or more compounds represented by General Formula (1-1-1) to General Formula (1-1-49), more preferably contains one or more compounds represented by General Formula (1-1-1) to General Formula (1-1-6), General Formula (1-1-9) to General Formula (1-1-14), General Formula (1-1-17) to General Formula (1-1-21), and General Formula (1-1-26) to General Formula (1-1-49), still more preferably contains one or more compounds represented by General Formula (1-1-1) to General Formula (1-1-6), General Formula (1-1-9) to General Formula (1-1-14), and General Formula (1-1-17) to General Formula (1-1-21), and particularly preferably contains one or more compounds represented by General Formula (1-1-9) to General Formula (1-1-12).

[Chem. 13]

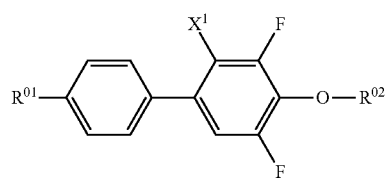 (1-1-1)

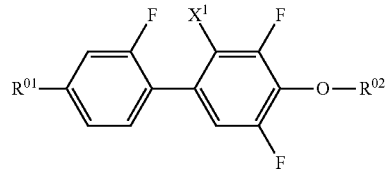 (1-1-2)

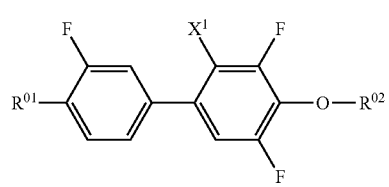 (1-1-3)

[Chem. 14]

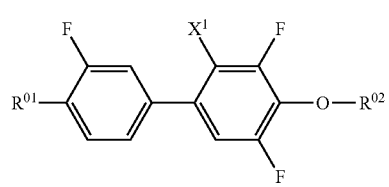 (1-1-4)

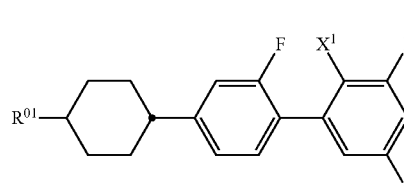 (1-1-5)

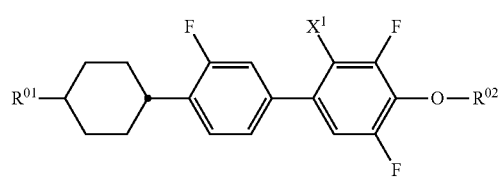 (1-1-6)

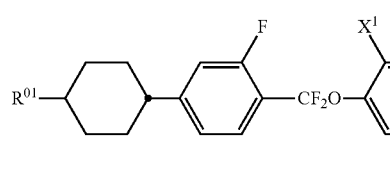 (1-1-7)

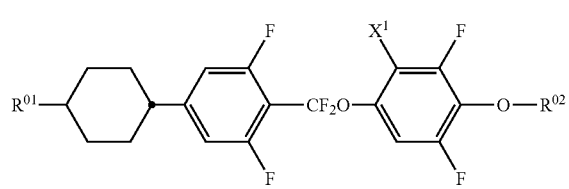 (1-1-8)

[Chem. 15]

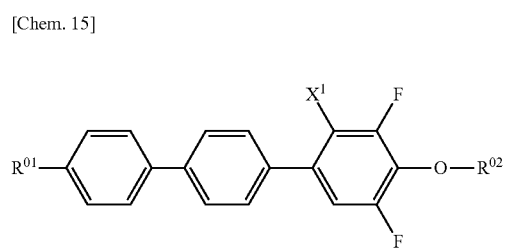 (1-1-9)

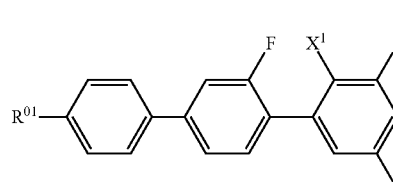 (1-1-10)

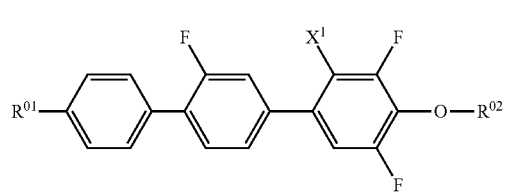 (1-1-11)

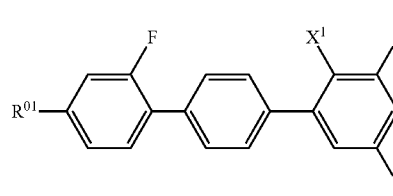 (1-1-12)

-continued
(1-1-13)
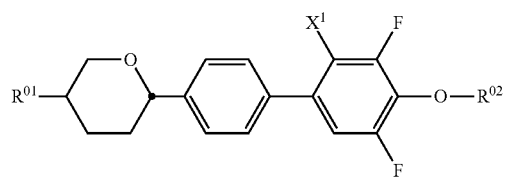
(1-1-14)
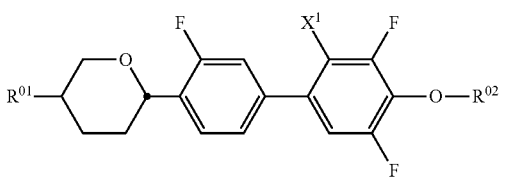
(1-1-15)
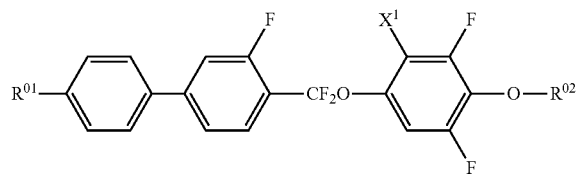
(1-1-16)
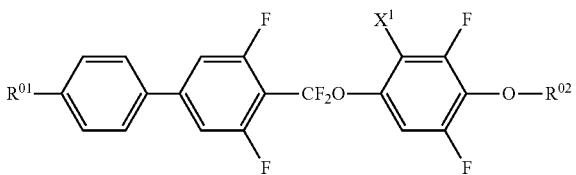
[Chem. 16]
(1-1-17)
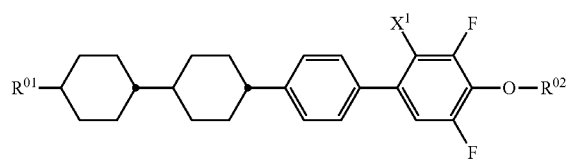
(1-1-18)
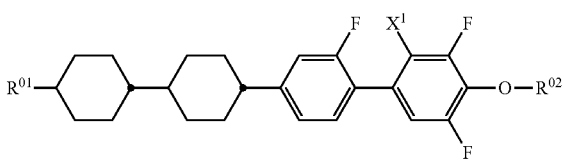
(1-1-19)
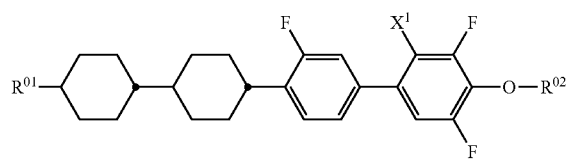
(1-1-20)
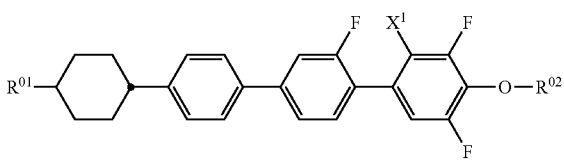
(1-1-21)
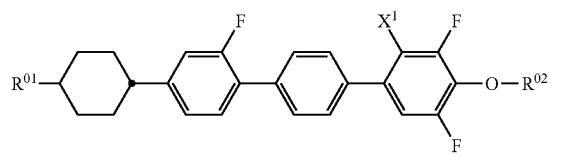
(1-1-22)
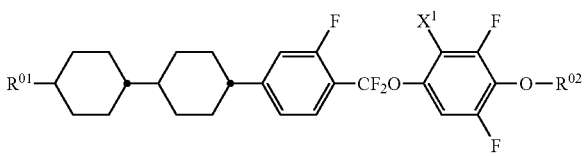
(1-1-23)
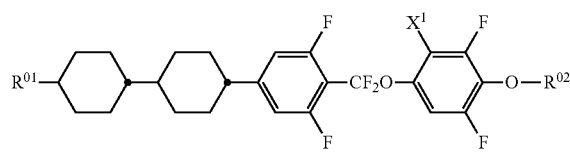
(1-1-24)
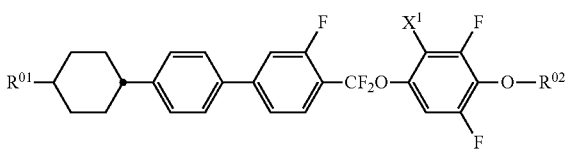
(1-1-25)
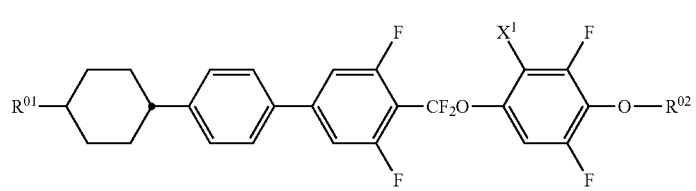
[Chem. 17]
(1-1-26)
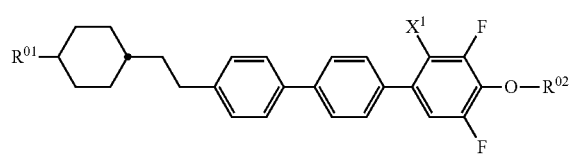
(1-1-27)
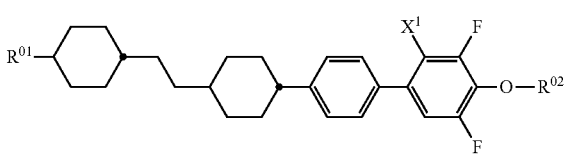

-continued
(1-1-28)
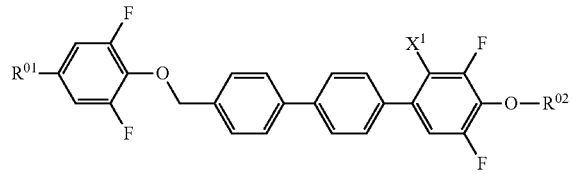
(1-1-29)
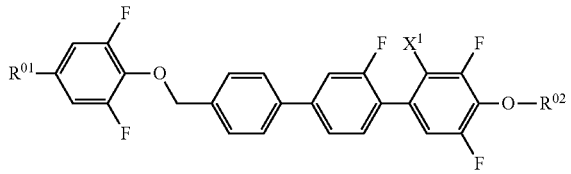
(1-1-30)
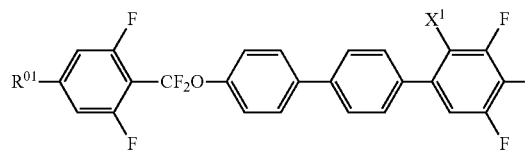
(1-1-31)
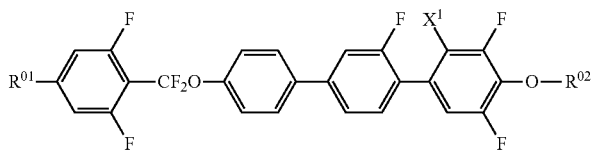
[Chem. 18]
(1-1-32)
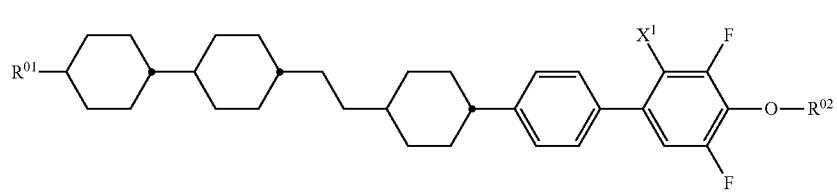
(1-1-33)
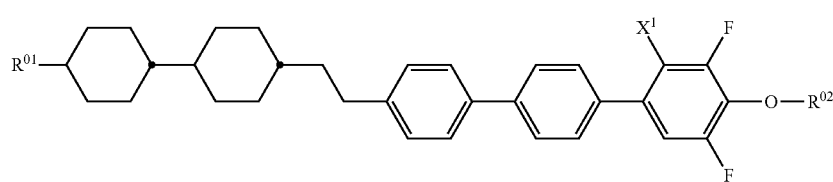
(1-1-34)
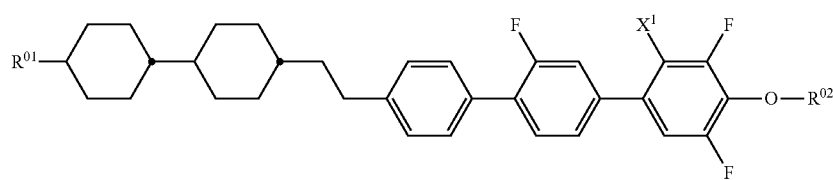
(1-1-35)
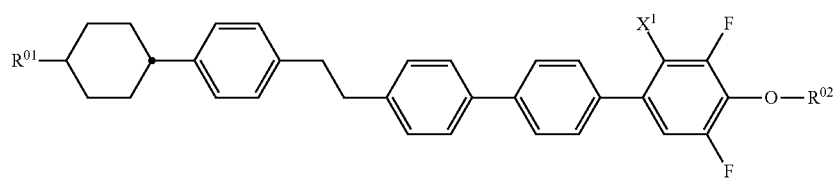
(1-1-36)
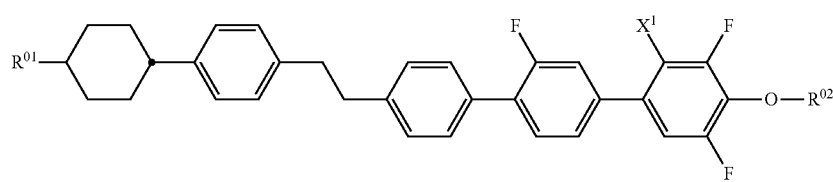
(1-1-37)
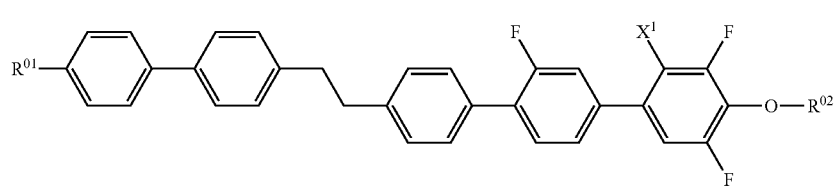

-continued
[Chem. 19]
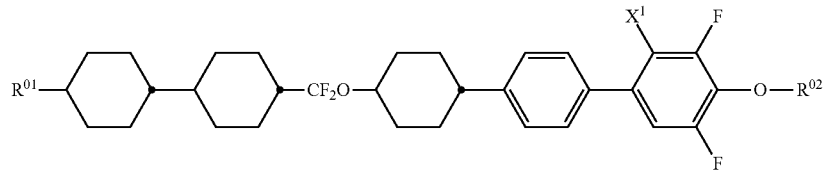
(1-1-38)
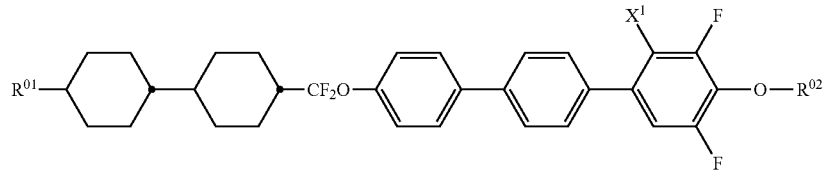
(1-1-39)
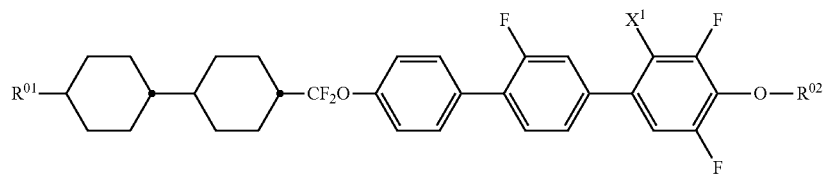
(1-1-40)
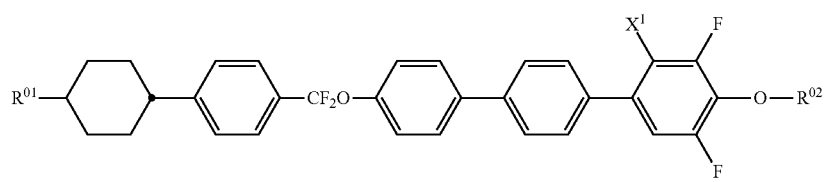
(1-1-41)
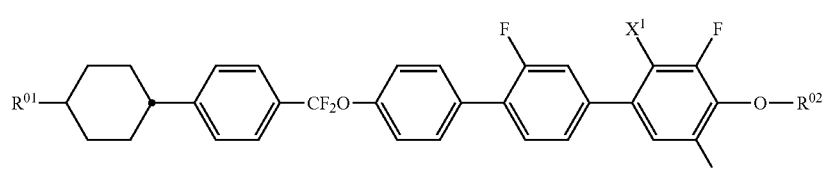
(1-1-42)
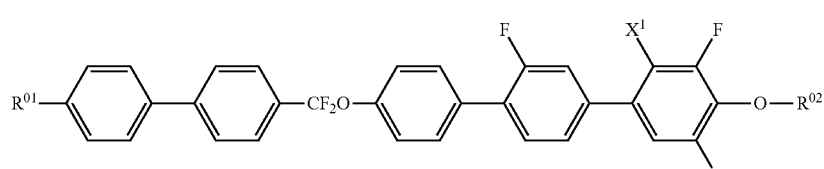
(1-1-43)
[Chem. 20]
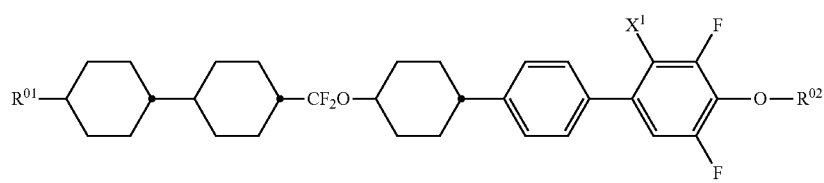
(1-1-44)
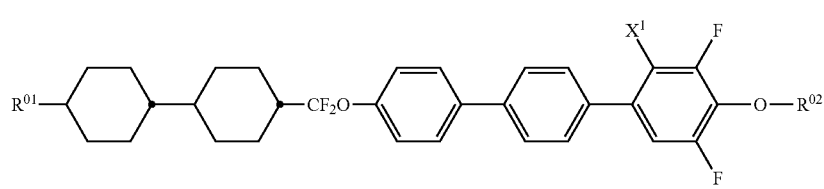
(1-1-45)

(1-1-46)
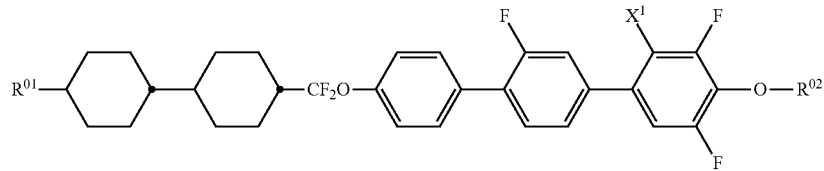

(1-1-47)
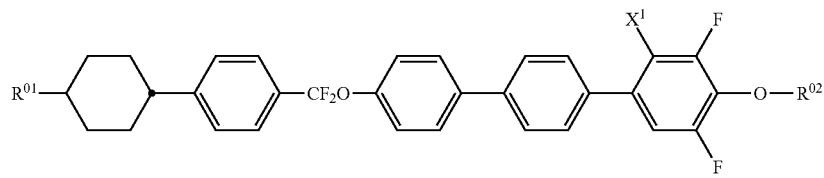

(1-1-48)
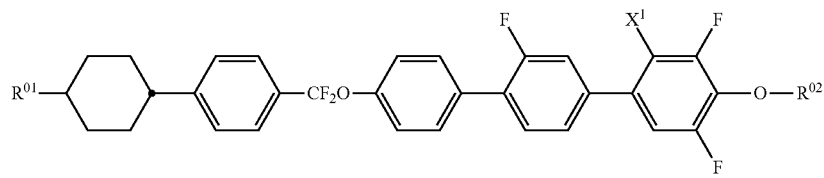

(1-1-49)
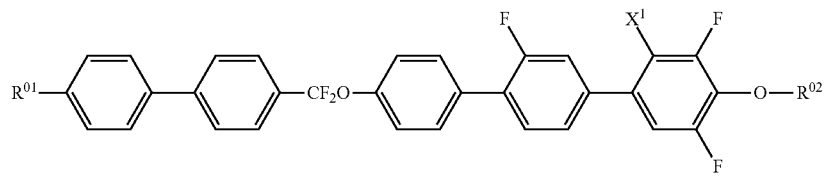

In addition, the liquid crystal compound represented by General Formula (1) is preferably compounds represented by the following General Formula (1-2-1) to General Formula (1-2-7) (In the formulas, $R^{01}$, $R^{02}$, and $X^1$ represent the same meaning as $R^{01}$, $R^{02}$, and $X^1$ in General Formula (1), respectively). The liquid crystal composition of the present invention preferably contains one or more compounds represented by General Formula (1-2-1) to General Formula (1-2-7).

[Chem. 21]

(1-2-1)
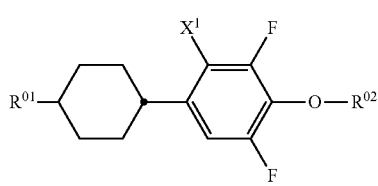

(1-2-2)
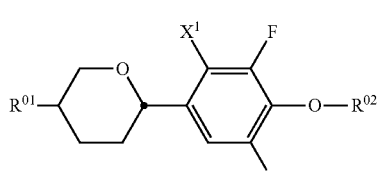

[Chem. 22]

(1-2-3)
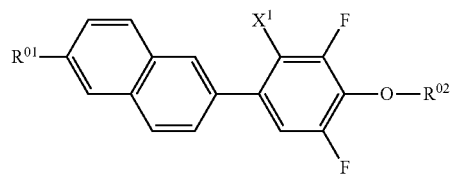

(1-2-4)
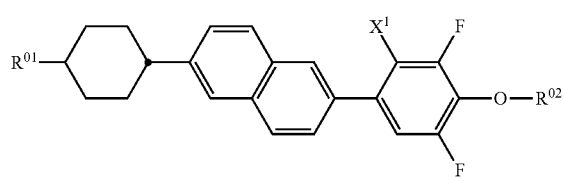

(1-2-5)

-continued

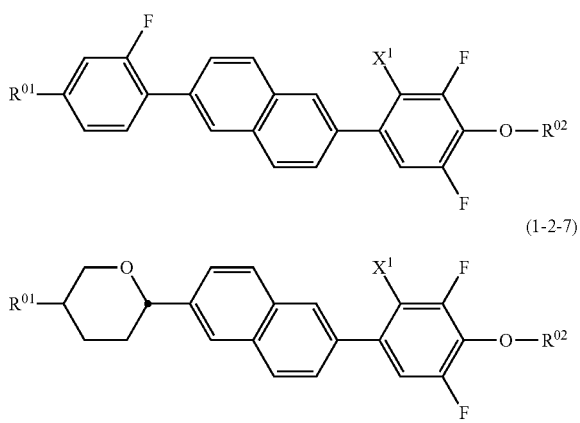

(1-2-6)

(1-2-7)

In the liquid crystal composition of the present invention, the compound represented by General Formula (1) is preferably contained in the amount of 0.1% by mass or more as a lower limit in the composition (the following % in the composition represents % by mass), preferably contained in the amount of 0.3% or more, preferably contained in the amount of 0.5% or more, preferably contained in the amount of 0.8% or more, preferably contained in the amount of 1% or more, preferably contained in the amount of 2% or more, preferably contained in the amount of 3% or more, preferably contained in the amount of 5% or more, preferably contained in the amount of 6% or more, preferably contained in the amount of 7% or more, preferably contained in the amount of 8% or more, preferably contained in the amount of 9% or more, preferably contained in the amount of 10% or more, preferably contained in the amount of 13% or more, preferably contained in the amount of 15% or more, preferably contained in the amount of 18% or more, and preferably contained in the amount of 20% or more. In addition, if the content is large, a problem such as precipitation occurs, and accordingly, as an upper limit, the compound represented by General Formula (1) is preferably contained in the amount of 80% or less, preferably contained in the amount of 70% or less, preferably contained in the amount of 60% or less, preferably contained in the amount of 55% or less, preferably contained in the amount of 50% or less, preferably contained in the amount of 45% or less, preferably contained in the amount of 40% or less, preferably contained in the amount of 38% or less, preferably contained in the amount of 35% or less, preferably contained in the amount of 33% or less, preferably contained in the amount of 32% or less, preferably contained in the amount of 30% or less, preferably contained in the amount of 28% or less, preferably contained in the amount of 25% or less, preferably contained in the amount of 23% or less, preferably contained in the amount of 21% or less, preferably contained in the amount of 20% or less, preferably contained in the amount of 18% or less, and preferably contained in the amount of 15% or less. One type of the compound represented by General Formula (1) may be used alone or two or more types of the compound may be used at the same time.

A liquid crystal compound having an allyl ether group at the terminal has satisfactory properties as a constituent component of the liquid crystal composition, but has a problem in reliability. However, by difluorinating a specific position of a benzene ring having an allyl ether group, the compound represented by General Formula (1) improves reliability, further improves compatibility, and decreases viscosity without impairing original excellent properties of the skeleton. Furthermore, by imparting positive dielectric anisotropy, the compound represented by General Formula (1) is an extremely effective compound as a constituent component of the liquid crystal composition having positive dielectric anisotropy.

Since the compound represented by General Formula (1) has a wide nematic temperature range, large refractive index anisotropy, high solubility, and low viscosity, if the compound represented by General Formula (1) is contained in the liquid crystal composition, the liquid crystal composition is obtained, which has high refractive index anisotropy (Δn) and sufficiently low viscosity (η), achieves a wide nematic phase temperature range by suppressing a decrease in a nematic phase-isotropic liquid phase transition temperature ($T_{ni}$), exhibits high compatibility, and has a high response speed and excellent reliability when the liquid crystal composition is used in a liquid crystal display element. Therefore, in particular, the liquid crystal composition can be appropriately used in a liquid crystal composition for a FFS mode liquid crystal display for mobile phones or cars. In addition, in the case where an alkyl group substituted with a fluorine atom for $R^2$ in General Formula (1) is selected, positive dielectric anisotropy can be imparted, and the compound represented by General Formula (1) can be extremely appropriately used as a component configuring the liquid crystal composition having positive dielectric anisotropy. For example, the compound represented by General Formula (1) exhibits a liquid crystal phase in the range of 40° C. to 110° C. alone, and has Δn of about 0.26, flow viscosity of about 25 mPa·s, which is low, and dielectric anisotropy of about +4, and further has extremely satisfactory compatibility in the case of being used as a component of the liquid crystal composition.

General Formula (2):

[Chem. 23]

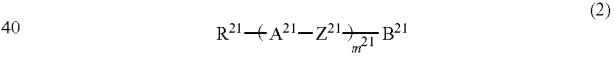
(2)

$R^{21}$ is preferably an alkyl group having 1 to 8 carbon atoms, an alkenyl group having 2 to 8 carbon atoms, or an alkoxy group having 1 to 8 carbon atoms, and is preferably linear. In the case where $R^{21}$ is an alkenyl group, $R^{21}$ is preferably selected from the group represented by any one of Formula (R1) to Formula (R5).

[Chem. 24]

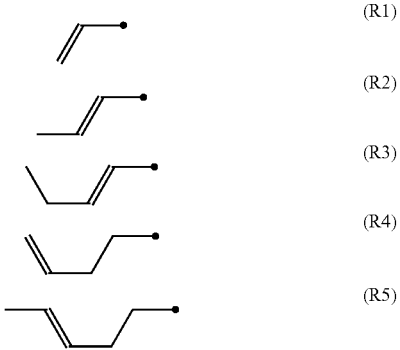

A black point in each formula represents a point linking to a ring.

$A^{21}$ is preferably a trans-1,4-cyclohexylene group, a 1,4-phenylene group, a 3-fluoro-1,4-phenylene group, a 3,5-difluoro-1,4-phenylene group, a tetrahydropyran group, or a 1,3-dioxane-2,5-diyl group.

In order to decrease the viscosity, $B^{21}$ is preferably the following.

[Chem. 25]

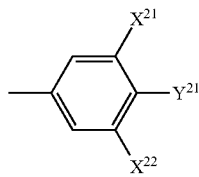

In order to increase the $T_{\to i}$, the following group:

[Chem. 26]

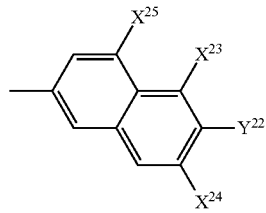

is preferable as $B^{21}$.

$X^{21}$, $X^{22}$, $X^{23}$, $X^{24}$, and $X^{25}$ each independently is preferably a hydrogen atom in order to decrease the viscosity and increase the $T_{\to i}$, and is preferably a fluorine atom in order to increase the $\Delta\varepsilon$.

In the case where $X^{21}$ and $X^{22}$ are each independently a fluorine atom or hydrogen atom, $B^{21}$ preferably represents the following group in order to increase the $\Delta\varepsilon$.

[Chem. 27]

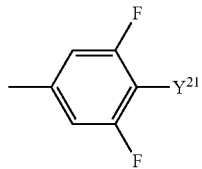

In order to decrease the viscosity, the following group:

[Chem. 28]

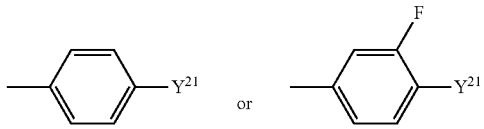

is preferable as $B^{21}$.

In the case where $X^{23}$ to $X^{25}$ each independently represents a fluorine atom or a hydrogen atom, $B^{21}$ preferably represents any of the following groups in order to increase the $\Delta\varepsilon$.

[Chem. 29]

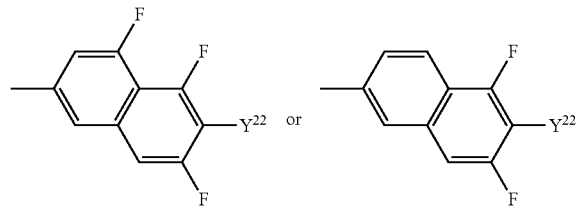

In order to decrease the viscosity, the following group:

[Chem. 30]

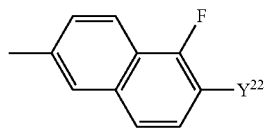

is preferable as $B^{21}$.

$Y^{21}$ and $Y^{22}$ preferably represent a fluorine atom, —$CF_3$, or —$OCF_3$ to thereby improve lower limit temperature of a nematic phase and better operation at low temperature or storage properties of the liquid crystal composition. In order to increase the $\Delta\varepsilon$, $Y^{21}$ and $Y^{22}$ preferably represent a fluorine atom, a cyano group, —$CF_3$, or —$OCF_3$, and in order to decrease the viscosity, $Y^{21}$ and $Y^{22}$ preferably represent a fluorine atom. In consideration of stability of the compound, $Y^{21}$ and $Y^{22}$ preferably represent a fluorine atom, —$CF_3$, or —$OCF_3$.

$B^{21}$ is particularly preferably one selected from the following moiety structures.

[Chem. 31]

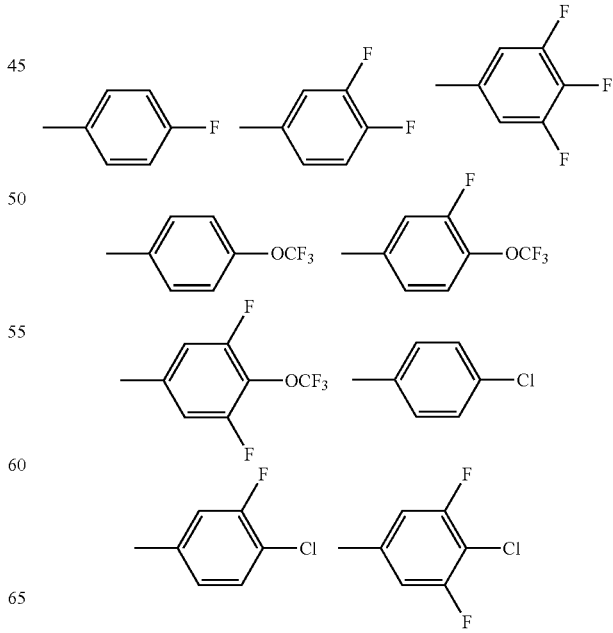

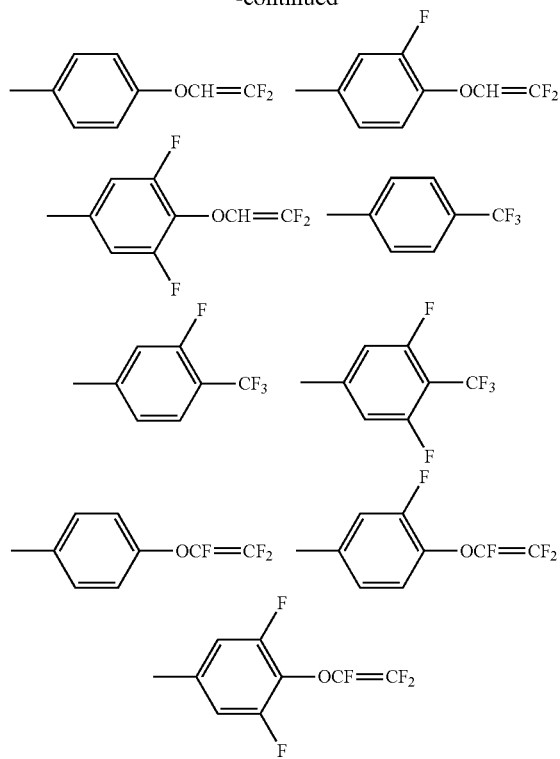

$Z^{21}$ is preferably a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—, and more preferably a single bond, —OCH$_2$—, —CH$_2$O—, —OCF$_2$—, or —CF$_2$O—.

m$^{21}$ preferably represents 2 or 3. In the case where plural A$^{21}$'s and/or Z$^{21}$'s are present, these may be the same as or different from each other.

The compound represented by General Formula (2) preferably contains one or more compounds represented by General Formula (LC2-a).

[Chem. 32]

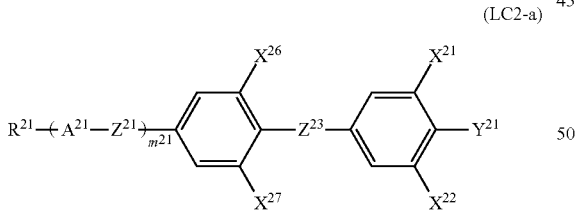

In the formula, X$^{26}$ and X$^{27}$ each independently represents a hydrogen atom or a fluorine atom, Z$^{23}$ represents —OCH$_2$—, —CH$_2$O—, —OCF$_2$—, or —CF$_2$O—, and R$^{21}$, A$^{21}$, Z$^{21}$, X$^{21}$, X$^{22}$, Y$^{21}$, and m$^{21}$ have the same meaning as R$^{21}$, A$^{21}$, Z$^{21}$, X$^{21}$, X$^{22}$, Y$^{21}$, and m$^{21}$ in General Formula (2), respectively.

X$^{26}$ and X$^{27}$ are preferably a fluorine atom, either X$^{26}$ or X$^{27}$ is preferably a fluorine atom, and both of X$^{26}$ and X$^{27}$ are preferably fluorine atoms.

The compound represented by General Formula (LC2-a) preferably contains at least one of the compounds represented by General Formula (LC2-a1) to General Formula (LC2-a12).

[Chem. 33]

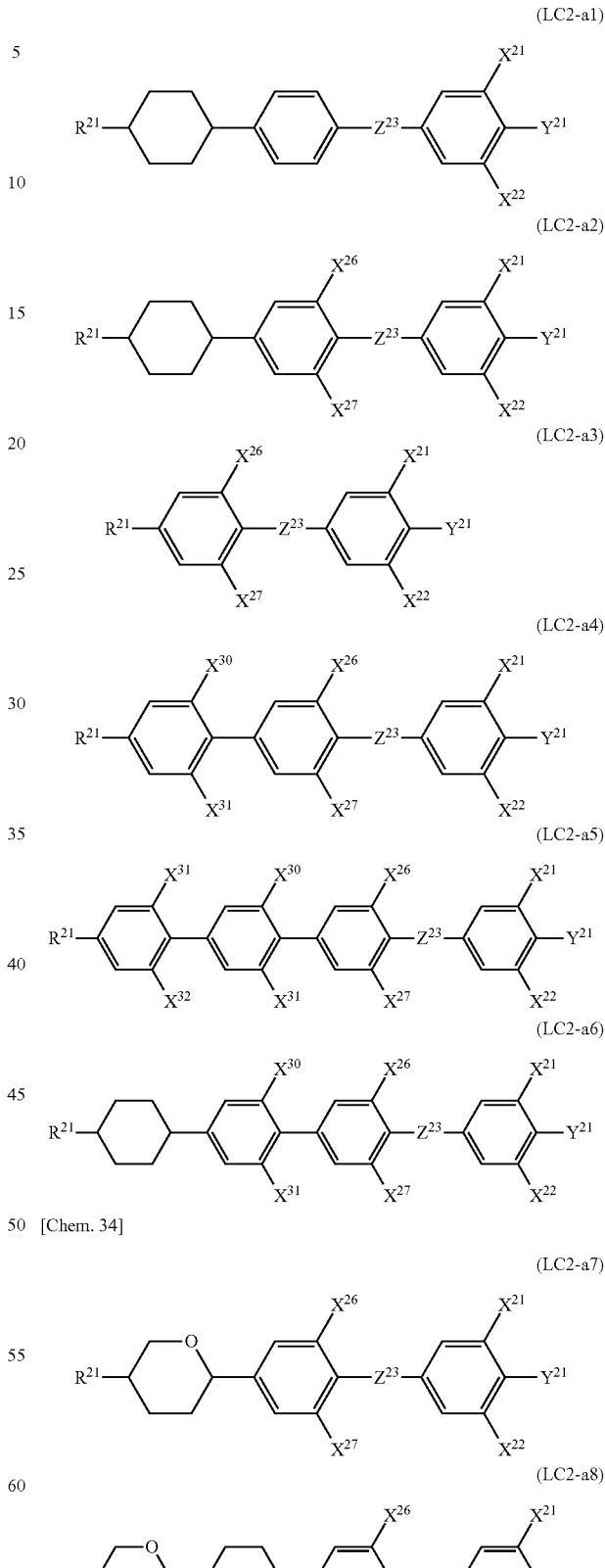

[Chem. 34]

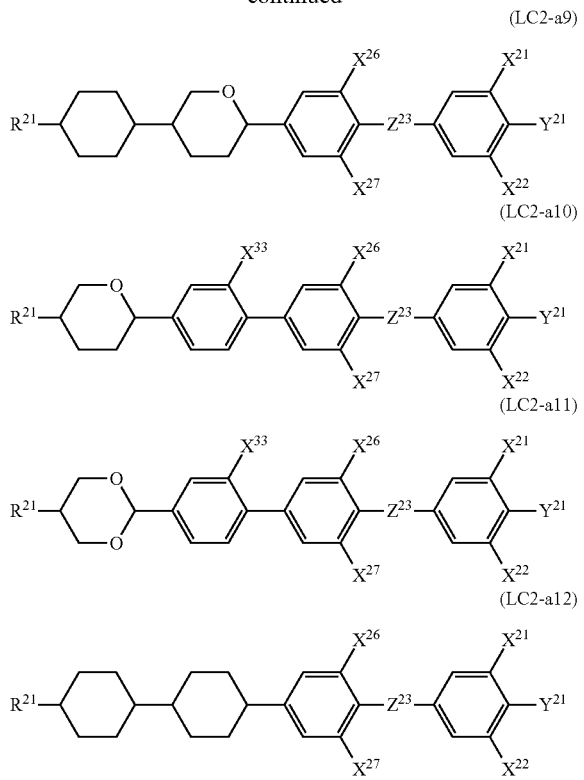

(LC2-a9)

(LC2-a10)

(LC2-a11)

(LC2-a12)

In the formulas, $R^{21}$, $X^{21}$, $X^{22}$, $X^{26}$, $X^{27}$, and $Y^{21}$ represent the same meaning as $R^{21}$, $X^{21}$, $X^{22}$, $X^{26}$, $X^{27}$, and $Y^{21}$ in General Formula (2), respectively, and $X^{30}$, $X^{31}$, $X^{32}$, and $X^{33}$ each independently represents a hydrogen atom or a fluorine atom.

The compound represented by General Formula (LC2-a) more preferably contains at least one of the compounds represented by (LC2-a4) to (LC2-a6), (LC2-a10), and (LC2-a11).

Furthermore, the compound represented by General Formula (2) preferably contains one or more compounds represented by General Formula (LC2-b).

[Chem. 35]

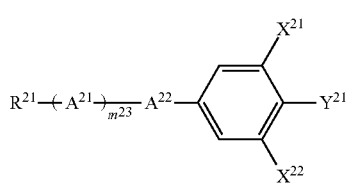

(LC2-b)

In the formula, $A^{22}$ is a group selected from the group consisting of (a) 1,4-cyclohexylene group in which one —CH$_2$— or two or more —CH$_2$— non-adjacent to each other present in this group may be substituted with —O— or —S—, (b) 1,4-phenylene group in which one —CH= or two or more —CH= non-adjacent to each other present in this group may be substituted with —N= and at least one hydrogen atom present in this group may be substituted with a fluorine atom, and (c) naphthalene-2,6-diyl group in which one —CH= or two or more —CH= non-adjacent to each other present in this group may be substituted with —N= and at least one hydrogen atom present in this group may be substituted with a fluorine atom; $m^{23}$ represents 1 or 2; and $R^{21}$, $A^{21}$, $X^{21}$, $X^{22}$, and $Y^{21}$ have the same meaning as $R^{21}$, $A^{21}$, $X^{21}$, $X^{22}$, and $Y^{21}$ in General Formula (2), respectively.

The compound represented by General Formula (LC2-b) preferably contains one or more compounds represented by General Formula (LC2-b1) to General Formula (LC2-b21).

[Chem. 36]

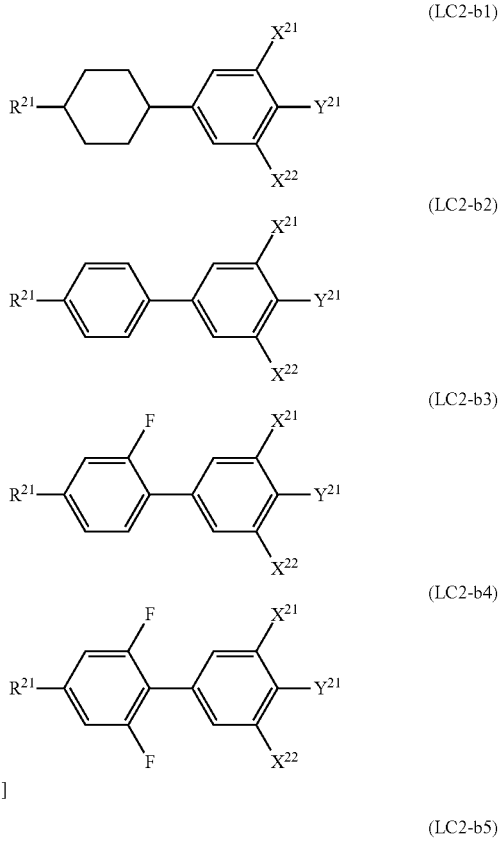

(LC2-b1)

(LC2-b2)

(LC2-b3)

(LC2-b4)

[Chem. 37]

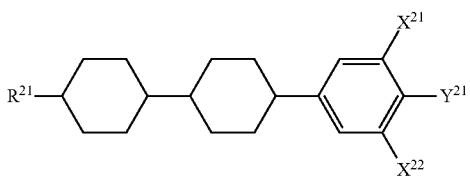

(LC2-b5)

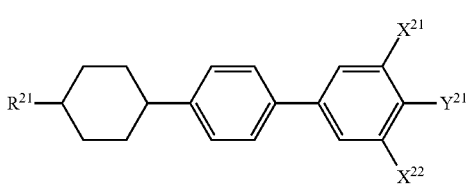

(LC2-b6)

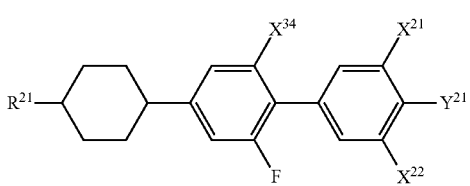

(LC2-b7)

-continued
(LC2-b8)
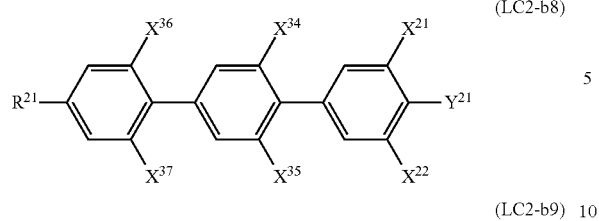
(LC2-b9)
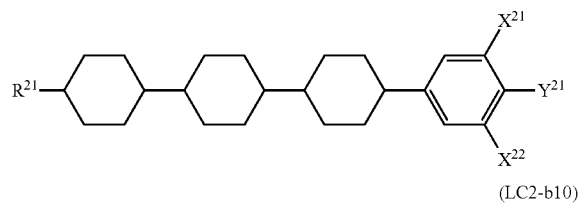
(LC2-b10)
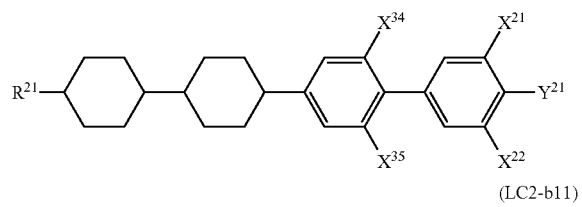
(LC2-b11)
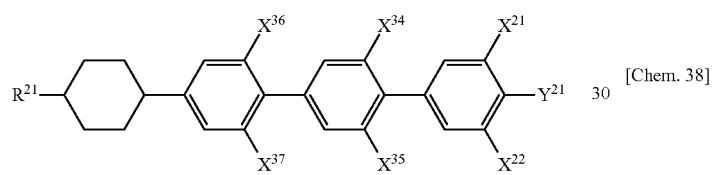
(LC2-b12)
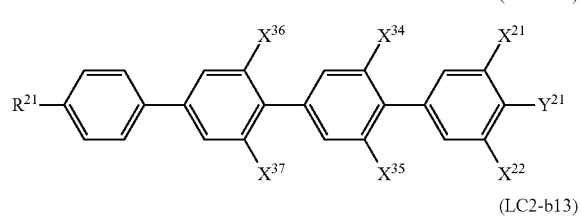
(LC2-b13)
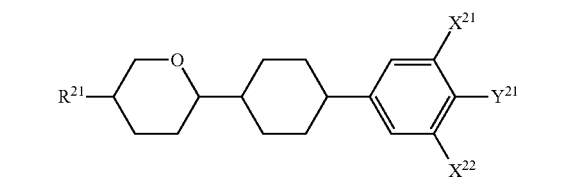
(LC2-b14)
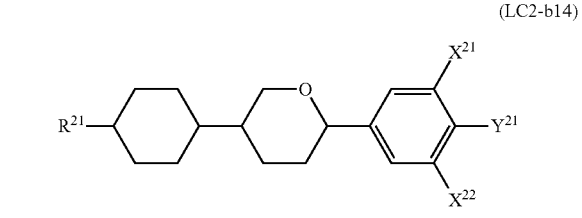
(LC2-b15)
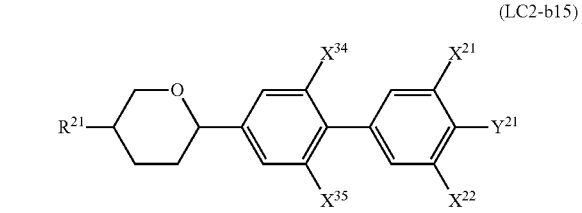
-continued
(LC2-b16)
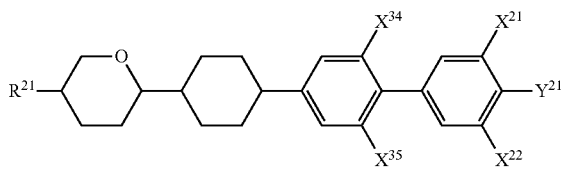
(LC2-b17)
(LC2-b18)
[Chem. 38]
(LC2-b19)
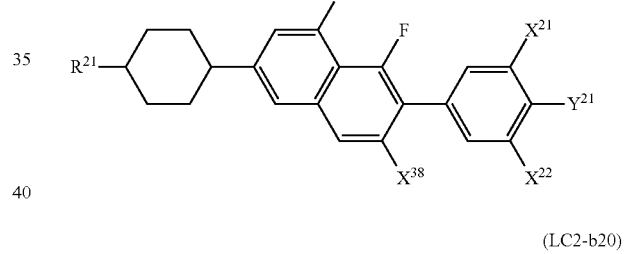
(LC2-b20)
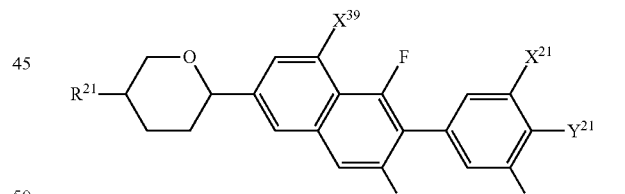
(LC2-b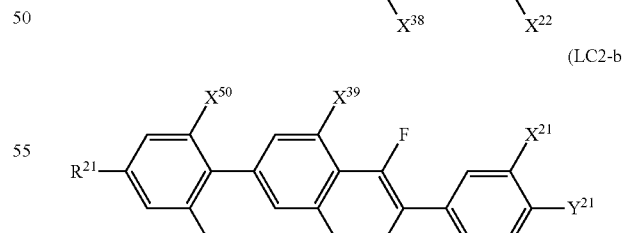
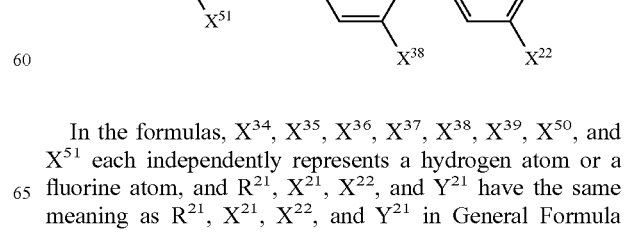
In the formulas, $X^{34}$, $X^{35}$, $X^{36}$, $X^{37}$, $X^{38}$, $X^{39}$, $X^{50}$, and $X^{51}$ each independently represents a hydrogen atom or a fluorine atom, and $R^{21}$, $X^{21}$, $X^{22}$, and $Y^{21}$ have the same meaning as $R^{21}$, $X^{21}$, $X^{22}$, and $Y^{21}$ in General Formula (LC2-b), respectively.

The compound represented by General Formula (LC2-b) more preferably contains one or more compounds represented by General Formula (LC2-b5) to General Formula (LC2-b8), General Formula (LC2-b10) to General Formula (LC2-b12), and General Formula (LC2-b18).

In addition, the compound represented by General Formula (LC2) preferably contains the following compounds other than the compounds of General Formula (LC2-a) and General Formula (LC2-b) and more preferably contains General Formula (LC2-16) and General Formula (LC2-17).

[Chem. 39]

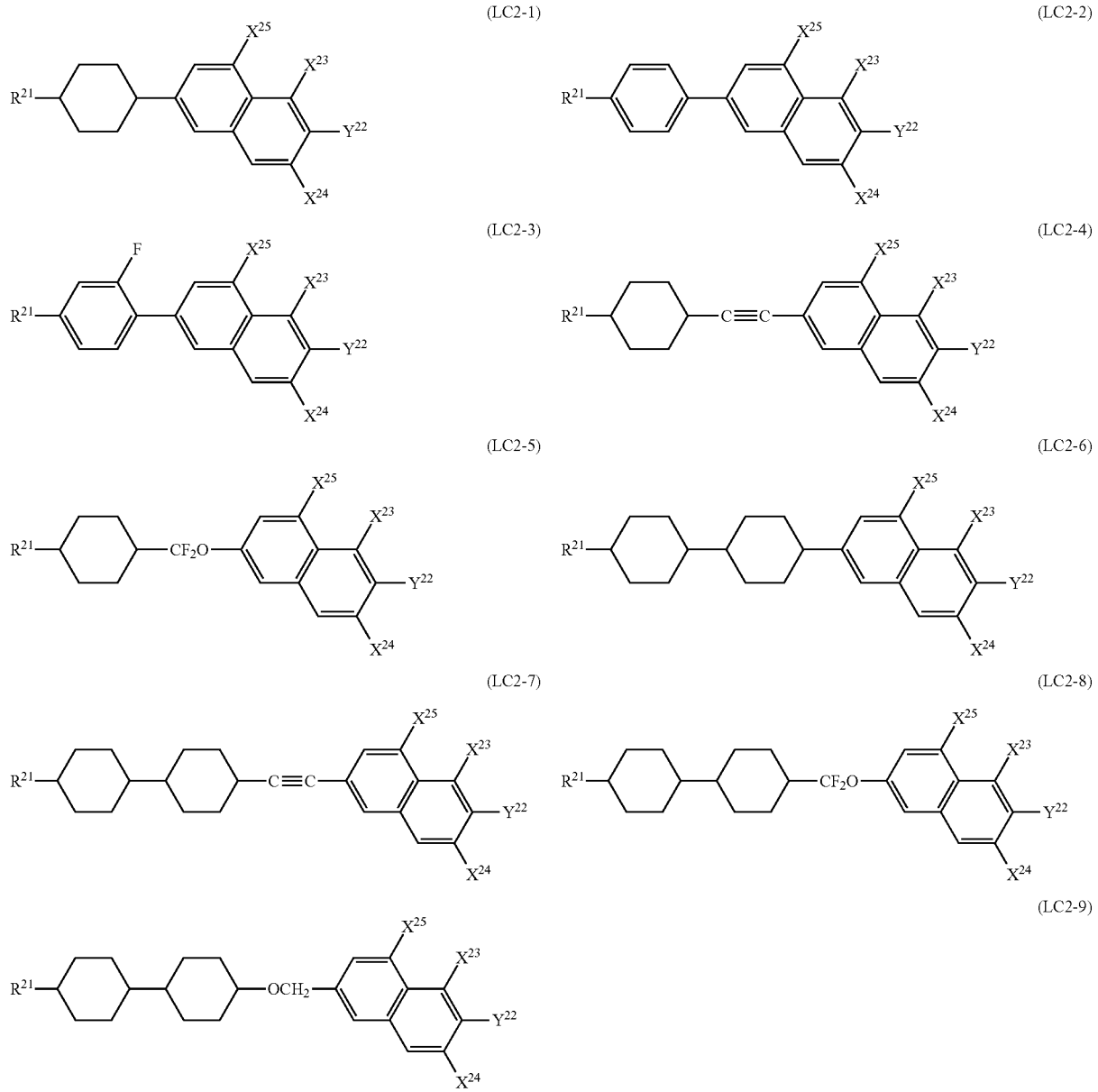

[Chem. 40]

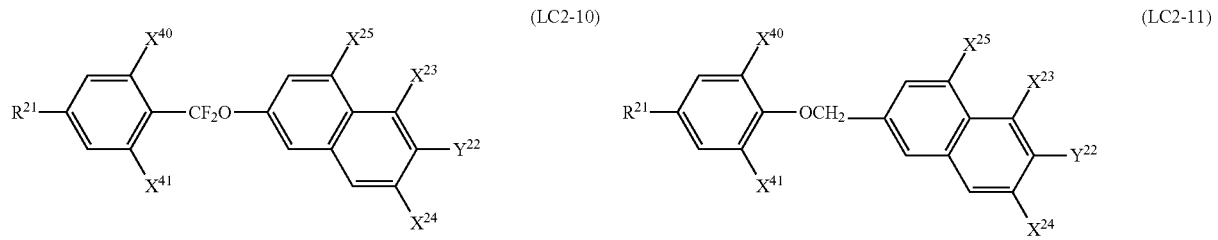

-continued
(LC2-12)
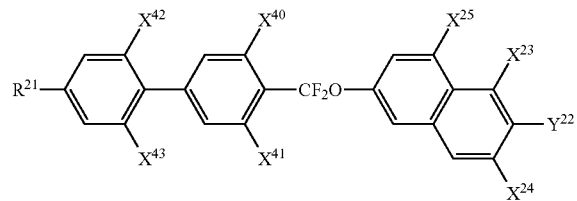
(LC2-13)
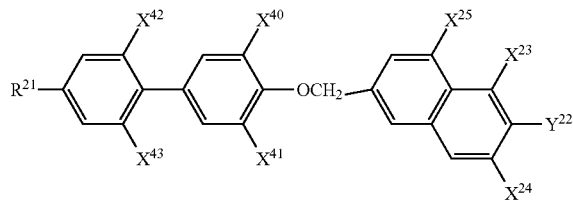
(LC2-14)
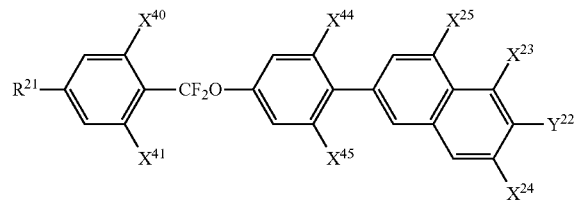
(LC2-15)
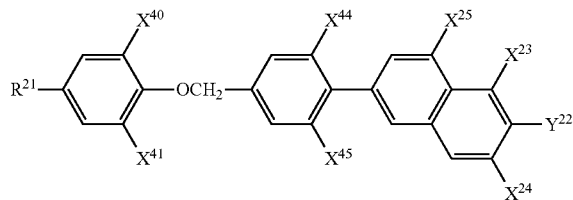
(LC2-16)
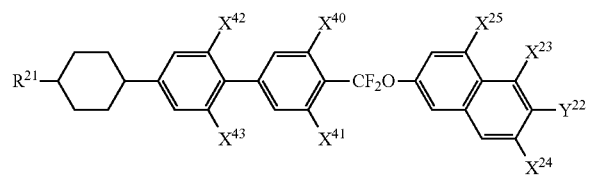
(LC2-17)
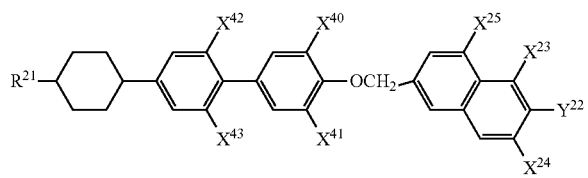
(LC2-18)
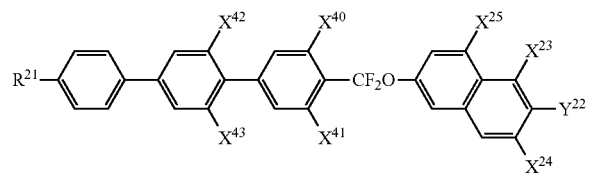
(LC2-19)
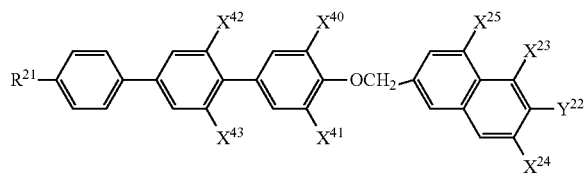
[Chem. 41]
(LC2-16)
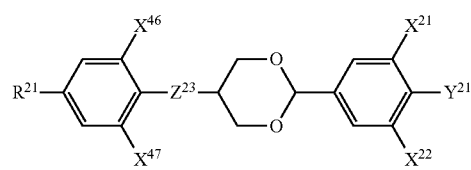
(LC2-17)
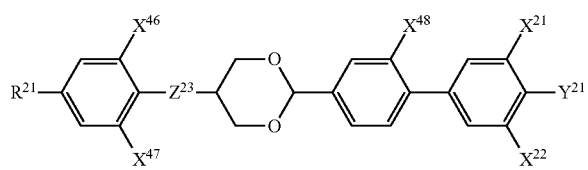
(LC2-18)
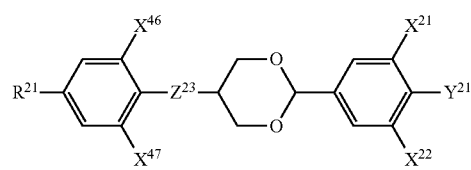
(LC2-19)

-continued (LC2-20)

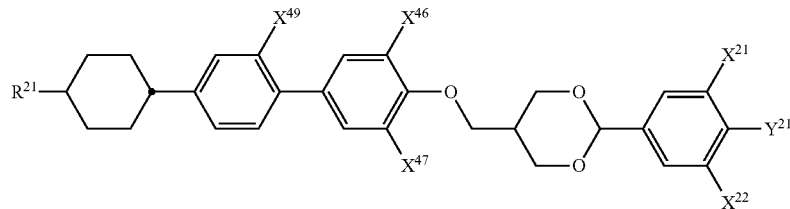

In the formulas, $X^{40}$, $X^{41}$, $X^{42}$, $X^{43}$, $X^{44}$, $X^{45}$, $X^{46}$, $X^{47}$, $X^{48}$, $X^{49}$, and $X^{50}$ each independently represents a hydrogen atom or a fluorine atom, and $R^{21}$, $X^{21}$, $X^{22}$, $X^{23}$, $X^{24}$, $X^{25}$, $Y^{21}$, and $Y^{22}$ have the same meaning as $R^{21}$, $X^{21}$, $X^{22}$, $X^{23}$, $X^{24}$, $X^{25}$, $Y^{21}$, and $Y^{22}$ in General Formula (2), respectively.

In the liquid crystal composition of the present invention, the compound represented by General Formula (2) is preferably contained, as a lower limit, in the amount of 0.5% or more, preferably contained in the amount of 1% or more, preferably contained in the amount of 2% or more, preferably contained in the amount of 4% or more, preferably contained in the amount of 5% or more, preferably contained in the amount of 8% or more, preferably contained in the amount of 10% or more, and preferably contained in the amount of 15% or more. In addition, the compound represented by General Formula (2) is preferably contained, as an upper limit, in the amount of 80% or less, preferably contained in the amount of 70% or less, preferably contained in the amount of 65% or less, preferably contained in the amount of 60% or less, preferably contained in the amount of 55% or less, preferably contained in the amount of 50% or less, preferably contained in the amount of 45% or less, preferably contained in the amount of 40% or less, preferably contained in the amount of 37% or less, preferably contained in the amount of 35% or less, preferably contained in the amount of 34% or less, preferably contained in the amount of 30% or less, preferably contained in the amount of 28% or less, preferably contained in the amount of 25% or less, and preferably contained in the amount of 20% or less. One type of the compound represented by General Formula (1) may be used alone or two or more types of the compound may be used at the same time.

In General Formula (LC1),

[Chem. 42]

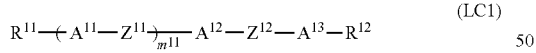

(LC1)

$R^{11}$ and $R^{12}$ each independently is preferably an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and preferably linear. In the case where $R^{11}$ and $R^{12}$ represent an alkenyl group, $R^{11}$ and $R^{12}$ are preferably selected from the group represented by any one of Formula (R1) to Formula (R5).

[Chem. 43]

(R1)

-continued

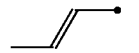

(R2)

(R3)

(R4)

(R5)

A black point in each formula represents a point linking to a ring.

A combination of $R^{11}$ and $R^{12}$ is not particularly limited, and a combination in which both represent an alkyl group, a combination in which one of the above represents an alkyl group and the other represents an alkenyl group, or a combination in which one of the above represents an alkyl group and the other represents an alkoxy group is preferable.

$A^{11}$ to $A^{13}$ each independently is preferably any one of the following structures.

[Chem. 44]

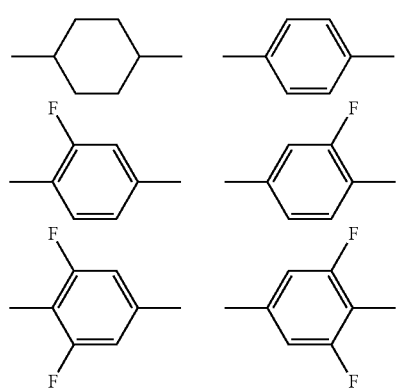

$A^{11}$ to $A^{13}$ each independently is more preferably any one of the following structures.

[Chem. 45]

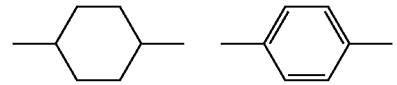

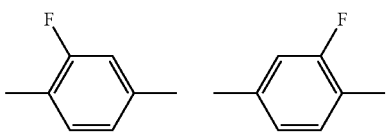

$Z^{11}$ and $Z^{12}$ each independently is preferably a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—, more preferably a single bond, —CH$_2$CH$_2$—, —OCF$_2$—, or —CF$_2$O—, and particularly preferably a single bond.

$m^{11}$ preferably represents an integer of 1 or 2. In the case where plural $A^{11}$'s and/or $Z^{11}$'s are present, these may be the same as or different from each other.

The compound represented by General Formula (LC1) is more preferably compounds represented by the following General Formula (LC1-1) to General Formula (LC1-39). The liquid crystal composition of the present invention preferably contains one or more compounds represented by (LC1-1) to (LC1-26) as the compound represented by General Formula (LC1), and more preferably contains one or more compounds represented by (LC1-1) to (LC1-5), (LC1-7), (LC1-15), (LC1-16), (LC1-18), and (LC1-38).

[Chem. 46]

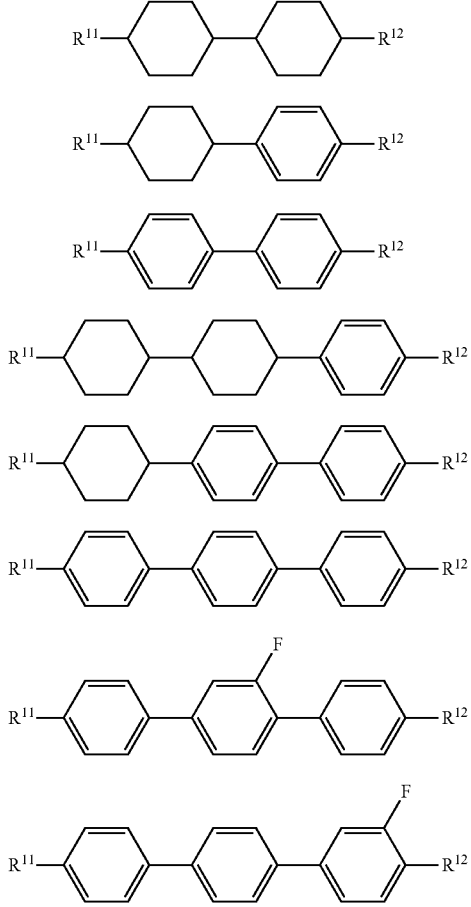

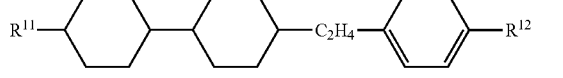

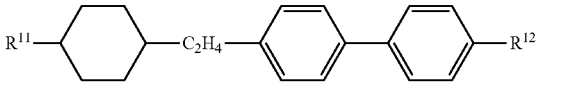

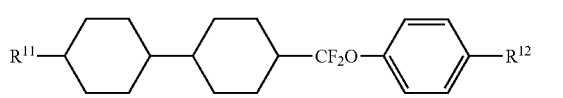

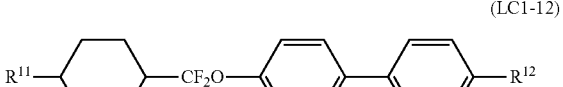

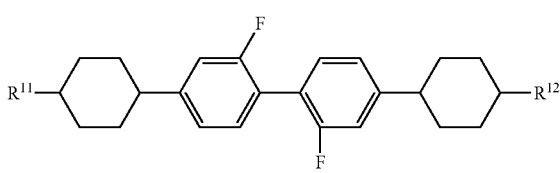

[Chem. 47]

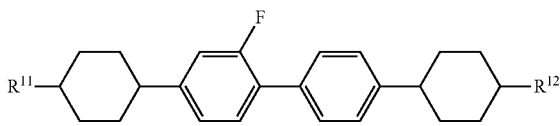

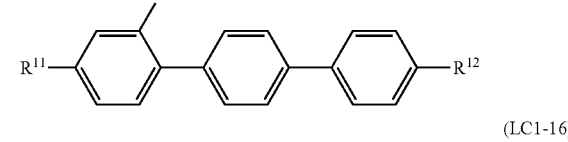

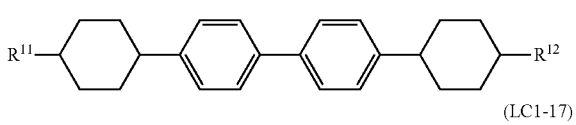

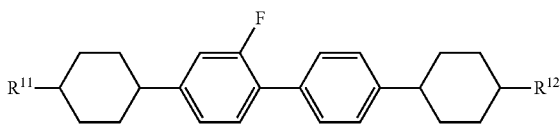

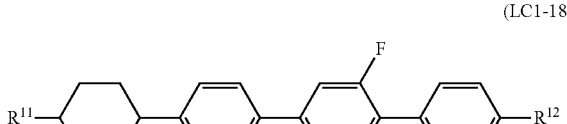

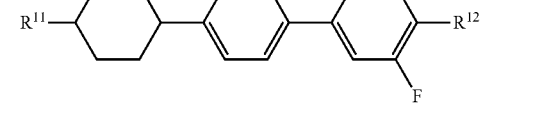

(LC1-20) 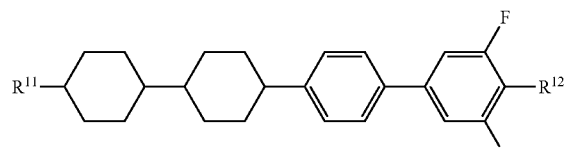
(LC1-21) 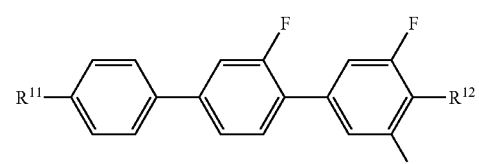
(LC1-22) 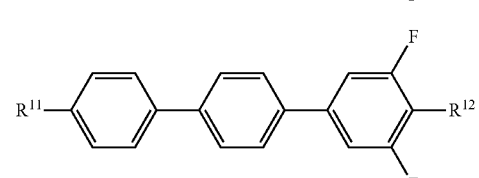
(LC1-23) 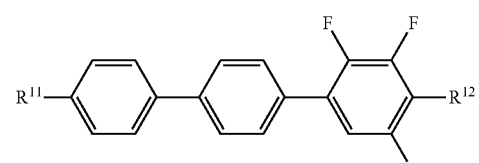
(LC1-24) 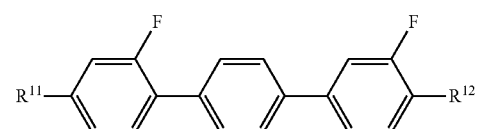
(LC1-25) 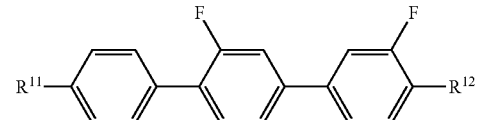
(LC1-26) 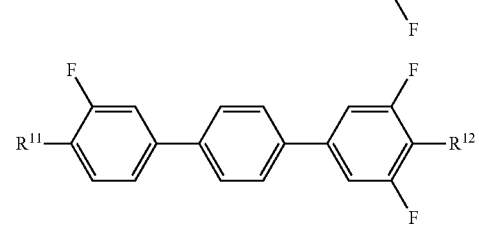
[Chem. 48]
(LC1-27) 
(LC1-28) 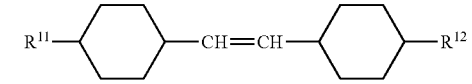
(LC1-29) 
(LC1-30) 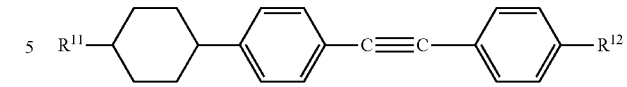
(LC1-31) 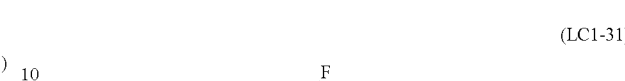
(LC1-32) 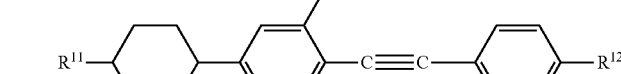
(LC1-33) 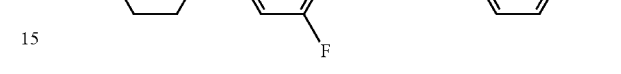
(LC1-34) 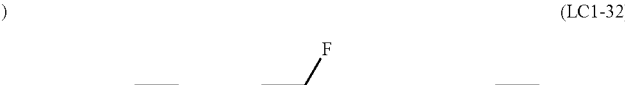
(LC1-35) 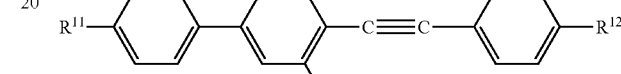
(LC1-36) 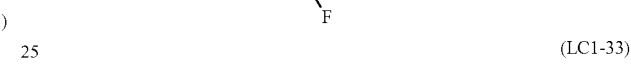
(LC1-37) 
(LC1-38) 

-continued

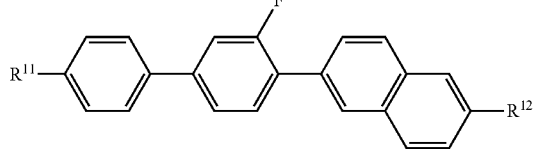
(LC1-39)

In the formulas, $R^{11}$ and $R^{12}$ have the same meaning as $R^{11}$ and $R^{12}$ in General Formula (LC1), respectively.

The compound represented by General Formula (LC1) is preferably the compounds represented by the above.

Furthermore, the liquid crystal composition still more preferably contains one or more compounds selected from the group consisting of the following compounds in the amount of 70% by mass at most, as the compound represented by General Formula (LC1).

[Chem. 49]

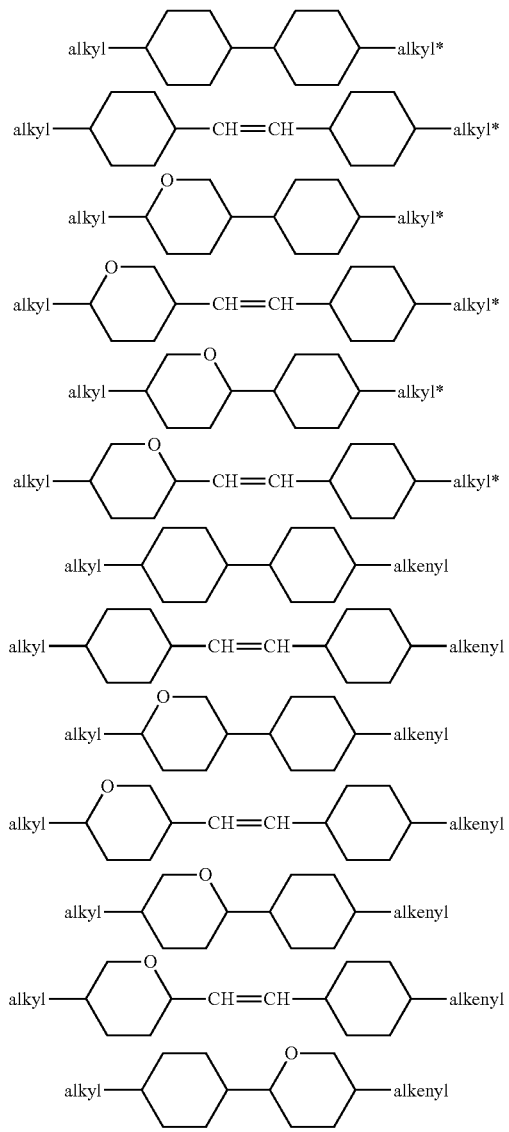

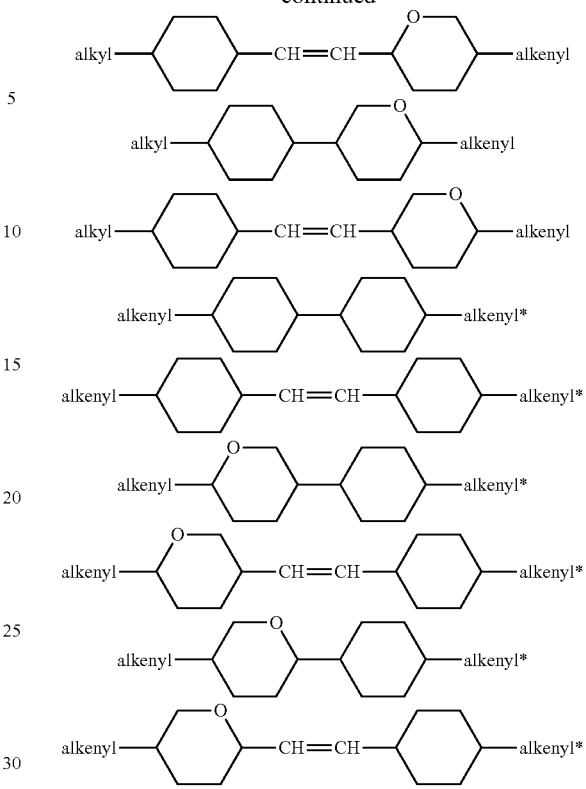

In the formulas, alkyl and alkyl* each independently represents an alkyl group having 1 to 5 carbon atoms or an alkoxy group, and alkenyl and alkenyl* each independently represents an alkenyl group having 2 to 5 carbon atoms or an alkenyloxy group.

In the liquid crystal composition of the present invention, the compound represented by General Formula (LC1) is preferably contained, as a lower limit, in the amount of 1% or more, preferably contained in the amount of 5% or more, preferably contained in the amount of 10% or more, preferably contained in the amount of 13% or more, preferably contained in the amount of 15% or more, preferably contained in the amount of 18% or more, preferably contained in the amount of 20% or more, preferably contained in the amount of 25% or more, preferably contained in the amount of 28% or more, preferably contained in the amount of 30% or more, preferably contained in the amount of 33% or more, preferably contained in the amount of 35% or more, preferably contained in the amount of 38% or more, preferably contained in the amount of 40% or more, preferably contained in the amount of 43% or more, preferably contained in the amount of 45% or more, preferably contained in the amount of 48% or more, preferably contained in the amount of 50% or more, preferably contained in the amount of 53% or more, preferably contained in the amount of 55% or more, preferably contained in the amount of 58% or more, and preferably contained in the amount of 60% or more. In addition, the compound represented by General Formula (LC1) is preferably contained, as an upper limit, in the amount of 99% or less, preferably contained in the amount of 98% or less, preferably contained in the amount of 95% or less, preferably contained in the amount of 93% or less, preferably contained in the amount of 90% or less, preferably contained in the amount of 87% or less, preferably contained in the amount of 85% or less, preferably contained in the amount of 83% or less, preferably contained in the amount of 80% or less, preferably contained in the amount of 88% or less, preferably contained in the amount of 85% or less, preferably contained in the amount of 83% or less, preferably contained in the amount of 80% or less, preferably contained in the amount of 78% or less, preferably contained in the amount of 75% or less, preferably contained in the amount of 73% or less, preferably contained in the amount of 70% or less, preferably contained in the amount of 68% or less, preferably contained in the amount of 65% or less, preferably contained in the amount of 63% or less, and preferably contained in the amount of 60% or less. One type of the compound represented by General Formula (1) may be used alone or two or more types of the compound may be used at the same time.

In the liquid crystal composition of the present invention, the compounds represented by General Formula (1) and General Formula (2) are preferably contained, as a lower limit, in the amount of 1% or more, preferably contained in the amount of 5% or more, preferably contained in the amount of 10% or more, preferably contained in the amount of 13% or more, preferably contained in the amount of 15% or more, preferably contained in the amount of 18% or more, preferably contained in the amount of 20% or more, preferably contained in the amount of 23% or more, preferably contained in the amount of 25% or more, preferably contained in the amount of 30% or more, preferably contained in the amount of 35% or more, and preferably contained in the amount of 38% or more, and preferably contained in the amount of 40% or more. In addition, the compounds represented by General Formula (1) and General Formula (2) are preferably contained, as an upper limit, in the amount of 90% or less, preferably contained in the amount of 80% or less, preferably contained in the amount of 75% or less, preferably contained in the amount of 70% or less, preferably contained in the amount of 65% or less, preferably contained in the amount of 60% or less, preferably contained in the amount of 58% or less, preferably contained in the amount of 55% or less, preferably contained in the amount of 53% or less, preferably contained in the amount of 50% or less, preferably contained in the amount of 48% or less, preferably contained in the amount of 46% or less, preferably contained in the amount of 45% or less, preferably contained in the amount of 43% or less, preferably contained in the amount of 40% or less, preferably contained in the amount of 38% or less, preferably contained in the amount of 78% or less, preferably contained in the amount of 75% or less, preferably contained in the amount of 35% or less, preferably contained in the amount of 33% or less, and preferably contained in the amount of 30% or less.

In the liquid crystal composition of the present invention, the compounds represented by General Formula (1) and General Formula (LC1) are preferably contained, as a lower limit, in the amount of 1% or more, preferably contained in the amount of 5% or more, preferably contained in the amount of 10% or more, preferably contained in the amount of 15% or more, preferably contained in the amount of 20% or more, preferably contained in the amount of 25% or more, preferably contained in the amount of 30% or more, preferably contained in the amount of 35% or more, preferably contained in the amount of 38% or more, preferably contained in the amount of 40% or more, preferably contained in the amount of 43% or more, preferably contained in the amount of 45% or more, preferably contained in the amount of 48% or more, preferably contained in the amount of 50% or more, preferably contained in the amount of 53% or more, preferably contained in the amount of 55% or more, preferably contained in the amount of 58% or more, preferably contained in the amount of 60% or more, preferably contained in the amount of 63% or more, preferably contained in the amount of 65% or more, preferably contained in the amount of 68% or more, and preferably contained in the amount of 70% or more. In addition, the compounds represented by General Formula (1) and General Formula (LC1) are preferably contained, as an upper limit, in the amount of 99% or less, preferably contained in the amount of 98% or less, preferably contained in the amount of 96% or less, preferably contained in the amount of 95% or less, preferably contained in the amount of 93% or less, preferably contained in the amount of 90% or less, preferably contained in the amount of 87% or less, preferably contained in the amount of 85% or less, preferably contained in the amount of 83% or less, preferably contained in the amount of 80% or less, preferably contained in the amount of 88% or less, preferably contained in the amount of 85% or less, preferably contained in the amount of 83% or less, preferably contained in the amount of 80% or less, preferably contained in the amount of 78% or less, preferably contained in the amount of 75% or less, preferably contained in the amount of 73% or less, preferably contained in the amount of 70% or less, preferably contained in the amount of 68% or less, preferably contained in the amount of 65% or less, preferably contained in the amount of 63% or less, and preferably contained in the amount of 60% or less.

The liquid crystal composition of the present invention can contain one or more optically active compounds. Any optically active compound can be used as long as the compound can twist and align liquid crystal molecules. Normally, this twist is changed by the temperature and accordingly, a plurality of optically active compounds can be used in order to obtain a desired temperature dependency. In order not to have a bad influence on the temperature range or viscosity of the nematic liquid crystal phase, it is preferable to select and use the optically active compound having a strong twisting effect. As this optically active compound, liquid crystals such as cholesteric nonanoate or compounds represented by the following General Formula (Ch-1) to General Formula (Ch-6) are preferably contained.

[Chem. 50]

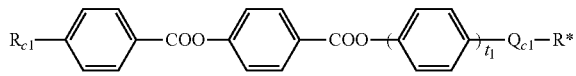

(Ch-1)

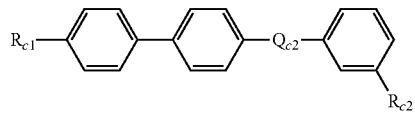

(Ch-2)

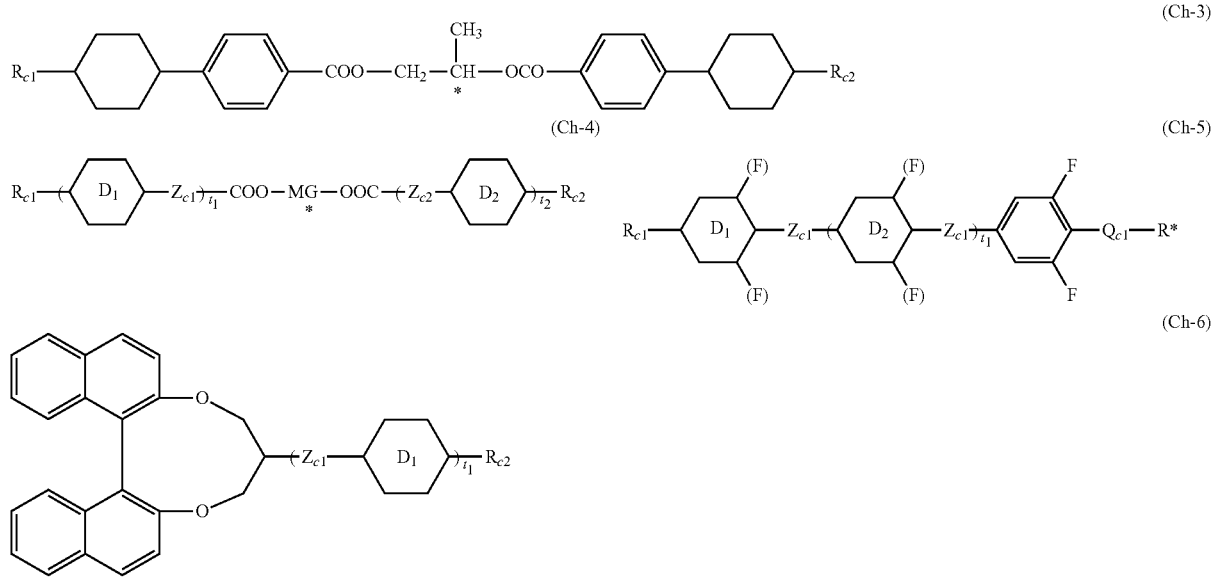

(Ch-3)

(Ch-4)

(Ch-5)

(Ch-6)

In the formulas, $R_{c1}$, $R_{c2}$, and R* each independently represents an alkyl group having 1 to 15 carbon atoms, one —$CH_2$— or two or more —$CH_2$— in the alkyl group may be substituted with —O—, —CH=CH—, —CO—, —OCO—, —COO—, —C≡C—, —$CF_2O$—, or —$OCF_2$— as long as an oxygen atom is not directly adjacent to another oxygen atom; one or more hydrogen atoms in the alkyl group may be arbitrarily substituted with a halogen atom; however, R* has at least one of a branched chain group having optical activity and a halogen-substituted group; $Z_{c1}$ and $Z_{c2}$ each independently represents a single bond, —CH=CH—, —C≡C—, —$CH_2CH_2$—, —$(CH_2)_4$—, —COO—, —OCO—, —$OCH_2$—, —$CH_2O$—, —$OCF_2$—, or —$CF_2O$—; $D_1$ and $D_2$ represent a cyclohexane ring or a benzene ring; one —$CH_2$— or two or more —$CH_2$— in the cyclohexane ring may be substituted with —O— as long as an oxygen atom is not directly adjacent to another oxygen atom; one —$CH_2CH_2$— or two or more —$CH_2CH_2$— in the ring may be substituted with —CH=CH—, —$CF_2O$—, or —$OCF_2$—; one —CH= or two or more —CH= in the benzene ring may be substituted with —N= as long as a nitrogen atom is not directly adjacent to another nitrogen atom; one or more hydrogen atoms in the ring may be substituted with F, Cl, or $CH_3$; $t_1$ and $t_2$ represent 0, 1, 2, or 3; and MG*, $Q_{c1}$, and $Q_{c2}$ represent the following structures.

[Chem. 51]

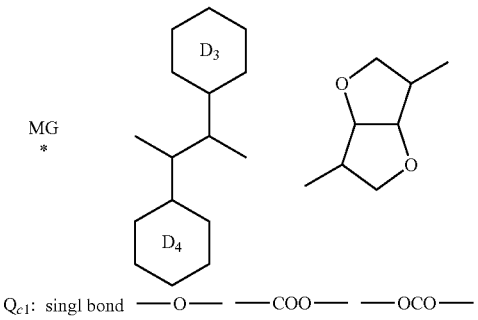

$Q_{c1}$: singl bond —O— —COO— —OCO—

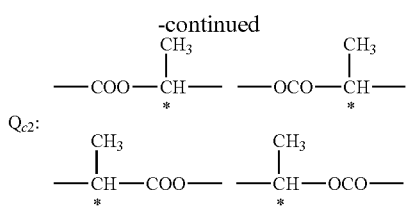

In the formula, $D_3$ and $D_4$ represent a cyclohexane ring or a benzene ring, one —$CH_2$— or two or more —$CH_2$— in the cyclohexane ring may be substituted with —O— as long as an oxygen atom is not directly adjacent to another oxygen atom; one —$CH_2CH_2$— or two or more —$CH_2CH_2$— in the ring may be substituted with —CH=CH—, —$CF_2O$—, or —$OCF_2$—; one —CH= or two or more —CH= in the benzene ring may be substituted with —N= as long as a nitrogen atom is not directly adjacent to another nitrogen atom; and one or more hydrogen atoms in the ring may be substituted with F, Cl, or $CH_3$.

The liquid crystal composition of the present invention may contain one or more polymerizable compounds, and the polymerizable compound is preferably a disk-shape liquid crystal compound having a structure in which a benzene derivative, a triphenylene derivative, a truxene derivative, a phthalocyanine derivative, or a cyclohexane derivative is used as a mother nucleus in the center of molecules and a linear alkyl group, a linear alkoxy group, or a substituted benzoyloxy group is radially substituted as a side chain thereof.

Specifically, the polymerizable compound is preferably a polymerizable compound represented by General Formula (PC).

[Chem. 52]

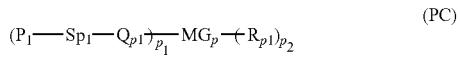

(PC)

In the formula, $P_1$ represents a polymerizable functional group; $Sp_1$ represents a spacer group having 0 to 20 carbon atoms; $Q_{p1}$ represents a single bond, —O—, —NH—, —NHCOO—, —OCONH—, —CH=CH—, —CO—, —COO—, —OCO—, —OCOO—, —OOCO—, —CH=CH—, —CH=CH—COO—, —OCO—CH=CH—, or —C≡C—; $p_1$ and $p_2$ each independently represents 1, 2, or 3; $MG_p$ represents a mesogenic group or a mesogenity supporting group; $R_{p1}$ represents a halogen atom, a cyano group, or an alkyl group having 1 to 25 carbon atoms; one $CH_2$ group or two or more $CH_2$ groups in the alkyl group may be substituted with —O—, —S—, —NH—, —N(CH$_3$)—, —CO—, —COO—, —OCO—, —OCOO—, —SCO—, —COS—, or —C≡C— as long as an O atom is not directly adjacent to another O atom; or $R_{p1}$ may be $P_2$-$Sp_2$-$Q_{p2}$-; and $P_2$, $Sp_2$, and $Q_{p2}$ have the same meaning as $P_1$, $Sp_1$, and $Q_{p1}$, respectively.

$MG_p$ of the polymerizable compound represented by General Formula (PC) is more preferably a polymerizable compound represented by the following structure.

[Chem. 53]

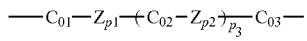

In the formula, $C_{01}$ to $C_{03}$ each independently represents a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydro naphthalene-2,6-diyl group, a pyridine-2,5-diyl group, a pyrimidine-2,5-diyl group, a pyrazine-2,5-diyl group, a 1,2,3,4-tetrahydro naphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene 2,7-diyl group, or a fluorene 2,7-diyl group; the 1,4-phenylene group, the 1,2,3,4-tetrahydro naphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene 2,7-diyl group, and the fluorene-2,7-diyl group may have, as a substituent, one or more F, Cl, $CF_3$, $OCF_3$, cyano groups, alkyl groups having 1 to 8 carbon atoms, alkoxy groups, alkanoyl groups, alkanoyloxy groups, alkenyl groups having 2 to 8 carbon atoms, alkenyloxy groups, alkenoyl groups, or alkenoyloxy groups; $Z_{p1}$ and $Z_{p2}$ each independently represents —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, or a single bond; and $p_3$ represents 0, 1, or 2.

Here, $Sp_1$ and $Sp_2$ each independently represents an alkylene group, the alkylene group may be substituted with one or more halogen atoms or CN, and one $CH_2$ group or two or more $CH_2$ groups present in this group may be substituted with —O—, —S—, —NH—, —N(CH$_3$)—, —CO—, —COO—, —OCO—, —OCOO—, —SCO—, —COS—, or —C≡C— as long as an O atom is not directly adjacent to another O atom. Also, $P_1$ and $P_2$ each is independently preferably any one of the following general formulas.

[Chem. 54]

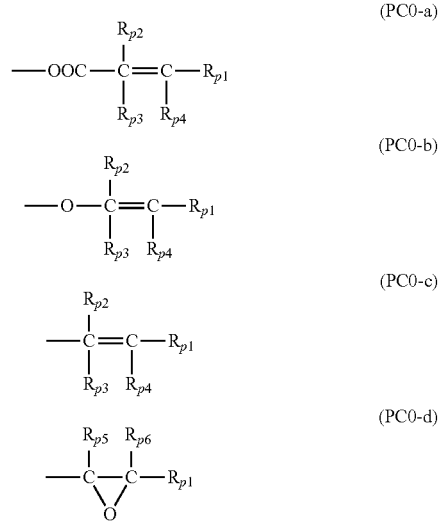

In the formulas, $R_{p2}$ to $R_{p6}$ each independently represents a hydrogen atom, a halogen atom, or an alkyl group having 1 to 5 carbon atoms.

More specifically, the polymerizable compound represented by General Formula (PC) is preferably polymerizable compounds represented by General Formula (PC0-1) to General Formula (PC0-6).

[Chem. 55]

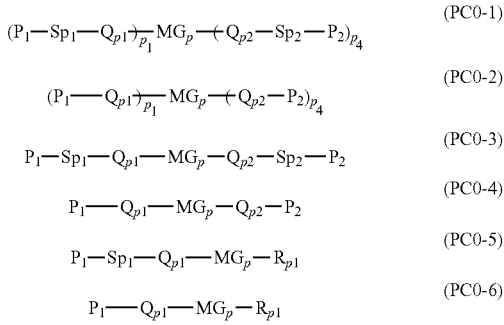

In the formulas, $p_4$ each independently represents 1, 2, or 3.

More specifically, the polymerizable compound represented by General Formula (PC) is preferably polymerizable compounds represented by General Formula (PC1-1) to General Formula (PC1-9).

[Chem. 56]

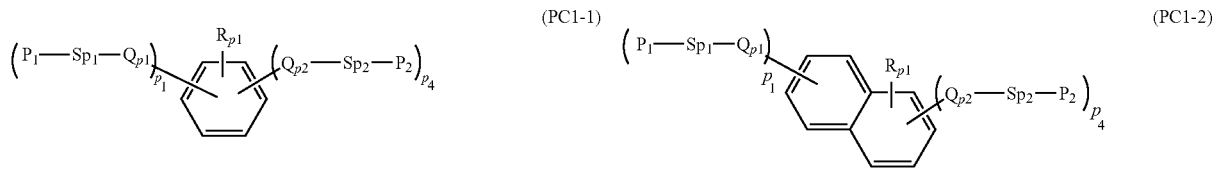

-continued

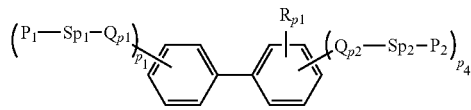 (PC1-3)

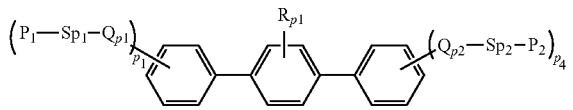 (PC1-4)

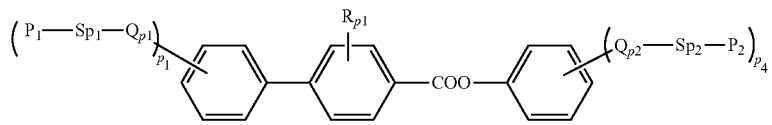 (PC1-5)

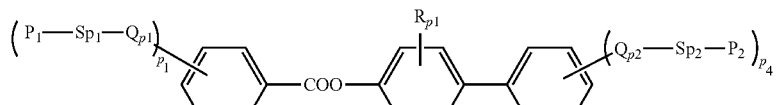 (PC1-6)

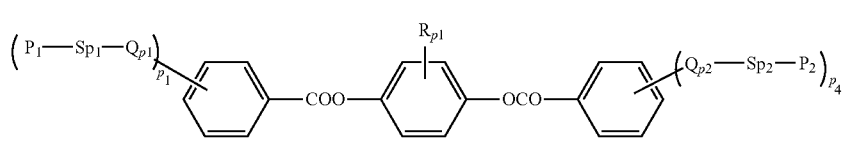 (PC1-7)

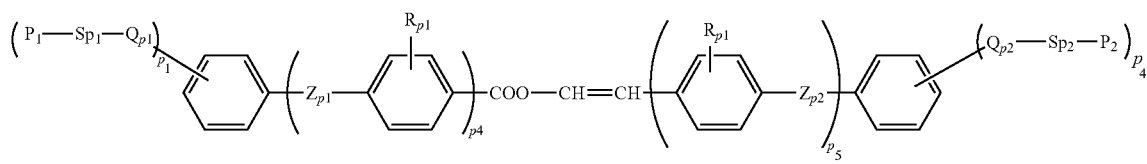 (PC1-8)

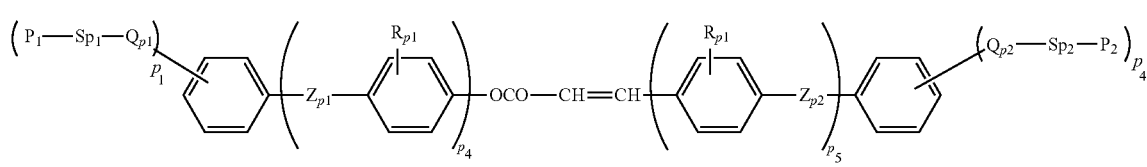 (PC1-9)

In the formulas, $p_5$ represents 0, 1, 2, 3, or 4.

Among the above, $Sp_1$, $Sp_2$, $Q_{p1}$, and $Q_{p2}$ are preferably a single bond, $P_1$ and $P_2$ are preferably Formula (PC0-a), more preferably an acryloyloxy group and a methacryloyloxy group, $p_1+p_4$ is preferably 2, 3, or 4, and $R_{p1}$ is preferably H, F, $CF_3$, $OCF_3$, $CH_3$, or $OCH_3$. Furthermore, the polymerizable compound represented by General Formula (PC) is preferably compounds represented by General Formula (PC1-2), General Formula (PC1-3), General Formula (PC1-4), and General Formula (PC1-8).

In addition, $MG_p$ in General Formula (PC) is preferably a disk-shape liquid crystal compound represented by General Formula (PC1)-9.

[Chem. 57]

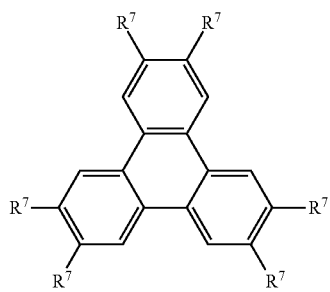 (PC1)-9

-continued

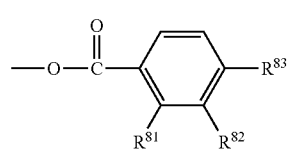 (PC1-e)

In the formulas, $R_7$ each independently represents $P_1$-$Sp_1$-$Q_{p1}$ or a substituent of General Formula (PC1-e); $R_{81}$ and $R_{82}$ each independently represents a hydrogen atom, a halogen atom, or a methyl group; $R_{83}$ represents an alkoxy group having 1 to 20 carbon atoms; and at least one hydrogen atom in the alkoxy group may be substituted with substituents represented by General Formula (PC0-a) to (PC0-d).

The use amount of the polymerizable compound is preferably 0.05% to 2.0% by mass.

In the liquid crystal composition containing the polymerizable compound of the present invention, a liquid crystal display element is prepared by polymerizing the polymerizable compound. At this time, it is required to reduce an unpolymerized component to a desired amount or less, and a compound having a biphenyl group and/or a terphenyl group in the moiety structure of General Formula (LC0) is preferably contained in the liquid crystal composition. More specifically, compounds represented by General Formula (LC0-10) to General Formula (LC0-27), General Formula (LC0-48) to General Formula (LC0-53) and General Formula (LC0-60) to General Formula (LC0-68) are preferable, and one or more compounds are selected and preferably contained in the amount of 0.1% to 40% by mass. In addition, a compound in the group consisting of the polymerizable compounds represented by General Formula (PC1-1) to General Formula (PC1-3), General Formula (PC1-8) and General Formula (PC1-9) is preferably used in combination.

Furthermore, the liquid crystal composition can contain one or more antioxidants, and further contain one or more UV absorbing agents. The antioxidant is preferably selected from the compounds represented by following General Formula (E-1) and/or General Formula (E-2).

[Chem. 58]

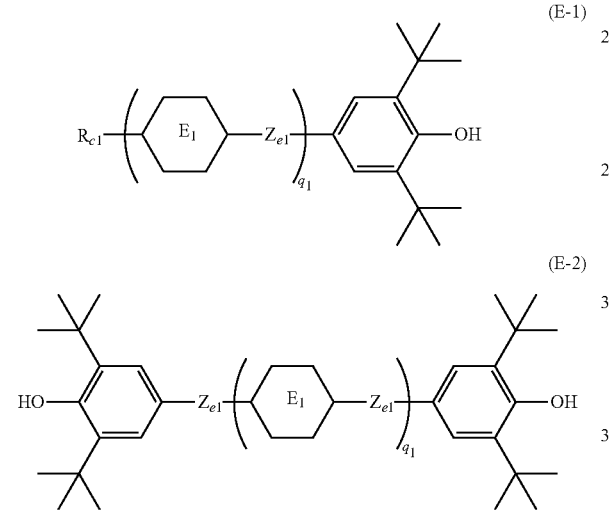

(E-1)

(E-2)

In the formulas, $R_{e1}$ represents an alkyl group having 1 to 15 carbon atoms, one —$CH_2$— or two or more —$CH_2$— in the alkyl group may be substituted with —O—, —CH=CH—, —CO—, —OCO—, —COO—, —C≡C—, —$CF_2O$—, or —$OCF_2$— as long as an oxygen atom is not directly adjacent to another oxygen atom, and one or more hydrogen atoms in the alkyl group may be arbitrarily substituted with a halogen atom;

$Z_{e1}$ and $Z_{e2}$ each independently represents a single bond, —CH=CH—, —C≡C—, —$CH_2CH_2$—, —$(CH_2)_4$—, —COO—, —OCO—, —$OCH_2$—, —$CH_2O$—, —$OCF_2$—, or —$CF_2O$—; and $E_1$ represents a cyclohexane ring or a benzene ring, one —$CH_2$— or two or more —$CH_2$— in the cyclohexane ring may be substituted with —O— as long as an oxygen atom is not directly adjacent to another oxygen atom, one —$CH_2CH_2$— or two or more —$CH_2CH_2$— in the ring may be substituted with —CH=CH—, —$CF_2O$—, or —$OCF_2$—, one —CH= or two or more —CH= in the benzene ring may be substituted with —N= as long as a nitrogen atom is not directly adjacent to another nitrogen atom, one or more hydrogen atoms in the ring may be substituted with F, Cl, or $CH_3$, and $q_1$ represents 0, 1, 2, or 3.

The liquid crystal composition of the present invention can be used as a liquid crystal display element, in particular, a liquid crystal display element for active matrix driving, for example, for a TN mode, an OCB mode, an ECB mode, an IPS (including FFS electrode) mode, or a VA-IPS mode (including FFS electrode). Here, the VA-IPS mode is a method in which in the absence of applied voltage, a liquid crystal material having positive dielectric anisotropy (Δε>0) is vertically aligned on a substrate surface to drive liquid crystal molecules by pixel electrodes and common electrodes disposed on the same substrate surface, and the method has an advantage in that since the liquid crystal molecules are arrayed in a direction of a curved electric field generated by the pixel electrodes and common electrodes, division of the pixels or formation of a multi-domain is easy and a response is excellent. According to non-patent documents Proc. 13th IDW, 97 (1997), Proc. 13th IDW, 175 (1997), SID Sym.Digest, 319 (1998), SID Sym.Digest, 838 (1998), SID Sym.Digest, 1085 (1998), SID Sym.Digest, 334 (2000), and Eurodisplay Proc., 142 (2009), the method is referred to as various names such as EOC, VA-IPS, or the like, but in the present invention, hereinafter the method is referred to as "VA-IPS".

In general, a threshold voltage (Vc) of freedericksz transition in the TN and ECB modes is represented by the following equation.

$$V_C = \frac{\pi d_{cell}}{d_{cell} + \langle r1 \rangle} \sqrt{\frac{K11}{\Delta\varepsilon}} \qquad \text{[Equation 1]}$$

In the IPS mode, the threshold voltage is represented by the following equation.

$$V_C = \frac{\pi d_{gap}}{d_{cell} + \langle r2 \rangle} \sqrt{\frac{K22}{\Delta\varepsilon}} \qquad \text{[Equation 2]}$$

In the VA mode, the threshold voltage is represented by the following equation.

$$V_C = \frac{\pi d_{cell}}{d_{cell} - \langle r3 \rangle} \sqrt{\frac{K33}{|\Delta\varepsilon|}} \qquad \text{[Equation 3]}$$

In the equations, Vc represents freedericksz transition (V), π represents a ratio of the circumference of a circle to its diameter, $d_{cell}$ represents a gap between a first substrate and a second substrate (μm), $d_{gap}$ represents a gap between the pixel electrodes and common electrodes (μm), $d_{ITO}$ represents a width of the pixel electrodes and/or common electrodes (μm), <r1>, <r2>, and <r3> represent an extrapolation length (μm), K11 represents an elastic constant (N) of a spray, K22 represents an elastic constant (N) of a twist, K33 represents an elastic constant (N) of a bend, and Δε represents dielectric anisotropy.

Meanwhile, in the VA-IPS mode, the following equation 4 is applied with respect to the present invention and the like.

$$V_C \propto \frac{d_{gap} - \langle r \rangle}{d_{ITO} + \langle r \rangle} \frac{\pi d_{cell}}{d_{cell} - \langle r3 \rangle} \sqrt{\frac{K33}{|\Delta\varepsilon|}} \qquad \text{[Equation 4]}$$

In the equation, Vc represents freedericksz transition (V), π represents a ratio of the circumference of a circle to its diameter, $d_{cell}$ represents a gap between a first substrate and second substrate (μm), $d_{gap}$ represents a gap between the pixel electrodes and common electrodes (μm), $d_{ITO}$ represents a width of the pixel electrodes and/or common electrodes (μm), <r>, <r'>, and <r3> represent an extrapolation length (μm), K33 represents an elastic constant (N) of a bend, and Δε represents dielectric anisotropy.

As a cell configuration from the equation 4, as $d_{gap}$ is smaller and $d_{ITO}$ is greater, a low driving voltage is achieved, and as a liquid crystal composition to be used, by selecting the liquid crystal composition having a greater absolute value of Δε and smaller K33, a low driving voltage is achieved.

The liquid crystal display element which is prepared by using the liquid crystal composition of the present invention can be prepared by performing a rubbing treatment while using a polyimide, a polyamide compound or the like, as a method for aligning liquid crystal molecules on a substrate surface. In addition, the liquid crystal display element can be prepared by a photo alignment technology using a chalcone, cinnamate, cinnamoyl compound or the like. Also, as a new alignment method, a method for causing a polymerizable liquid crystal compound to be incorporated into an alignment layer and polymerizing the polymerizable liquid crystal compound can be applied.

The liquid crystal composition of the present invention can be adjusted to exhibit preferable values of Δε, K11, and K33.

The product (Δn·d) of the refractive index anisotropy (Δn) of the liquid crystal composition and the gap (d) between the first substrate and the second substrate of a display device is strongly related to viewing angle characteristics and response speed. Accordingly, the gap (d) tends to be as small as 3 to 4 μm. The product (Δn·d) is particularly preferably 0.31 to 0.33 for the TN, ECB, and IPS (liquid crystal aligns substantially horizontal to the substrate surface in the absence of applied voltage) modes. For the VA-IPS mode, the product is preferably 0.20 to 0.59 and more preferably 0.30 to 0.40 in the case where the alignment is vertical with respect to the both substrates. Since the suitable value of the product (Δn·d) differs depending on the mode of various display elements, a liquid crystal composition which is applied to various modes has the refractive index anisotropy (Δn) in the range of 0.070 to 0.110, in the range of 0.100 to 0.140, or in the range of 0.130 to 0.180. It is possible to prepare liquid crystal compositions each having a refractive index anisotropy (Δn) falling within any of the different ranges.

The liquid crystal composition of the present invention containing the compound represented by General Formula (PC) as a polymerizable compound can provide a polymer-stabilized liquid crystal display element for a TN mode, an OCB mode, an ECB mode, an IPS mode, or a VA-IPS mode, which is prepared by polymerizing the polymerizable compound contained in the liquid crystal composition in the absence or presence of applied voltage. Specifically, the liquid crystal composition containing the polymerizable compound is interposed between two substrates, and the polymerizable compound in the liquid crystal composition is polymerized by energy such as ultraviolet rays in the absence or presence of applied voltage to prepare the liquid crystal display element. In the liquid crystal display element, an alignment state of liquid crystal molecules can be stored by polymerization of the polymerizable compound and accordingly stability of the alignment state can be improved. Also, it is expected that the response speed is improved.

EXAMPLES

Hereinafter, the present invention will be described in detail using Examples, but the present invention is not limited thereto. Also, hereinafter, "%" in the composition of Examples and Comparative Examples means "% by mass".

The physical properties of the liquid crystal composition are presented as follows:

$T_{N-I}$: Nematic phase-isotropic liquid phase transition temperature (° C.)

T-n: Lower limit temperature (° C.) of nematic phase

ε⊥: Dielectric constant in a direction perpendicular to the molecular long axis at 25° C.

Δε: Dielectric anisotropy at 25° C.

no: Refractive index for ordinary rays at 25° C.

Δn: Refractive index anisotropy at 25° C.

Vth: Voltage (V) applied to a 6 μm-thick cell at which the transmittance changes by 10% when square waves are applied at a frequency of 1 KHz at 25° C.

η: Bulk viscosity (mPa·s) at 20° C.

γ1: Rotational viscosity (mPa·s)

K11/pN: Elastic constant (N) of a spray

K22/pN: Elastic constant (N) of a twist

K33/pN: Elastic constant (N) of a bend

Compounds are abbreviated as follows.

TABLE 1

| n | $C_nH_{2n+1}$— | -2- | —$CH_2CH_2$— | —F | —F |
|---|---|---|---|---|---|
| m | —$C_mH_{2m+1}$ | -d- | —CH=CH— | —Cl | —Cl |
| nO | $C_nH_{2n+1}$O— | -T- | —C≡C— | —CN | —C≡N |
| Om | —$OC_mH_{2m+1}$ | —1O— | —$CH_2$O— | —CFFF | —$CF_3$ |
| ndm- | $C_nH_{2n+1}$—CH=CH—$(CH_2)_{n-1}$— | —O1— | —$OCH_2$— | —CFF | —$CHF_2$ |
| -ndm | —$(CH_2)_{n-1}$—CH=CH—$C_mH_{2m+1}$ | —CFFO— | —$CF_2$O— | —OCFFF | —$OCF_3$ |
| ndmO— | $C_nH_{2n+1}$—CH=CH—$(CH_2)_{m-1}$—O— | —OCFF— | —$OCF_2$— | —OCFF | —$OCHF_2$ |
| —Ondm | —O—$(CH_2)_{n-1}$—CH=CH—$C_mH_{2m+1}$ | —V— | —CO— | —OCFFCFFF | —$OCF2CF_3$ |
| | | —VO— | —COO— | —CFFCFFF | —$CF2CF_3$ |
| | | —OV— | —OCO— | —OCF=CFF | —OCF=$CF_2$ |
| | | | | —OCH=CFF | —OCH=$CF_2$ |

[Chem. 59]

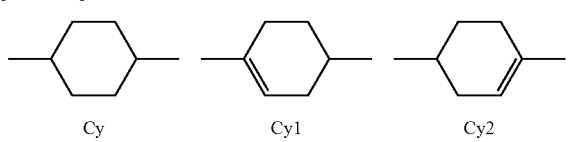

Cy     Cy1     Cy2

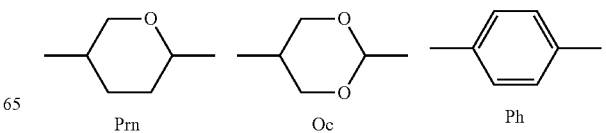

Prn     Oc     Ph

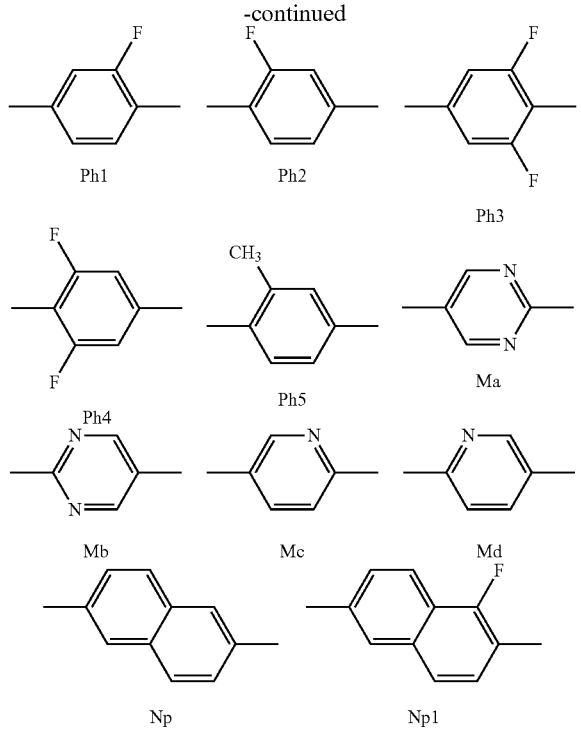

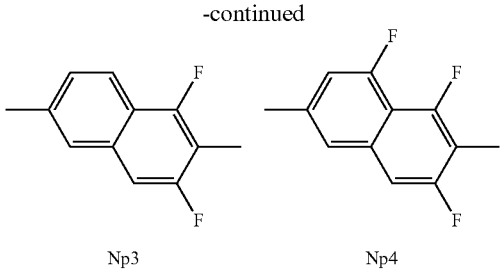

In addition, the results of the properties when the liquid crystal composition is stored at −20° C., −25° C., −30° C., and −40° C. are shown in the following tables. The numbers in the tables represent a storage time, "O" means that a state of liquid crystals before storage is maintained after the storage time, and "X" means that precipitation is recognized after the storage time.

Examples 1 to 6

The prepared liquid crystal compositions and the physical property values thereof are shown in the following.

TABLE 2

|  | Example 1 | Example 2 | Example 3 | Example 4 | Example 5 | Example 6 |
|---|---|---|---|---|---|---|
| 3-Cy—Cy-1d0 | 40 | 43 | 42 | 40.5 | 41.5 | 39 |
| 0d1-Cy—Cy—Ph-1 | 14 | 15 | 11 | 14 | 15 | 15 |
| 0d3-Cy—Cy—Ph-1 |  | 4.5 | 5 |  | 2 |  |
| 0d1-Cy—Ph—Ph-3 |  | 1 |  |  |  |  |
| 3-Cy—Cy—VO—Ph—Cy-3 | 4 | 3 | 4 | 4 | 4 | 5 |
| 3-Cy—Cy—VO—Ph—Cy-4 | 3 | 2 | 2 | 3 | 3 | 4 |
| 3-Ph—Ph1—Ph3—O2d0 | 6 | 4 | 5.5 | 7 | 5 | 4 |
| 3-Cy—Cy—Ph1—F |  |  |  | 4 |  |  |
| 3-Cy—Cy—Ph3—F | 10 |  |  | 10 |  |  |
| 3-Cy—Ph—Ph3—F |  |  |  |  | 8 | 15 |
| 2-Cy—Ph—Ph3—O1—Ph3—F |  | 3 | 3 |  |  |  |
| 3-Cy—Ph—Ph3—O1—Ph3—F | 5 | 5 | 5 | 5 | 5 |  |
| 3-Ph3—O1—Oc—Ph—Ph3—F | 4 | 4 | 4 | 4 | 4 | 4 |
| 4-Ph3—O1—Oc—Ph—Ph3—F | 4.5 | 4.5 | 4.5 | 4 | 4 | 4 |
| 3-Ph3—O1—Oc—Ph1—Ph3—F | 6 | 6 | 6 | 5 | 5 | 6 |
| 5-Ph3—O1—Oc—Ph1—Ph3—F | 3.5 | 4 | 4 | 3.5 | 3.5 | 4 |
| Tni (° C.) | 100.2 | 99.9 | 101.1 | 100.5 | 99.2 | 100.3 |
| T → N (° C.) | −38 | −35 | −37 | −42 | −38 | −43 |
| Δn | 0.096 | 0.098 | 0.099 | 0.098 | 0.099 | 0.100 |
| no | 1.484 | 1.485 | 1.484 | 1.483 | 1.485 | 1.485 |
| Δε | 8.0 | 7.3 | 8.0 | 7.3 | 7.1 | 7.8 |
| ε⊥ | 3.5 | 3.4 | 3.5 | 3.4 | 3.4 | 3.4 |
| γ1/mPa·s | 75 | 72 | 79 | 74 | 68 | 77 |
| η/mPa·s | 14.7 | 14.0 | 14.2 | 13.7 | 14.7 | 14.4 |
| Vth/Vrms | 1.666 | 1.790 | 1.731 | 1.762 | 1.783 | 1.721 |
| K11/pN | 12.2 |  | 12.5 |  | 12.0 | 11.9 |
| K22/pN | 6.6 |  | 7.1 |  | 7.0 | 6.7 |
| K33/pN | 16.1 |  | 17.0 |  | 16.0 | 15.9 |
| Storage properties at low temperature (−30° C.) (hr/O or X) |  |  |  | 168 hr/O | 168 hr/O |  |

Comparative Examples 1 and 2

The prepared liquid crystal compositions and the physical property values thereof are shown in the following.

TABLE 3

| | Comparative Example 1 | Comparative Example 2 |
|---|---|---|
| 3-Cy—Cy-1d0 | 31 | 31 |
| 3-Cy—Cy—Ph-1 | 8 | |
| 3-Cy—Cy—Ph-3 | 5 | |
| 0d1-Cy—Cy—Ph-1 | | 13 |
| 2-Cy—Cy—Ph1—F | 10 | 10 |
| 3-Cy—Cy—Ph1—F | 14 | 14 |
| 2-Cy—Cy—Ph—Ph1—F | 2 | 2 |
| 3-Cy—Cy—Ph—Ph1—F | 4 | 4 |
| 3-Cy—Ph1—Np3—F | 7 | 7 |
| 3-Ph3—O1—Ph—Np3—F | 8 | 8 |
| 2-Ph3—O1—Cy—Ph3—Ph3—F | 6 | 6 |
| 3-Ph3—O1—Cy—Ph3—Ph3—F | 5 | 5 |
| Tni (° C.) | 99.5 | 97.7 |
| T → N (° C.) | −54 | −56 |
| Δn | 0.099 | 0.101 |
| no | 1.487 | 1.488 |
| Δε | 8.0 | 7.9 |
| ε⊥ | 3.4 | 3.4 |
| γ1/mPa·s | 94 | 87 |
| η/mPa·s | 18.4 | 18.5 |
| Vth/Vrms | 1.710 | 1.706 |
| Storage properties at low temperature (−30° C.) (hr/O or X) | 72 hr/X | 72 hr/X |

The liquid crystal compositions in Comparative Examples were prepared such that the nematic phase-isotropic liquid phase transition temperature ($T_{N\text{-}I}$) and the value of dielectric anisotropy (Δε) at 25° C. were about the same as those in the Examples, respectively. The values of η in Examples 1 to 6 were within the range of 13.7 mPa·s to 14.7 mPa·s, whereas the values of η in Comparative Examples 1 and 2 were 18.4 mPa·s and 18.5 mPa·s, respectively. In addition, the values of γ1 in Examples 1 to 6 were within the range of 68 mPa·s to 79 mPa·s, whereas the values of γ1 in Comparative Examples 1 and 2 were 94 Pa·s and 87 Pa·s, respectively. In addition, in the liquid crystal composition of Example 4 or 5, precipitation was not recognized after the storage of 168 hours at −30° C. and it was confirmed that the composition exhibits satisfactory phase stability even at low temperature. However, in the liquid crystal compositions of Comparative Examples 1 and 2, precipitation occurred after 72 hours at −30° C.

With respect to Comparative Examples 1 and 2, the compositions have a high dielectric anisotropy, which is about +8, the upper limit of the liquid crystal temperature range is high, which is around 100° C., and however, the storage properties at −30° C. is low, and the viscosity (γ1) is from 87 to 94 [mPa·S], which is high. Meanwhile, with respect to Examples 1 to 6, it is understood that while the physical property values in Examples 1 to 6 are comparable to those in Comparative Examples 1 and 2, the viscosity (γ1) is low and the storage properties at low temperature are improved.

Examples 7 to 11

The prepared liquid crystal compositions and the physical property values thereof are shown in the following.

TABLE 4

| | Example 7 | Example 8 | Example 9 | Example 10 | Example 11 |
|---|---|---|---|---|---|
| 3-Cy—Cy-1d0 | 29 | 39 | 39 | 39 | 42 |
| 3-Cy—Cy-3d0 | 5 | | | | |
| 2-Cy—Cy-1d1 | 9 | | | | |
| 0d1-Cy—Cy—Ph-1 | 11 | 12 | 8 | 10 | 11 |
| 0d3-Cy—Cy—Ph-1 | 10 | 12 | 15 | 13 | 9 |
| 0d1-Cy—Ph—Ph-3 | 4 | 3 | | 3 | 3 |
| 1d1-Cy—Ph—Ph-3 | | 3 | 5 | 3 | 3 |
| 3-Cy—Ph—Ph-2 | | | | | 5 |
| 3-Ph—Ph1—Ph3—O2d0 | 10 | 14 | 15 | 15 | 16 |
| 2-Ph—Ph1—Np-3 | 4 | | | | |
| 2-Cy—Ph—Ph3—O1—Ph3—F | 4 | 3 | 5 | 4 | |
| 3-Cy—Ph—Ph3—O1—Ph3—F | 4 | 4 | 5 | 4 | |
| 3-Oc—Ph—Ph3—O1—Ph3—F | | | 6 | 4 | |
| 3-Ph3—O1—Oc—Ph—Ph3—F | 4 | 4 | | 2 | 3 |
| 4-Ph3—O1—Oc—Ph—Ph3—F | 3 | 3 | 2 | 3 | 3 |
| 5-Ph3—O1—Oc—Ph—Ph3—F | 3 | 3 | | | |
| 3-Ph3—O1—Oc—Ph1—Ph3—F | | | | | 5 |
| Tni (° C.) | 97.7 | 98.3 | 100.2 | 99.1 | 93.5 |
| T → N (° C.) | −36 | −33 | 0 | −28 | −28 |
| Δn | 0.116 | 0.116 | 0.119 | 0.118 | 0.116 |
| no | 1.491 | 1.491 | 1.491 | 1.491 | 1.492 |
| Δε | 4.4 | 4.5 | 4.4 | 4.4 | 4.0 |
| ε⊥ | 3.1 | 3.1 | 3.1 | 3.1 | 3.0 |
| γ1/mPa·s | 63 | 62 | 62 | 58 | 53 |
| η/mPa·s | 13.2 | 12.5 | 12.8 | 13.0 | 12.2 |
| Vth/Vrms | 2.447 | 2.448 | 2.584 | 2.515 | 2.513 |
| K11/pN | 13.7 | 13.9 | 17.3 | 13.6 | |
| K22/pN | 7.4 | 7.4 | 9.8 | 7.0 | |
| K33/pN | 15.6 | 16.4 | 21.7 | 17.8 | |
| Storage properties at low temperature (−20° C.) (hr/O or X) | 504 hr/O | 504 hr/O | | | |

Examples 12 to 15

The prepared liquid crystal compositions and the physical property values thereof are shown in the following.

TABLE 5

|  | Example 12 | Example 13 | Example 14 | Example 15 |
|---|---|---|---|---|
| 3-Cy—Cy-1d0 | 38 | 38 | 36 | 32 |
| 3-Cy—Ph—O1 |  |  | 4 | 4 |
| 0d1-Cy—Cy—Ph-1 | 14 | 11 | 11 | 13 |
| 0d3-Cy—Cy—Ph-1 | 12 | 8 | 7 | 10.5 |
| 5-Ph—Ph-1 |  | 3 | 1 |  |
| 0d1-Cy—Ph-3 | 3 | 3 | 4 | 4 |
| 1d1-Cy—Ph-3 |  | 3 | 3 |  |
| 3-Cy—Ph—Ph-2 | 4 | 4 | 4 | 5 |
| 3-Cy—Cy—VO—Ph—Cy-3 |  | 2 | 2 | 2 |
| 3-Ph—Ph1—Ph3—O2d0 | 15 | 16 | 16 | 15 |
| 3-Cy—Ph—Ph3—O1—Ph3—F |  | 2 | 2 | 2 |
| 3-Ph3—O1—Oc—Ph—Ph3—F | 3 | 3 | 3 | 3 |
| 4-Ph3—O1—Oc—Ph—Ph3—F | 4 | 3 | 3 | 3 |
| 3-Ph3—O1—Oc—Ph1—Ph3—F | 4 | 4 | 4 | 3.5 |
| 5-Ph3—O1—Oc—Ph1—Ph3—F | 3 |  |  | 3 |
| Tni (° C.) | 96.8 | 95.6 | 95.1 | 101.0 |
| T → N (° C.) | −36 | −32 | −31 | −49 |
| Δn | 0.115 | 0.120 | 0.120 | 0.119 |
| no | 1.491 | 1.493 | 1.494 | 1.493 |
| Δε | 5.0 | 4.1 | 4.0 | 4.9 |
| ε⊥ | 3.2 | 3.0 | 3.1 | 3.2 |
| γ1/mPa · s | 59 | 58 | 55 | 66 |
| η/mPa · s | 12.7 | 13.4 | 12.5 | 14.8 |
| Vth/Vrms | 2.292 | 2.604 | 2.530 | 2.376 |
| K11/pN |  | 14.3 |  | 14.3 |
| K22/pN |  | 8.3 |  | 7.4 |
| K33/pN |  | 16.1 |  | 15.9 |
| Storage properties at low temperature (−20° C.) (hr/O or X) | 168 hr/O | 168 hr/0 |  | 168 hr/O |

Examples 16 and 17

The prepared liquid crystal compositions and the physical property values thereof are shown in the following.

TABLE 6

|  | Example 16 | Example 17 |
|---|---|---|
| 3-Cy—Cy-1d0 | 42 | 41 |
| 0d1-Cy—Cy—Ph-1 | 14 | 14 |
| 0d3-Cy—Cy—Ph-1 | 10 | 10 |
| 3-Cy—Cy—VO—Ph—Cy-3 | 5 | 5 |
| 3-Ph—Ph1—Ph3—O2d0 | 15 | 17 |
| 3-Ph3—O1—Oc—Ph—Ph3—F | 3 | 3 |
| 3-Ph3—O1—Oc—Ph1—Ph3—F | 5 | 5 |
| 4-Ph3—O1—Oc—Ph1—Ph3—F | 3 | 3 |
| 5-Ph3—O1—Oc—Ph1—Ph3—F | 3 | 2 |
| Tni (° C.) | 99.5 | 99.9 |
| T → N (° C.) | −37 | −37 |
| Δn | 0.107 | 0.110 |
| no | 1.488 | 1.489 |
| Δε | 5.2 | 5.0 |
| ε⊥ | 3.2 | 3.2 |
| γ1/mPa · s | 65 | 66 |
| η/mPa · s | 13.0 | 12.7 |
| Vth/Vrms | 2.189 | 2.258 |

Examples 18 to 20

The prepared liquid crystal compositions and the physical property values thereof are shown in the following.

TABLE 7

|  | Example 18 | Example 19 | Example 20 |
|---|---|---|---|
| 3-Cy-Cy-1d0 | 38 | 35 | 38 |
| 0d1-Cy-Cy-Ph-1 | 14 | 14 | 15 |
| 0d3-Cy-Cy-Ph-1 | 10 | 9 | 13 |
| 0d1-Cy-Ph-Ph-3 | 4 | 5.5 |  |
| 3-Cy-Ph-Ph-2 | 3.5 | 4 | 2 |
| 3-Cy-Cy-VO-Ph-Cy-3 | 3 | 3 | 3 |
| 3-Cy-Cy-VO-Ph-Cy-4 |  |  | 3 |
| 3-Ph-Ph1-Ph3-O2d0 | 15 | 16 | 12 |
| 3-Cy-Ph-Ph3-O1-Ph3-F |  | 3.5 |  |
| 3-Ph3-O1-Oc-Ph3-F |  |  | 5 |
| 3-Ph3-O1-Oc-Ph-Ph3-F | 3 | 3 |  |
| 4-Ph3-O1-Oc-Ph-Ph3-F | 3 | 3 |  |
| 3-Ph3-O1-Oc-Ph1-Ph3-F | 4 | 4 | 6 |
| 5-Ph3-O1-Oc-Ph1-Ph3-F | 2.5 |  | 3 |
| Tni (° C.) | 102.4 | 106.0 | 101.8 |
| T → N (° C.) | −36 | −38 | −38 |
| Δn | 0.113 | 0.120 | 0.103 |
| no | 1.491 | 1.492 | 1.487 |
| Δε | 4.3 | 4.3 | 5.0 |
| ε⊥ | 3.1 | 3.1 | 3.3 |
| γ1/mPa · s | 62 | 68 | 69 |
| η/mPa · s | 13.1 | 13.5 | 13.1 |
| Vth/Vrms | 2.517 | 2.585 | 2.196 |
| K11/pN |  | 14.2 | 13.1 |
| K22/pN |  | 8.1 | 7.1 |
| K33/pN |  | 17.7 | 18.4 |
| Storage properties at low temperature (−30° C.) (hr/O or X) | 336 hr/O | 336 hr/O |  |

Examples 21 to 25

The prepared liquid crystal compositions and the physical property values thereof are shown in the following.

TABLE 8

|  | Example 21 | Example 22 | Example 23 | Example 24 | Example 25 |
|---|---|---|---|---|---|
| 3-Cy-Cy-1d0 | 37 | 37.5 | 36.5 | 37 | 36 |
| 0d1-Cy-Cy-Ph-1 | 15 | 12 | 12.5 | 9 | 10 |
| 0d3-Cy-Cy-Ph-1 | 14 | 11.5 | 12 | 10 | 10 |
| 0d1-Cy-Ph-Ph-3 |  | 2 | 2 | 4 | 4 |
| 3-Cy-Ph-Ph-2 | 2 | 3.5 | 4 | 5 | 6 |
| 3-Cy-Cy-VO-Ph-Cy-3 | 4 | 3 | 3.5 | 3 | 3 |
| 3-Cy-Cy-VO-Ph-Cy-4 | 3 | 2.5 | 3 | 2 | 3 |
| 3-Ph-Ph1-Ph3-O2d0 | 11 | 14.5 | 13 | 17 | 15 |
| 3-Ph3-O1-Oc-Ph3-F | 4 | 4 | 3 | 3 | 2 |
| 3-Ph3-O1-Oc-Ph1-Ph3-F | 6 | 6 | 6 | 6 | 6 |
| 5-Ph3-O1-Oc-Ph1-Ph3-F | 4 | 3.5 | 4.5 | 4 | 5 |

TABLE 8-continued

|  | Example 21 | Example 22 | Example 23 | Example 24 | Example 25 |
|---|---|---|---|---|---|
| Tni (° C.) | 106.2 | 101.1 | 105.8 | 100.3 | 105.3 |
| T → N (° C.) | −36 | −37 | −38 | −34 | −38 |
| Δn | 0.103 | 0.109 | 0.109 | 0.116 | 0.115 |
| no | 1.488 | 1.489 | 1.489 | 1.490 | 1.490 |
| Δε | 4.9 | 5.0 | 4.9 | 4.9 | 4.9 |
| ε⊥ | 3.2 | 3.3 | 3.2 | 3.3 | 3.2 |
| γ1/mPa · s | 71 | 69 | 72 | 68 | 72 |
| η/mPa · s | 13.9 | 13.6 | 14.3 | 14.0 | 14.7 |
| Vth/Vrms | 2.250 | 2.262 | 2.312 | 2.327 | 2.373 |
| K11/pN | 13.6 |  |  | 13.5 | 14.2 |
| K22/pN | 7.2 |  |  | 7.3 | 8.1 |
| K33/pN | 18.5 |  |  | 16.3 | 17.0 |
| Storage properties at low temperature (−40° C.) (hr/O or X) |  |  |  | 168 hr/O | 168 hr/O |

Examples 26 to 29

The prepared liquid crystal compositions and the physical property values thereof are shown in the following.

TABLE 9

|  | Example 26 | Example 27 | Example 23 | Example 29 |
|---|---|---|---|---|
| 3-Cy—Cy-1d0 | 44 | 43 | 41 | 41 |
| 5-Cy—Cy-1d0 | 2 |  |  |  |
| 0d1-Cy—Cy—Ph-1 | 15 | 15 | 15 | 15 |
| 0d3-Cy—Cy—Ph-1 | 11 | 12 | 8 | 11 |
| 0d1-Cy—Ph—Ph-3 |  |  | 4 | 4.5 |
| 3-Cy—Ph—Ph-2 |  | 2.5 | 3 |  |
| 1-Ph—Ph1—Ph-3d0 |  |  |  |  |
| 2-Ph—Ph1—Ph-3d0 |  |  |  |  |
| 3-Ph—Ph1—Ph-3d0 |  |  |  |  |
| 3-Cy—Cy—VO—Ph—Cy-3 | 4 | 4 | 4 | 4 |
| 3-Ph—Ph1—Ph3—O2d0 | 14 | 14 | 14 | 14 |
| 3-Cy—Cy—Ph3—F |  |  | 6 |  |
| 3-Cy—Ph—Ph3—F |  |  |  | 6 |
| 3-Ph3—O1—Oc—Ph—Ph3—F | 3 | 3 |  |  |
| 4-Ph3—O1—Oc—Ph—Ph3—F | 3 | 2.5 |  |  |
| 3-Ph3—O1—Oc—Ph1—Ph3—F | 4 | 4 | 5 | 4.5 |
| Tni (° C.) | 97.5 | 100.8 | 100.3 | 99.9 |
| T → N (° C.) | −15 | −35 | −39 | −39 |
| Δn | 0.101 | 0.104 | 0.105 | 0.108 |
| no | 1.486 | 1.488 | 1.489 | 1.489 |
| Δε | 3.4 | 3.3 | 2.8 | 2.7 |
| ε⊥ | 2.9 | 2.9 | 2.8 | 2.8 |
| γ1/mPa · s | 54 | 56 | 53 | 51 |
| η/mPa · s | 11.1 | 11.4 | 11.9 | 11.6 |
| Vth/Vrms | 2.547 | 2.680 | 2.900 | 2.910 |

Examples 30 and 31

The prepared liquid crystal compositions and the physical property values thereof are shown in the following.

TABLE 10

|  | Example 30 | Example 31 |
|---|---|---|
| 3-Cy—Cy-1d0 | 44 | 41 |
| 5-Cy—Cy-1d0 | 4 |  |
| 0d1-Cy—Cy—Ph-1 | 15 | 15 |
| 0d3-Cy—Cy—Ph-1 |  | 9 |
| 3-Cy—Cy—Ph-1 | 3 |  |
| 3-Cy—Ph—Ph-2 |  | 5 |
| 3-Cy—Cy—VO—Ph—Cy-3 | 3 | 4 |
| 3-Ph—Ph1—Ph3—O2d0 | 6 | 10 |
| 2-Cy—Ph—Ph3—O1—Ph3—F | 3 |  |
| 3-Cy—Ph—Ph3—O1—Ph3—F | 5 | 3 |
| 3-Ph3—O1—Oc—Ph—Ph3—F | 4 | 3 |
| 4-Ph3—O1—Oc—Ph—Ph3—F | 4 | 3 |
| 3-Ph3—O1—Oc—Ph1—Ph3—F | 5 | 4 |
| 5-Ph3—O1—Oc—Ph1—Ph3—F | 4 | 3 |
| Tni (° C.) | 92.3 | 102.5 |
| T → N (° C.) | −27 | −39 |
| Δn | 0.096 | 0.105 |
| no | 1.483 | 1.488 |
| Δε | 6.7 | 4.8 |
| ε⊥ | 3.3 | 3.1 |
| γ1/mPa · s | 61 | 65 |
| η/mPa · s | 12.8 | 12.5 |
| Vth/Vrms | 1.783 | 2.297 |
| K11/pN |  | 12.8 |
| K22/pN |  | 6.3 |
| K33/pN |  | 16.2 |
| Storage properties at low temperature (−25° C.) (hr/O or X) |  | 168 hr/O |
| Storage properties at low temperature (−30° C.) (hr/O or X) |  | 168 hr/O |

Examples 32 to 36

The prepared liquid crystal compositions and the physical property values thereof are shown in the following.

TABLE 11

|  | Example 32 | Example 33 | Example 34 | Example 35 | Example 36 |
| --- | --- | --- | --- | --- | --- |
| 3-Cy—Cy-1d0 | 43 | 42 | 40 | 41 | 42 |
| 2-Cy—Cy-1d1 | 13 | 8 | 7 | 11 | 11 |
| 5-Ph—Ph—O1 | 5 | 6 | 7 | 2 | 2 |
| 3-Cy—Ph—Ph-2 | 2 | 4 | 5 | 6 | 6 |
| 0d1-Cy—Ph—Ph-3 |  | 3 | 4 | 4 | 5 |
| 3-Cy—Cy—VO—Ph—Cy-3 | 2 | 2 | 2 |  |  |
| 3-Ph—Ph1—Ph3—O2d0 | 12 | 12 | 12 | 15 | 16 |
| 3-Cy—Cy—Ph1—F | 7 | 7 | 7 |  |  |
| 3-Cy—Ph—Ph3—O1—Ph3—F |  |  |  | 5 | 4 |
| 3-Ph3—O1—Oc—Ph—Ph3—F | 3 | 3 | 3 | 4 | 3 |
| 4-Ph3—O1—Oc—Ph—Ph3—F | 3 | 3 | 3 | 4 | 4 |
| 5-Ph3—O1—Oc—Ph—Ph3—F | 3 | 3 | 3 |  |  |
| 3-Ph3—O1—Oc—Ph1—Ph3—F | 4 | 4 | 4 | 5 | 4 |
| 5-Ph3—O1—Oc—Ph1—Ph3—F | 3 | 3 | 3 | 3 | 3 |
| Tni (° C.) | 81.3 | 80.5 | 80.8 | 85.3 | 84.7 |
| T → N (° C.) | −35 | −29 | −28 | −26 | −24 |
| Δn | 0.103 | 0.107 | 0.110 | 0.117 | 0.116 |
| no | 1.487 | 1.488 | 1.490 | 1.490 | 1.491 |
| Δε | 5.5 | 5.5 | 5.5 | 6.3 | 5.5 |
| ε⊥ | 3.3 | 3.3 | 3.3 | 3.5 | 3.3 |
| γ1/mPa · s | 53 | 52 | 54 | 56 | 55 |
| η/mPa · s | 11.7 | 11.7 | 12.5 | 13.7 | 12.5 |
| Vth/Vrms | 1.911 | 1.958 | 1.975 | 1.935 | 2.059 |
| Storage properties at low temperature (−25° C.) (hr/O or X) |  |  |  | 168 hr/O | 336 hr/O |
| Storage properties at low temperature (−30° C.) (hr/O or X) |  |  |  | 168 hr/O | 168 hr/O |

Examples 37 to 42

The prepared liquid crystal compositions and the physical property values thereof are shown in the following.

TABLE 12

|  | Example 37 | Example 38 | Example 39 | Example 40 | Example 41 | Example 42 |
| --- | --- | --- | --- | --- | --- | --- |
| 3-Cy—Cy-1d0 | 44 | 42 | 40.5 | 37 | 37 | 32 |
| 0d1-Cy—Cy—Ph-1 | 8 | 10 | 8 | 8 | 8 | 6 |
| 0d3-Cy—Cy—Ph-1 | 7 | 10 | 6 | 5 | 7 | 4 |
| 5-Ph—Ph-1 |  |  | 2 | 4 | 2 | 8 |
| 3-Cy—Ph—Ph-2 | 4 | 4 | 4.5 | 5 | 5 | 5 |
| 0d1-Cy—Ph—Ph-3 | 3 | 0 | 3.5 | 4 | 4 | 4 |
| 3-Ph—Ph1—Ph3—O2d0 | 12 | 12 | 14 | 16 | 16 | 16 |
| 2-Ph—Ph1—Np-3 |  |  |  |  |  | 4 |
| 4-Ph3—O1—Oc—Ph—Ph3—F | 3 | 4 | 3 | 3 | 3 | 3 |
| 5-Ph3—O1—Oc—Ph—Ph3—F | 3 | 3 | 3 | 3 | 3 | 3 |
| 3-Ph3—O1—Oc—Ph3—F | 6 | 5 | 5.5 | 5 | 5 | 5 |
| 3-Ph3—O1—Oc—Ph1—Ph3—F | 6 | 6 | 6 | 6 | 6 | 6 |
| 5-Ph3—O1—Oc—Ph1—Ph3—F | 4 | 4 | 4 | 4 | 4 | 4 |
| Tni (° C.) | 78.8 | 83.2 | 78.5 | 78.2 | 82.4 | 78.7 |
| T → N (° C.) | −22 | −23 | −24 | −23 | −23 | −23 |
| Δn | 0.102 | 0.103 | 0.109 | 0.116 | 0.116 | 0.130 |
| no | 1.486 | 1.486 | 1.488 | 1.490 | 1.490 | 1.496 |
| Δε | 7.4 | 7.5 | 7.4 | 7.4 | 7.6 | 7.4 |
| ε⊥ | 3.6 | 3.6 | 3.7 | 3.7 | 3.7 | 3.8 |
| γ1/mPa · s | 55 | 60 | 58 | 60 | 64 | 65 |
| η/mPa · s | 12.6 | 12.8 | 13.5 | 14.4 | 14.5 | 19.1 |
| Vth/Vrms | 1.662 | 1.679 | 1.703 | 1.743 | 1.759 | 1.827 |
| K11/pN | 10.4 | 10.9 |  | 11.1 | 11.5 | 11.8 |
| K22/pN | 5.5 | 6.1 |  | 7.0 | 6.7 | 7.1 |
| K33/pN | 13.0 | 15.0 |  | 12.9 | 13.5 | 12.3 |

Examples 43 to 46

The prepared liquid crystal compositions and the physical property values thereof are shown in the following.

TABLE 13

|  | Example 43 | Example 44 | Example 45 | Example 46 |
|---|---|---|---|---|
| 3-Cy—Cy-1d0 | 44 | 41.5 | 42 | 42 |
| 3-Cy—Ph—O1 | 4 | | | |
| 0d1-Cy—Cy—Ph-1 | 10 | 10 | 8 | 8 |
| 0d3-Cy—Cy—Ph-1 | | 4.5 | 3.5 | 3 |
| 5-Ph—Ph-1 | | | 2 | |
| 3-Cy—Ph—Ph-2 | | | 2 | |
| 0d1-Cy—Ph—Ph-3 | | 3 | | |
| 3-Cy—Cy—VO—Ph—Cy-3 | 4 | 3 | 3.5 | 3 |
| 2-Ph—Ph1—Np-3 | | | | |
| 3-Ph—Ph1—Ph3—O2d0 | 6 | 7 | 10 | 11 |
| 3-Cy—Cy—Ph1—F | | | | 3 |
| 2-Cy—Ph—Ph3—O1—Ph3—F | 5 | 3 | 2 | 3 |
| 3-Cy—Ph—Ph3—O1—Ph3—F | 5 | 4 | 5 | 5 |
| 4-Cy—Ph1—Ph3—O1—Ph3—F | | | | |
| 3-Ph3—O1—Oc—Ph3—F | | 6 | 5 | 5 |
| 3-Ph3—O1—Oc—Ph—Ph3—F | 4.5 | | 4 | 4 |
| 4-Ph3—O1—Oc—Ph—Ph3—F | 4.5 | 4 | 4 | 4 |
| 5-Ph3—O1—Oc—Ph—Ph3—F | 4 | 4 | | |
| 3-Ph3—O1—Oc—Ph1—Ph3—F | 5 | 6 | 5 | 5 |
| 5-Ph3—O1—Oc—Ph1—Ph3—F | 4 | 4 | 4 | 4 |
| Tni (° C.) | 86.9 | 86.9 | 83.7 | 85.1 |
| T → N (° C.) | -24 | -25 | -27 | -29 |
| Δn | 0.099 | 0.101 | 0.104 | 0.103 |
| no | 1.484 | 1.485 | 1.486 | 1.485 |
| Δε | 8.7 | 9.8 | 9.2 | 9.8 |
| ε⊥ | 3.7 | 3.9 | 3.9 | 4.0 |
| γ1/mPa·s | 68 | 72 | 67 | 67 |
| η/mPa·s | 14.0 | 14.6 | 14.1 | 14.2 |
| Vth/Vrms | 1.535 | 1.518 | 1.550 | 1.509 |
| Storage properties at low temperature (-25° C.) (hr/O or X) | | | 168 hr/O | |

Examples 47 to 49

The prepared liquid crystal compositions and the physical property values thereof are shown in the following.

TABLE 14

|  | Example 47 | Example 48 | Example 49 |
|---|---|---|---|
| 3-Cy—Cy-1d0 | 42 | 40 | 44 |
| 3-Cy—Ph—O1 | | | 2 |
| 0d1-Cy—Cy—Ph-1 | 12 | 8 | 8 |
| 0d3-Cy—Cy—Ph-1 | 9 | 6 | |
| 3-Cy—Cy—VO—Ph—Cy-3 | 2 | | |
| 3-Ph—Ph1—Ph3—O2d0 | 7 | 15 | 13 |
| 3-Ph—Ph3—CFFO—Np3—F | | | 7 |
| 2-Cy—Ph—Ph3—O1—Ph3—F | | | 3 |
| 3-Cy—Ph—Ph3—O1—Ph3—F | 2 | 4 | 5 |
| 4-Cy—Ph1—Ph3—O1—Ph3—F | 2 | | |
| 3-Ph3—O1—Oc—Ph3—F | 6 | 8 | |
| 3-Ph3—O1—Oc—Ph—Ph3—F | 3 | | 4 |
| 4-Ph3—O1—Oc—Ph—Ph3—F | | 3 | 4 |
| 3-Ph3—O1—Oc—Ph1—Ph3—F | 6 | 6 | 6 |
| 4-Ph3—O1—Oc—Ph1—Ph3—F | 5 | 5 | |
| 5-Ph3—O1—Oc—Ph1—Ph3—F | 4 | 5 | 4 |
| Tni (° C.) | 85.7 | 75.2 | 75.7 |
| T → N (° C.) | -25 | -21 | -20 |
| Δn | 0.096 | 0.108 | 0.112 |
| no | 1.484 | 1.486 | 1.487 |
| Δε | 9.5 | 11.9 | 10.3 |
| ε⊥ | 3.8 | 4.4 | 3.9 |
| γ1/mPa·s | 59 | 71 | 64 |
| η/mPa·s | 13.3 | 15.3 | 13.9 |
| Vth/Vrms | 1.471 | 1.309 | 1.448 |

Examples 50 to 52

The prepared liquid crystal compositions and the physical property values thereof are shown in the following.

TABLE 15

|  | Example 50 | Example 51 | Example 52 |
|---|---|---|---|
| 3-Cy—Cy-1d0 | 44 | 44 | 44 |
| 3-Cy—Cy-1d1 | 7 | 15 | 12 |
| 2-Cy—Cy-1d1 | 6 | | |
| 0d1-Cy—Cy—Ph-1 | 6 | 4 | |
| 5-Ph—Ph-1 | 4 | 3.5 | 3.5 |
| 3-Cy—Ph—Ph-2 | | | 5 |
| 0d1-Cy—Ph—Ph-3 | | | 5.5 |
| 3-Ph—Ph1—Ph3—O2d0 | 18 | 22 | 20 |
| 2-Ph—Ph1—Np-3 | 5 | 4.5 | 3 |
| 2Ph—Ph1—Np-3d0 | 5 | 4 | |
| 3-Cy—Ph—Ph3—O1—Ph3—F | | | 4 |
| 3-Ph3—O1—Oc—Ph—Ph3—F | | | 3 |
| 3-Ph3—O1—Oc—Ph1—Ph3—F | 5 | 3 | |
| Tni (° C.) | 74.8 | 75.2 | 76.1 |
| T → N (° C.) | -25 | -17 | -22 |
| Δn | 0.119 | 0.120 | 0.118 |
| no | 1.490 | 1.489 | 1.489 |
| Δε | 2.2 | 1.8 | 2.2 |
| ε⊥ | 2.9 | 2.8 | 2.9 |
| γ1/mPa·s | 41 | 40 | 36 |
| η/mPa·s | 10.2 | 9.6 | 9.4 |
| Vth/Vrms | 2.979 | 3.401 | 3.096 |

Example 53

The prepared liquid crystal compositions and the physical property values thereof are shown in the following.

TABLE 16

|  | Example 53 |
|---|---|
| 3-Cy—Cy-1d0 | 26 |
| 3-Cy—Ph—O1 | 5 |
| 0d1-Cy—Cy—Ph-1 | 15 |
| 0d3-Cy—Cy—Ph-1 | 11 |
| 0d1-Cy—Ph—Ph-3 | 3 |
| 3-Cy—Ph—Ph-2 | 3 |
| 3-Cy—Cy—VO—Ph—Cy-3 | 5 |
| 3-Ph—Ph1—Ph3—O2d0 | 12 |
| 3-Cy—Ph—Ph3—O1—Ph3—F | 5 |
| 3-Ph3—O1—Oc—Ph—Ph3—F | 4 |
| 4-Ph3—O1—Oc—Ph—Ph3—F | 4 |
| 3-Ph3—O1—Oc—Ph1—Ph3—F | 4 |
| 5-Ph3—O1—Oc—Ph1—Ph3—F | 3 |
| Tni (° C.) | 112.7 |
| T → N (° C.) | -49 |
| Δn | 0.120 |
| no | 1.492 |
| Δε | 6.0 |
| ε⊥ | 3.4 |
| γ1/mPa·s | 88 |
| η/mPa·s | 16.8 |
| Vth/Vrms | 2.234 |
| Storage properties at low temperature (-40° C.) (hr/O or X) | 168 hr/O |

Examples 54 to 57

The prepared liquid crystal compositions and the physical property values thereof are shown in the following.

TABLE 17

| | Example 54 | Example 55 | Example 56 | Example 57 |
|---|---|---|---|---|
| 3-Cy—Cy-1d0 | 38 | 41 | 40 | 36 |
| 3-Cy—Cy-1d1 | | | 15 | 6 |
| 0d1-Cy—Cy—Ph-1 | 15 | 15 | 11 | 5 |
| 0d3-Cy—Cy—Ph-1 | 6 | 6 | | |
| 3-Cy—Ph—Ph-2 | 2 | 5 | | |
| 3-Cy—Cy—VO—Ph—Cy-3 | 4 | | | |
| 3-Cy—Ph—Ph3—O1—Ph3—F | 3 | 3 | 3 | 6 |
| 3-Ph3—O1—Oc—Ph—Ph3—F | 3 | 3 | 3 | 4 |
| 4-Ph3—O1—Oc—Ph—Ph3—F | 3 | 3 | 3 | |
| 3-Ph3—O1—Oc—Ph1—Ph3—F | 4 | 4 | 5 | 6 |
| 5-Ph3—O1—Oc—Ph1—Ph3—F | 3 | 3 | 3 | |
| 2-Ph—Ph1—Ph3—O2d0 | 5 | | | 7 |
| 3-Ph—Ph1—Ph3—O2d0 | 8 | 10 | 10 | 15 |
| 5-Ph—Ph1—Ph3—O2d0 | 6 | | | 8 |
| 3-Cy—Ph—Ph1—Ph3—O2d0 | | 4 | 4 | 4 |
| 3-Ph—Ph—Ph1—Ph3—O2d0 | | 3 | 3 | 3 |
| Tni (° C.) | 100.6 | 99.4 | 87.8 | 90.4 |
| T → N (° C.) | −45 | −41 | −44 | −39 |
| Δn | 0.116 | 0.116 | 0.106 | 0.138 |
| no | 1.488 | 1.488 | 1.483 | 1.484 |
| Δε | 5.4 | 4.6 | 5.1 | 6.1 |
| ε⊥ | 3.1 | 3.2 | 3.3 | 3.3 |
| γ1/mPa · s | 67 | 66 | 47 | 61 |
| η/mPa · s | 13.5 | 13.0 | 9.8 | 13.8 |
| Vth/Vrms | 2.216 | 2.218 | 2.110 | 2.075 |

Examples 58 to 62

The prepared liquid crystal compositions and the physical property values thereof are shown in the following.

TABLE 18

| | Example 58 | Example 59 | Example 60 | Example 61 | Example 62 |
|---|---|---|---|---|---|
| 3-Cy—Cy-1d0 | 35 | 35 | 35 | 33 | 30 |
| 3-Cy—Cy-1d1 | 10 | 10 | 10 | | |
| 0d1-Cy—Cy—Ph-1 | 5 | 5 | 5 | 5 | 4 |
| 3-Cy—Ph—Ph-2 | 5 | 5 | 5 | 5 | |
| 0d1-Cy—Ph—Ph-3 | 5 | 5 | 5 | 5 | 5 |
| 2-Ph—Ph1—Ph3—O2d0 | | | 5 | 7 | 8 |
| 3-Ph—Ph1—Ph3—O2d0 | 15 | 8 | 5 | 12 | 18 |
| 5-Ph—Ph1—Ph3—O2d0 | | 7 | 5 | 8 | 10 |
| 3-Ph—Ph3—CFFO—Ph3—F | 10 | 10 | 10 | 10 | 10 |
| 3-Cy—Cy—CFFO—Ph3—F | 5 | 5 | 5 | 5 | 5 |
| 3-Ph—Ph1—Ph3—CFFO—Ph3—F | 5 | 5 | 5 | 5 | 5 |
| 4-Ph—Ph1—Ph3—CFFO—Ph3—F | 5 | 5 | 5 | 5 | 5 |
| Tni (° C.) | 74.9 | 75.5 | 74.2 | 78.0 | 77.3 |
| T → N (° C.) | −25 | −30 | −33 | −29 | −30 |
| Δn | 0.117 | 0.117 | 0.117 | 0.139 | 0.148 |
| no | 1.486 | 1.486 | 1.486 | 1.488 | 1.488 |
| Δε | 5.8 | 5.8 | 5.8 | 6.6 | 7.4 |
| ε⊥ | 3.2 | 3.2 | 3.2 | 3.3 | 3.3 |
| γ1/mPa · s | 61 | 62 | 61 | 77 | 80 |
| η/mPa · s | 12.0 | 12.1 | 11.9 | 15.9 | 17.1 |
| Vth/Vrms | 1.899 | 1.903 | 1.899 | 1.825 | 1.756 |
| Storage properties at low temperature (−25° C.) (hr/O or X) | 240 hr/O | 240 hr/O | 240 hr/O | 240 hr/O | 240 hr/O |

Examples 63 to 66

The prepared liquid crystal compositions and the physical property values thereof are shown in the following.

TABLE 19

| | Example 63 | Example 64 | Example 65 | Example 66 |
|---|---|---|---|---|
| 3-Cy—Cy-1d0 | 35 | 35 | 33 | 47 |
| 3-Cy—Cy-1d1 | 5 | | 8 | |
| 0d1-Cy—Cy—Ph-1 | 5 | 5 | 5 | 5 |
| 0d3-Cy—Cy—Ph-1 | 5 | | | |
| 3-Cy—Ph—Ph-2 | 5 | 5 | | |
| 0d1-Cy—Ph—Ph-3 | 5 | 5 | | |
| 2-Ph—Ph1—Ph3—O2d0 | | 5 | 5 | |
| 3-Ph—Ph1—Ph3—O2d0 | 10 | 10 | 15 | 16 |
| 5-Ph—Ph1—Ph3—O2d0 | | 5 | | |
| 3-Cy—Ph—Ph1—Ph3—O2d0 | 5 | 5 | 5 | 5 |
| 3-Ph—Ph—Ph1—Ph3—O2d0 | | | 4 | 4 |
| 3-Ph—Ph3—CFFO—Ph3—F | 10 | 10 | 10 | 8 |

TABLE 19-continued

|  | Example 63 | Example 64 | Example 65 | Example 66 |
|---|---|---|---|---|
| 3-Cy—Cy—CFFO—Ph3—F | 5 | 5 | 5 | 5 |
| 3-Ph—Ph1—Ph3—CFFO—Ph3—F | 5 | 5 | 5 | 5 |
| 4-Ph—Ph1—Ph3—CFFO—Ph3—F | 5 | 5 | 5 | 5 |
| Tni (° C.) | 85.6 | 82.7 | 80.7 | 77.0 |
| T → N (° C.) | −33 | −27 | −35 | −24 |
| Δn | 0.120 | 0.135 | 0.133 | 0.120 |
| no | 1.488 | 1.488 | 1.486 | 1.485 |
| Δε | 5.2 | 5.9 | 6.0 | 5.4 |
| ε⊥ | 3.3 | 3.4 | 3.5 | 3.4 |
| γ1/mPa · s | 72 | 75 | 70 | 59 |
| η/mPa · s | 13.5 | 15.4 | 13.4 | 11.3 |
| Vth/Vrms | 1.932 | 1.834 | 1.768 | 1.737 |
| Storage properties at low temperature (−25° C.) (hr/O or X) | 240 hr/O | 240 hr/O | 168 hr/O | 168 hr/O |

Examples 67 to 71

The prepared liquid crystal compositions and the physical property values thereof are shown in the following.

TABLE 20

|  | Example 67 | Example 68 | Example 69 | Example 70 | Example 71 |
|---|---|---|---|---|---|
| 3-Cy—Cy-1d0 | 25 | 20 | 10 | 21 | 13 |
| 3-Cy—Cy-1d1 |  |  | 5 |  |  |
| 0d1-Cy—Cy—Ph-1 | 10 | 8 | 6 |  |  |
| 0d3-Cy—Cy—Ph-1 | 4 |  | 4 |  |  |
| 0d1-Cy—Ph—Ph-3 |  |  | 4 |  |  |
| 2-Ph—Ph1—Ph3—O2d0 |  | 7 | 6 | 5 | 6 |
| 3-Ph—Ph1—Ph3—O2d0 | 10 | 14 | 8 | 15 | 18 |
| 5-Ph—Ph1—Ph3—O2d0 |  |  | 6 | 8 | 10 |
| 3-Ph—Ph3—CFFO—Ph3—F | 15 | 15 | 15 | 15 | 18 |
| 3-Cy—Cy—CFFO—Ph3—F | 8 | 8 | 8 | 8 | 8 |
| 3-Ph—Ph1—Ph3—CFFO—Ph3—F | 4 | 4 | 4 | 4 | 4 |
| 4-Ph—Ph1—Ph3—CFFO—Ph3—F | 4 | 4 | 4 | 4 | 4 |
| 3-Pm—Ph—Ph3—CFFO—Ph3—F | 6 | 6 | 6 | 6 | 6 |
| 3-Cy—Cy—Ph3—F | 6 | 6 | 6 | 6 |  |
| 3-Cy—Ph—Ph3—F | 8 | 8 | 8 | 8 | 8 |
| Tni (° C.) | 76.8 | 75.0 | 84.9 | 71.6 | 70.6 |
| T → N (° C.) | −60 | −54 | −54 | −47 | −52 |
| Δn | 0.117 | 0.134 | 0.142 | 0.142 | 0.155 |
| no | 1.485 | 1.485 | 1.487 | 1.482 | 1.483 |
| Δε | 10.4 | 12.0 | 11.5 | 13.0 | 13.2 |
| ε⊥ | 3.8 | 3.9 | 3.8 | 3.9 | 3.9 |
| γ1/mPa · s | 88 | 94 | 110 | 93 | 98 |
| η/mPa · s | 16.4 | 19.1 | 22.4 | 19.8 | 21.4 |
| Vth/Vrms | 1.415 | 1.377 | 1.504 | 1.327 | 1.399 |
| Storage properties at low temperature (−25° C.) (hr/O or X) | 240 hr/O | 240 hr/O | 240 hr/O | 240 hr/O | 240 hr/O |
| Storage properties at low temperature (−30° C.) (hr/O or X) | 240 hr/O | 240 hr/O | 240 hr/O | 240 hr/O | 240 hr/O |

Examples 72 to 75

The prepared liquid crystal compositions and the physical property values thereof are shown in the following.

|  | Example 72 | Example 73 | Example 74 | Example 75 |
|---|---|---|---|---|
| 3-Cy—Cy-1d0 | 24 | 15 | 19 | 16 |
| 3-Cy—Cy-1d1 |  | 10 |  |  |
| 0d1-Cy—Cy—Ph-1 | 6 | 5 | 6 |  |
| 0d1-Cy—Ph—Ph-3 |  | 4 |  |  |
| 2-Ph—Ph1—Ph3—O2d0 | 5 |  | 4 | 7 |

-continued

|  | Example 72 | Example 73 | Example 74 | Example 75 |
|---|---|---|---|---|
| 3-Ph—Ph1—Ph3—O2d0 | 10 | 11 | 8 | 16 |
| 5-Ph—Ph1—Ph3—O2d0 |  |  | 4 | 8 |
| 3-Cy—Ph—Ph1—Ph3—O2d0 | 4 |  | 5 | 4 |
| 3-Ph—Ph—Ph1—Ph3—O2d0 |  | 4 | 3 | 3 |
| 3-Ph—Ph3—CFFO—Ph3—F | 15 | 15 | 15 | 15 |
| 3-Cy—Cy—CFFO—Ph3—F | 8 | 8 | 8 | 5 |
| 3-Ph—Ph1—Ph3—CFFO—Ph3—F | 4 | 4 | 4 | 4 |
| 4-Ph—Ph1—Ph3—CFFO—Ph3—F | 4 | 4 | 4 | 4 |
| 3-Pm—Ph—Ph3—CFFO—Ph3—F | 6 | 6 | 6 | 6 |
| 3-Cy—Cy—Ph3—F | 6 | 6 | 6 | 4 |
| 3-Cy—Ph—Ph3—F | 8 | 8 | 8 | 8 |
| Tni (° C.) | 76.5 | 81.3 | 84.2 | 83.3 |
| T → N (° C.) | −45 | −36 | −32 | −30 |
| Δn | 0.129 | 0.133 | 0.142 | 0.163 |
| no | 1.484 | 1.485 | 1.485 | 1.484 |
| Δε | 11.1 | 10.5 | 10.9 | 11.6 |
| ε⊥ | 3.9 | 3.9 | 4.1 | 3.9 |
| γ1/mPa · s | 87 | 89 | 102 | 109 |
| η/mPa · s | 17.7 | 18.4 | 20.8 | 23.7 |
| Vth/Vrms | 1.365 | 1.487 | 1.387 | 1.459 |
| Storage properties at low temperature (−25° C.) (hr/O or X) | 240 hr/O | 240 hr/O | 240 hr/O | 240 hr/O |
| Storage properties at low temperature (−30° C.) (hr/O or X) | 240 hr/O | 240 hr/O | 240 hr/O | 240 hr/O |

Examples 76 to 80

The prepared liquid crystal compositions and the physical property values thereof are shown in the following.

TABLE 22

|  | Example 76 | Example 77 | Example 78 | Example 79 | Example 80 |
|---|---|---|---|---|---|
| 3-Cy—Cy-1d0 | 37 | 37 | 36 | 37 | 47 |
| 3-Cy—Cy-1d1 | 10 | 10 | 10 | 10 |  |
| 5-Ph—Ph-1 | 10 | 6 | 6 | 4 |  |
| 0d1-Cy—Cy—Ph-1 |  | 4 |  | 10 | 4 |
| 3-Cy—Ph—Ph-2 | 6 | 6 | 3 | 6 | 4 |
| 0d1-Cy—Ph—Ph-3 | 4 | 4 | 3 | 4 | 4 |
| 2-Ph—Ph1—Ph3—O2d0 |  | 6 | 8 |  | 8 |
| 3-Ph—Ph1—Ph3—O2d0 | 22 | 10 | 16 | 16 | 15 |
| 5-Ph—Ph1—Ph3—O2d0 |  | 6 | 8 |  | 8 |
| 3-Cy—Ph—Ph1—Ph3—O2d0 |  |  |  | 4 |  |
| 3-Ph—Ph—Ph1—Ph3—O2d0 |  |  |  | 3 | 3 |
| 3-Cy—Cy—VO—Ph—Cy-3 | 3 | 3 | 3 |  |  |
| 3-Ph—Ph3—CFFO—Ph3—F | 4 | 4 | 3 | 3 | 4 |
| 3-Ph—Ph1—Ph3—CFFO—Ph3—F | 4 | 4 | 4 | 3 | 3 |
| Tni (° C.) | 69.6 | 76.3 | 74.4 | 85.2 | 75.7 |
| T → N (° C.) | −19 | −30 | −29 | −23 | −29 |
| Δn | 0.123 | 0.122 | 0.131 | 0.124 | 0.131 |
| no | 1.491 | 1.490 | 1.488 | 1.490 | 1.487 |
| Δε | 2.6 | 2.6 | 3.0 | 1.9 | 2.8 |
| ε⊥ | 3.0 | 2.9 | 2.9 | 3.0 | 3.0 |
| γ1/mPa · s | 51 | 55 | 56 | 60 | 60 |
| η/mPa · s | 10.7 | 11.0 | 11.5 | 11.3 | 11.7 |
| Vth/Vrms | 2.760 | 2.808 | 2.729 | 2.985 | 2.608 |
| Storage properties at low temperature (−20° C.) (hr/O or X) | 240 hr/O | 240 hr/O | 240 hr/O | 240 hr/O | 240 hr/O |
| Storage properties at low temperature (−25° C.) (hr/O or X) | 72 hr/O | 240 hr/O | 240 hr/O | 169 hr/O | 168 hr/O |

The invention claimed is:

1. A liquid crystal composition comprising at least one compound represented by General Formula (1), at least one compound represented by General Formula (2), and at least one compound represented by General Formula (LC1):

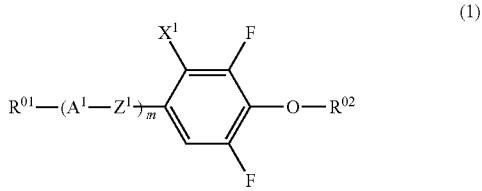

(1)

wherein $R^{01}$ represents an alkyl group having 1 to 15 carbon atoms or an alkenyl group having 2 to 15 carbon atoms, and one —$CH_2$— or two or more —$CH_2$— in these groups may be arbitrarily substituted with —O—, —S—, —COO—, —OCO—, or —CO— as long as an oxygen atom is not directly adjacent to another oxygen atom, and at least one hydrogen atom present in these groups may be substituted with a fluorine atom;

$R^{02}$ represents an alkenyl group having 2 to 15 carbon atoms, and one —$CH_2$— or two or more —$CH_2$— present in the alkenyl group may be arbitrarily substituted with —O—, —S—, —COO—, —OCO—, or —CO— as long as an oxygen atom is not directly adjacent to another oxygen atom;

$A^1$ is a group selected from the group consisting of (a) 1,4-cyclohexylene group in which one —$CH_2$— or two or more —$CH_2$— non-adjacent to each other present in this group may be substituted with —O— or —S—,
(b) 1,4-phenylene group in which one —CH= or two or more —CH= non-adjacent to each other present in this group may be substituted with —N= and at least one hydrogen atom present in this group may be substituted with a fluorine atom, and
(c) naphthalene-2,6-diyl group in which one —CH= or two or more —CH= non-adjacent to each other present in this group may be substituted with —N= and at least one hydrogen atom present in this group may be substituted with a fluorine atom;

$Z^1$ represents —$CH_2O$—, —$OCH_2$—, —$CF_2O$—, —$OCF_2$—, —COO—, —OCO—, —$CH_2CH_2$—, —$CF_2CF_2$—, —CH=CH—, —CF=CF—, —C≡C—, or a single bond;

$X^1$ represents a hydrogen atom, a fluorine atom, or a chlorine atom; and m represents 1 to 4, in the case where m is 2 to 4 and plural $A^1$'s are present, the plural $A^1$'s may be the same as or different from each other, and in the case where m is 2 to 4 and plural $Z^1$'s are present, the plural $Z^1$'s may be the same as or different from each other:

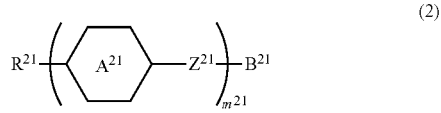

(2)

wherein $R^{21}$ represents an alkyl group having 1 to 15 carbon atoms or an alkenyl group having 2 to 15 carbon atoms, and one —$CH_2$— or two or more —$CH_2$— non-adjacent to each other present in these groups may be arbitrarily substituted with —O—, —S—, —COO—, —OCO—, or —CO—, and at least one hydrogen atom present in these groups may be substituted with a fluorine atom;

$A^{21}$ is a group selected from the group consisting of (a) 1,4-cyclohexylene group in which one —$CH_2$— or two or more —$CH_2$— non-adjacent to each other present in this group may be substituted with —O— or —S—,
(b) 1,4-phenylene group in which one —CH= or two or more —CH= non-adjacent to each other present in this group may be substituted with —N= and at least one hydrogen atom present in this group may be substituted with a fluorine atom, and
(c) naphthalene-2,6-diyl group in which one —CH= or two or more —CH= non-adjacent to each other present in this group may be substituted with —N= and at least one hydrogen atom present in this group may be substituted with a fluorine atom; and $B^{21}$ is a compound represented by either of the following structures:

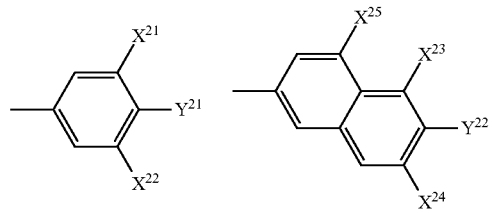

wherein $X^{21}$, $X^{22}$, $X^{23}$, $X^{24}$, and $X^{25}$ each independently represents a hydrogen atom, a fluorine atom, or a chlorine atom and $Y^{21}$ and $Y^{22}$ each independently represents a halogen atom, a cyano group, a halogenated alkyl group having 1 to 5 carbon atoms, or a halogenated alkoxy group having 1 to 5 carbon atoms;

$Z^{21}$ represents —$CH_2O$—, —$OCH_2$—, —$CF_2O$—, —COO—, —OCO—, —$CH_2CH_2$—, —$CF_2CF_2$—, —CH=CH—, —CF=CF—, or a single bond; and $m^{21}$ represents 1, 2, or 3, in the case where $m^{21}$ is 2 or 3 and plural $A^{21}$'s are present, the plural $A^{21}$'s may be the same as or different from each other, and in the case where $m^{21}$ is 2 or 3 and plural $Z^{21}$'s are present, the plural $Z^{21}$'s may be the same as or different from each other:

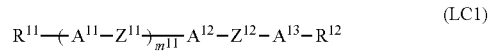

(LC1)

wherein $R^{11}$ and $R^{12}$ each independently represents an alkyl group having 1 to 15 carbon atoms, and one —$CH_2$— or two or more —$CH_2$— in the alkyl group may be substituted with —O—, —CH=CH—, —CO—, —OCO—, —COO—, —C≡C—, —$CF_2O$—, or —$OCF_2$— as long as an oxygen atom is not directly adjacent to another oxygen atom, and one or more hydrogen atoms in the alkyl group may be substituted with a halogen atom;

$A^{11}$ to $A^{13}$ each independently is a group selected from the group consisting of
(a) 1,4-cyclohexylene group in which one —$CH_2$— or two or more —$CH_2$— non-adjacent to each other present in this group may be substituted with —O— or —S—, (b) 1,4-phenylene group in which one —CH= or two or more —CH= non-adjacent to each other present in this group may be substituted with —N= and at least one hydrogen atom present in this group may be substituted with a fluorine atom, and (c) naphthalene-2,6-diyl group in which one —CH= or two or more —CH= non-adjacent to each other present in this group may be substituted with —N= and at least one hydrogen atom present in this group may be substituted with a fluorine atom;

$Z^{11}$ and $Z^{12}$ each independently represents a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—; and $m^{11}$ represents 0, 1, or 2, in the case where $m_{11}$ is 2 and plural $A^{11}$'s are present, the plural $A_{11}$'s may be the same as or different from each other, and in the case where $m^{11}$ is 2 and plural $Z^{11}$'s are present, the plural $Z^{11}$'s may be the same as or different from each other, with the proviso that the compound represented by General Formula (1) is excluded.

2. The liquid crystal composition according to claim 1, comprising at least one compound represented by General Formula (1-1) as the compound represented by General Formula (1):

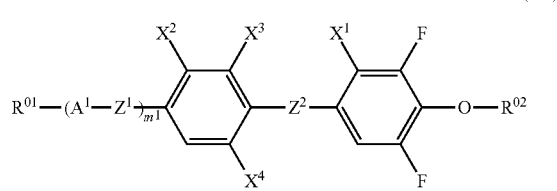

(1-1)

wherein $R^{01}$, $R^{02}$, $A^1$, $Z^1$, and $X^1$ have the same meaning as $R^{01}$, $R^{02}$, $A^1$, $Z^1$, and $X^1$ in General Formula (1), respectively;

$Z^2$ represents —CH$_2$O—, —OCH$_2$—, —CF$_2$O—, —OCF$_2$—, —COO—, —OCO—, —CH$_2$CH$_2$—, —CF$_2$CF$_2$—, —CH=CH—, —CF=CF—, or a single bond;

$X^2$, $X^3$, and $X^4$ each independently represents a hydrogen atom, a fluorine atom, or a chlorine atom; and $m^1$ represents 0, 1, 2, or 3, in the case where $m^1$ is 2 or 3 and plural $A^1$'s are present, the plural $A^1$'s may be the same as or different from each other, and in the case where $m^1$ is 2 or 3 and plural $Z^1$'s are present, the plural $Z^1$'s may be the same as or different from each other.

3. The liquid crystal composition according to claim 1, wherein the group represented by —O—$R^{02}$ is a group represented by Formula (R6):

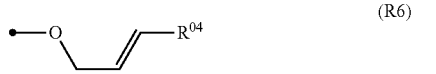

(R6)

wherein $R^{04}$ represents a hydrogen atom or an alkyl group having 1 to 3 carbon atoms, one —CH$_2$— or two or more —CH$_2$— non-adjacent to each other present in the group may be substituted with —O—, —COO—, —OCO—, or —CO—, and the black point in the formula represents a point linking to a ring.

4. The liquid crystal composition according to claim 3, wherein $R^{04}$ represents a hydrogen atom or a methyl group.

5. The liquid crystal composition according to claim 2, comprising at least one compound represented by General Formula (1-1A) as the compound represented by General Formula (1-1):

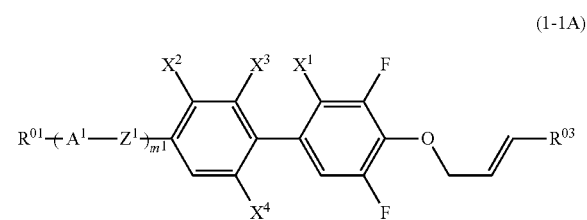

(1-1A)

wherein $R^{01}$, $A^1$, $Z^1$, $X^1$, $X^2$, $X^3$, $X^4$, and $m^1$ have the same meaning as $R^1$, $A^1$, $Z^1$, $X^1$, $X^2$, $X^3$, $X^4$, and $m^1$ in General Formula (1-1), respectively; and $R^3$ represents a hydrogen atom or an alkyl group having 1 to 3 carbon atoms, and one —CH$_2$— or two or more —CH$_2$— in the alkyl group may be substituted with —O—, —S—, —COO—, —OCO—, or —CO— as long as an oxygen atom is not directly adjacent to another oxygen atom.

6. The liquid crystal composition according to claim 1, comprising at least one compound represented by General Formula (LC2-a) as the compound represented by General Formula (2):

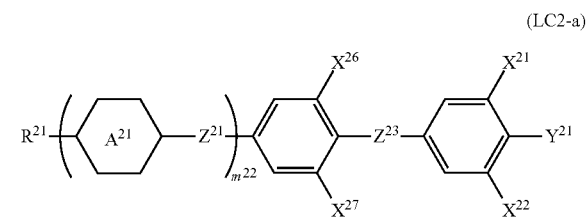

(LC2-a)

wherein $X^{26}$ and $X^{27}$ each independently represents a hydrogen atom or a fluorine atom, $Z^{23}$ represents —OCH$_2$—, —CH$_2$O—, —OCF$_2$—, or —CF$_2$O—, $m^{22}$ represents 1 or 2, and $R^{21}$, $A^{21}$, $Z^{21}$, $X^{21}$, $X^{22}$, and $Y^{21}$ have the same meaning as $R^{21}$, $A^{21}$, $Z^{21}$, $X^{21}$, $X^{22}$, and $Y^{21}$ in General Formula (2), respectively.

7. The liquid crystal composition according to claim 1, comprising at least one compound represented by General Formula (LC2-b) as the compound represented by General Formula (2):

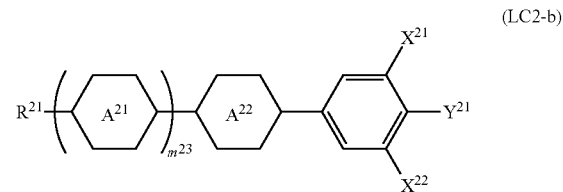

(LC2-b)

wherein $A^{22}$ is a group selected from the group consisting of (a) 1,4-cyclohexylene group in which one —CH$_2$— or two or more —CH$_2$— non-adjacent to each other present in this group may be substituted with —O— or —S—, (b) 1,4-phenylene group in which one —CH= or two or more —CH= non-adjacent to each other present in this group may be substituted with —N═ and at least one hydrogen atom present in this group may be substituted with a fluorine atom, and (c) naphthalene-2,6-diyl group in which one —CH═ or two or more —CH═ non-adjacent to each other present in this group may be substituted with —N═ and at least one hydrogen atom present in this group may be substituted with a fluorine atom; and $m^{23}$ represents 1 or 2, and $R^{21}$, $A^{21}$, $X^{21}$, $X^{22}$, and $Y^{21}$ have the same meaning as $R^{21}$, $A^{21}$, $X^{21}$, $X^{22}$, and $Y^{21}$ in General Formula (2), respectively.

8. The liquid crystal composition according to claim 1, which comprises the compound represented by General Formula (1) in an amount of 2% to 40% by mass.

9. The liquid crystal composition according to claim 1, which comprises the compound represented by General Formula (2) in an amount of 2% to 50% by mass.

10. The liquid crystal composition according to claim 1, which comprises the compound represented by General Formula (LC1) in an amount of 10% to 80% by mass.

11. The liquid crystal composition according to claim 1, which comprises one or more polymerizable compounds.

12. A liquid crystal display element, comprising the liquid crystal composition according to claim 1.

13. A liquid crystal display element for driving an active matrix, comprising the liquid crystal composition according to claim 1.

14. A liquid crystal display element for a TN mode, an OCB mode, an ECB mode, an IPS mode, or a VA-IPS mode, comprising the liquid crystal composition according to claim 1.

15. A polymer-stabilized liquid crystal display element for a TN mode, an OCB mode, an ECB mode, an IPS mode, or a VA-IPS mode, comprising the liquid crystal composition according to claim 11 and polymerizing a polymerizable compound contained in the liquid crystal composition in the absence or presence of applied voltage.

* * * * *